United States Patent
Gupta et al.

(10) Patent No.: US 10,946,528 B2
(45) Date of Patent: Mar. 16, 2021

(54) AUTONOMOUS COMPANION MOBILE ROBOT AND SYSTEM

(71) Applicant: Irepa International, LLC, Palm Springs, CA (US)

(72) Inventors: Sanjiv S. Gupta, Palm Springs, CA (US); Izabela Repczynska, Palm Springs, CA (US)

(73) Assignee: IREPA INTERNATIONAL, LLC, Palm Springs, CA (US)

( * ) Notice: Subject to any disclaimer, the term of this patent is extended or adjusted under 35 U.S.C. 154(b) by 174 days.

(21) Appl. No.: 15/996,414

(22) Filed: Jun. 1, 2018

(65) Prior Publication Data

US 2019/0366558 A1    Dec. 5, 2019

(51) Int. Cl.
*B25J 9/00*   (2006.01)
*B25J 5/00*   (2006.01)
*B25J 11/00*  (2006.01)
*B25J 13/00*  (2006.01)

(52) U.S. Cl.
CPC .............. *B25J 11/009* (2013.01); *B25J 5/007* (2013.01); *B25J 9/0009* (2013.01); *B25J 13/006* (2013.01); *Y10S 901/01* (2013.01); *Y10S 901/23* (2013.01)

(58) Field of Classification Search
CPC ...... B25J 5/007; B25J 9/0009; B25J 11/0005; B25J 11/0015; B25J 11/009; B25J 13/006; Y10S 901/01; Y10S 901/23
See application file for complete search history.

(56) References Cited

U.S. PATENT DOCUMENTS

| | | | |
|---|---|---|---|
| 2012/0010749 A1* | 1/2012 | van der Merwe | A61F 2/68 700/264 |
| 2017/0190048 A1* | 7/2017 | Vice | B25J 5/007 |
| 2018/0001476 A1* | 1/2018 | Tan | B61G 7/04 |
| 2020/0094411 A1* | 3/2020 | Tan | B25J 9/1666 |

* cited by examiner

*Primary Examiner* — Robert T Nguyen

(74) *Attorney, Agent, or Firm* — Loza & Loza, LLP; Michael I. Angert

(57) ABSTRACT

An autonomous companion mobile robot and system may complement the intelligence possessed by a user with machine learned intelligence to make a user's life more fulfilling. The robot and system includes a mobile robotic device and a mobile robotic docking station. Either or both of the mobile robotic device and the mobile robotic docking station may operate independently, as well as operating together as a team, as a system. The mobile robotic device may have an external form of a three-dimensional shape, a humanoid, a present or historical person, some fictional character, or some animal. The mobile robotic device and/or the mobile robotic docking station may each include a fog Internet of Things (IoT) gateway processor and a plurality of sensors and input/output devices. The autonomous companion mobile robot and system may collect data from and observe its users and offer suggestions, perform tasks, and present information to its users.

20 Claims, 21 Drawing Sheets

AUTONOMOUS COMPANION MOBILE ROBOT AND SYSTEM

FIELD

The present application is related to methods, systems, and devices that together form a pair of mobile robotic platforms that serve human beings. In more detail, the present application is related to an autonomous mobile robotic device (e.g., a servant) and its autonomous mobile robotic docking station. The autonomous mobile robotic device may act as a companion to an owner and members of the owner's household and/or business (individually and/or collectively referred to herein as a user), and may include a first plurality of sensors, memory devices, and input/output devices that may be used to monitor and/or stimulate the physical and mental health and general well-being of the user, building, and/or rooms that the user occupies. The autonomous mobile robotic docking station may secure and lift the autonomous mobile robotic device, may provide circuitry for charging the autonomous mobile robotic device, and may include a second plurality of sensors, memory devices, and input/output devices that may be used to monitor and/or stimulate the physical and mental health and general well-being of the user and the environs of the user. Several of the second plurality of sensors, memory devices, and input/output devices may be redundant to, or duplicative of, the first plurality of sensors, memory devices, and input/output devices; however, the autonomous mobile robotic docking station may additionally house a plurality of input/output devices that may be removably coupled to the autonomous mobile robotic docking station and that may be placed in direct, or near direct, physical contact with the user, to, for example, measure physical and mental health related properties of the user and/or provide for personal stimulation and/or personal hygiene of the user. According to one aspect, a subset of the first plurality of sensors and a subset of the second plurality of sensors may be redundant and a first fog Internet of Things (IoT) gateway processor and a second fog Internet of Things (IoT) gateway processor, coupled to the autonomous mobile robotic device and the autonomous mobile robotic docking station, respectively, may independently and locally process data respectively received from the first plurality of sensors and the second plurality of sensors These and additional or alternative aspects are described herein.

BACKGROUND

Human beings are physically and mentally complex organisms that interact with each other to obtain and dispense knowledge, form bonds of friendship and service, attend to physical and mental health needs of one another, and perform all manners of activities that are needed to participate in human society as we know it today. Human beings tend to have busy days that include activities such as: attending to personal hygiene; dressing; purchasing supplies including foods and medicines; reading or viewing sources of knowledge for business and for pleasure; aggregating and dispensing knowledge for business and for pleasure; monitoring their own physical and mental health by using a plurality of measuring devices; performing activities to stimulate, improve, and/or maintain stability of their own physical and mental health by, for example, performing exercises and planning healthy meals; maintaining daily, weekly, monthly, yearly schedules; keeping track of their possessions; and a host of other activities that are far too numerous to list.

Today, performing the exemplary activities described above takes time and physical and mental acuity. Many adult persons possess sufficient physical and mental acuity to at least get by in life; however, even the sharpest persons today may wish to have someone to help them with their daily activities. Furthermore, there are humans that, because of age and/or disease, are barely able to get by with their daily activities, as well as those among us that suffer from mental disorders, such as depression and anxiety, which often get in the way of performing even routine daily activities. Everyone, from the fittest to the least fit, could benefit from having an employee help us during our busy days; however, most humans either cannot afford to have such an employee, which may commonly be referred to as a servant, or are uneasy with the concept of having another human being act as our servant. It is noted that mention herein of "daily activities" is not to be construed as being limited to the acts associated with the phrase "activities of daily living" as used in the healthcare industry.

There are, today, devices that provide human beings with assistance. Such devices include so-called smart speakers that may be able to answer questions and control settings and power of several household systems and/or devices; however, today's smart speakers are constantly coupled to the Internet, which makes them susceptible to hacking and real-time malicious eavesdropping. Furthermore, today's smart speakers are more of a novelty than a companion. They do not have human form and while they may be fun to use, they ultimately cannot offer the thoughtfulness and friendship that one might expect from, for example, a family member. What is needed is a mobile robotic device and system that can act as a thoughtful companion to its users, and that can complement the intelligence possessed by a user with machine learned intelligence to make the user's life more fulfilling. Furthermore, what is needed is an intelligent mobile platform that can house a plurality of sensors and/or input/output devices that may be used for monitoring and/or stimulating the physical and mental health and general wellbeing of its users.

SUMMARY

According to some aspects, a system is described herein, where the system may include a mobile robotic device. The mobile robotic device may include: an enclosure; a first fog Internet of Things (IoT) gateway processor (first fog IoT gateway processor) within the enclosure; a first memory device coupled to the first fog IoT gateway processor within the enclosure; a first plurality of sensors and input/output devices coupled to the first fog IoT gateway processor within the enclosure; and a first motion base, responsive to commands of the first fog IoT gateway processor, having a first housing coupled to the enclosure, the first motion base having a first plurality of wheels, wherein at least three of the first plurality of wheels are configured to drive and steer the first motion base on a surface. The system may further include a mobile robotic docking station, which may include: a second fog Internet of Things (IoT) gateway processor; a second memory device coupled to the second fog Internet of Things (IoT) gateway processor; a second plurality of sensors and input/output devices coupled to the second fog IoT gateway processor; a second motion base, responsive to commands of the second fog Internet of Things (IoT) gateway processor, having a second housing, the second motion base having an open recess therein, configured to receive the first motion base and at least a portion of the enclosure of the mobile robotic device, the second motion base having a second plurality of omnidirectional wheels, wherein at least three of the second plurality of omnidirectional wheels are configured to drive and steer the second motion base on the surface; and a lifting platform, responsive to commands of the second fog Internet of Things (IoT) gateway processor, within the open recess, and coupled to the second motion base, where the lifting platform may include a lifting base configured to receive the first plurality of wheels of the first motion base thereon, and a fastener system configured to releasably secure the first motion base to the lifting platform, wherein the lifting platform secures and lifts the mobile robotic device to space apart the lifting platform from the surface.

According to some aspects, a method operational at a mobile robotic device, is described herein, where the method may include: determining if a battery of the mobile robotic device requires charging; determining a location and orientation of an entrance to a lifting platform of a mobile robotic docking station, if the battery of the mobile robotic device requires charging; mapping obstacles on a first surface between a first location of the mobile robotic device and the location of the entrance to the lifting platform; driving the mobile robotic device on the first surface from the first location to the location of the entrance to the lifting platform, while avoiding the mapped obstacles; driving the mobile robotic device onto the lifting platform via the entrance to the lifting platform, wherein the battery of the mobile robotic device is coupled to a battery of the mobile robotic docking station when the mobile robotic device is driven onto the lifting platform; and charging the battery of the mobile robotic device with the battery of the mobile robotic docking station.

According to some aspects, a method, operational in a system having a mobile robotic device and a mobile robotic docking station, may include: maintaining at least a portion of a plurality of solar cells mounted to the mobile robotic docking station in direct sunlight during a plurality of hours of daylight; driving the mobile robotic device from the first surface onto a lifting platform of the mobile robotic docking station; securing the mobile robotic device to the lifting platform; lifting the mobile robotic device on the lifting platform, to space apart the lifting platform from the first surface after securing the mobile robotic device to the lifting platform; driving the mobile robotic docking station with the lifted mobile robotic device to a location adjacent to a user using the driving motors and steering motors coupled to the wheels of the mobile robotic docking station; obtaining biometric data of the user collected from a plurality of sensors and input/output devices coupled to the mobile robotic docking station; obtaining answers, responsive to questions posed to the user, via at least one microphone coupled to the mobile robotic docking station or the mobile robotic device; performing analytics to the biometric data and the answers to questions to obtain data analytic results; generating, based at least in part on the obtained results, actionable insights to present to the user; and presenting the actionable insights to the user.

DETAILED DESCRIPTION

In the following description, specific details are given to provide a thorough understanding of the aspects described herein. However, it will be understood by one of ordinary skill in the art that the aspects may be practiced without these specific details. For example, circuits may be shown in block diagrams in order to avoid obscuring aspects in unnecessary detail. In other instances, well-known circuits, structures, and techniques may not be shown in detail in order not to obscure the aspects more fully described herein.

The term "exemplary" may be used herein to mean "serving as an example, instance, or illustration." Any implementation or aspect described herein as "exemplary" is not necessarily to be construed as preferred or advantageous over other implementations or aspects.

The term "aspect" does not require that all aspects include the discussed aspect, or any discussed feature, advantage, and/or mode of operation.

The term "sensor" may be used herein to refer to a device that detects and/or measures a physical property.

The term "sensors and input/output devices" may be understood to mean sensor(s) and/or input device(s) and/or output device(s).

The term "analytics" may be used herein to refer to the discovery and communication of meaningful patterns in data.

The term "obtain" may be used herein to mean derive locally or receive from a non-local source or entity. The term "obtain" contemplates obtaining partially and/or obtaining completely.

The term "IoT gateway" or "IoT gateway processor", may be used herein to refer to a hardware platform and an operating system that allows for sensor and device access, onboard processing, and communication to remote applications in a secure and manageable way. Examples of an IoT gateway, or a device that may be used as an IoT gateway, include but are not limited to an Intel® IoT Gateway, an Intel® IoT Gateway® based on Intel® Core™ i7, and an Intel® Next Unit of Computing (NUC) miniature personal computer.

Overview

Figure 1:
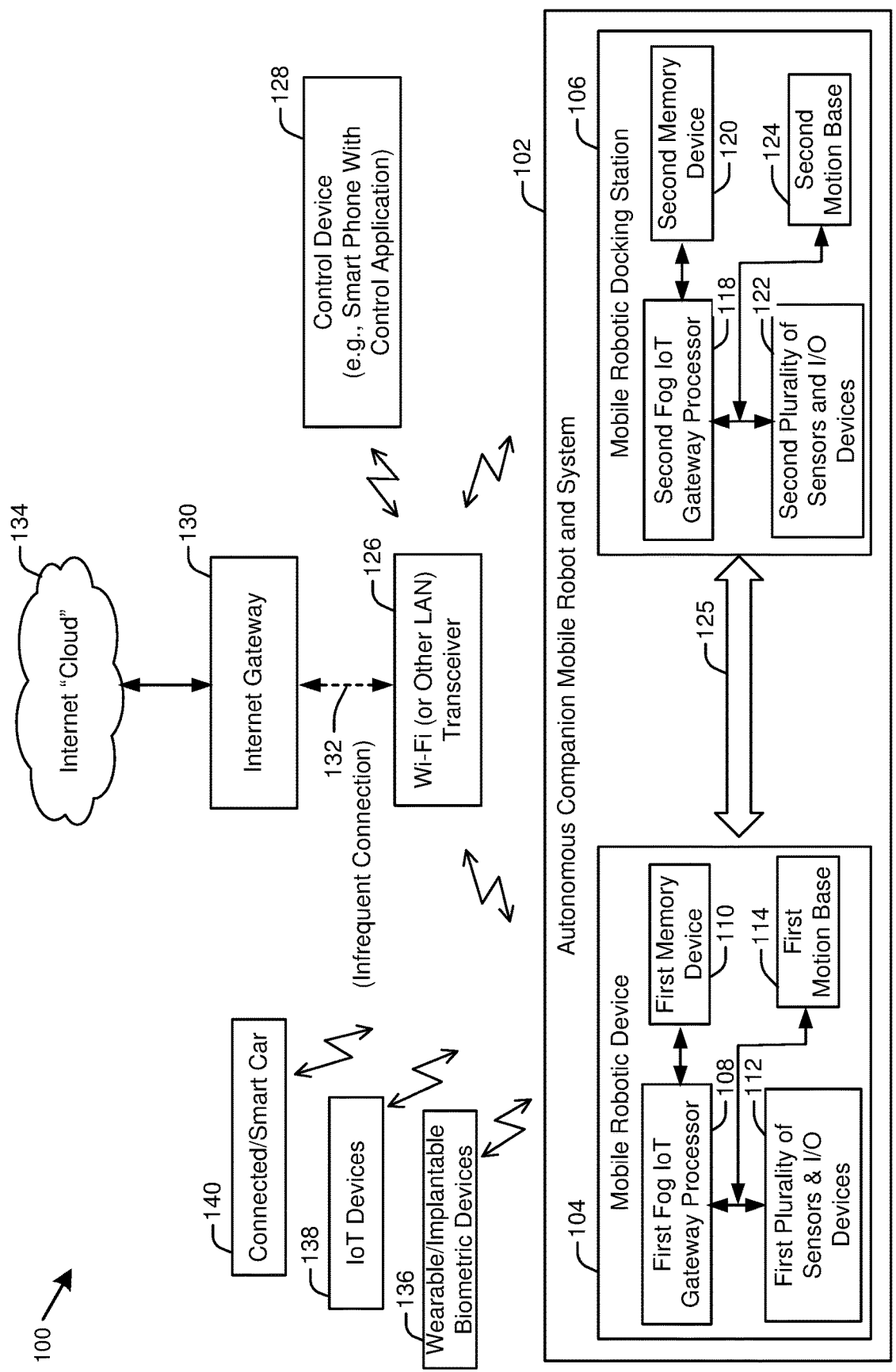
FIG. 1 is a block diagram illustrating an operational environment that includes an autonomous companion mobile robot and system, in accordance with aspects described herein.

FIG. 1 is a block diagram illustrating an operational environment 100 that includes an autonomous companion mobile robot and system 102, in accordance with aspects described herein. The autonomous companion mobile robot and system 102 serves to complement the intelligence possessed by a user with machine learned intelligence to make a user's life more fulfilling. Accordingly, the autonomous companion mobile robot and system 102 may be referred to as a Complementary Intelligence™ autonomous companion mobile robot and system 102. The autonomous companion mobile robot and system 102 includes a mobile robotic device 104 and a mobile robotic docking station 106. Either or both of the mobile robotic device 104 and the mobile robotic docking station 106 may operate independently, as well as operating together as a team, as a system. In accordance with some aspects, the mobile robotic device 104 may have an external form or appearance characteristic of, for example, a three-dimensional shape (e.g., polyhedra, ellipsoids, cylinders, cones, or any combination thereof), a humanoid (e.g., a humanoid shape), a present or historical person, some fictional character, some animal, or may have any other external form or appearance characteristic that may be physically supported by, and does not adversely affect the balance of, the mobile robotic device 104 and the mobile robotic docking station 106.

In general, the mobile robotic device 104 may patrol a user's home or business, collecting data including placement and presence (or absence) of objects, maintaining an inventory of possessions and clothing, sensing the environment within the patrolled areas, observing its users (e.g., the owner and members of the owner's household and/or business), offering suggestions, performing tasks, and presenting information to its users. The mobile robotic device 104 includes, for example, a first fog Internet of Things (IoT) gateway processor 108, a first memory device 110, a first plurality of sensors and input/output devices 112, and a first motion base 114. The first memory device 110, first plurality of sensors and input/output devices 112, and first motion base 114 are coupled to, and in communication with, the first fog Internet of Things (IoT) gateway processor 108. The mobile robotic device 104, first fog Internet of Things (IoT) gateway processor 108, first memory device 110, first plurality of sensors and input/output devices 112, and first motion base 114 will be described in detail later.

In general, the mobile robotic docking station 106 may receive the mobile robotic device 104 and secure and lift the mobile robotic device 104 off a surface on which both the mobile robotic device 104 and the mobile robotic docking station 106 travel, to space apart (e.g., physically separate with an open-air space therebetween) the mobile robotic device 104 (and thus the first motion base 114 and a first plurality of wheels thereof) from that surface. The mobile robotic docking station 106 may charge the mobile robotic device 104. The mobile robotic docking station 106, with the mobile robotic device 104 carried therein, may maneuver to the user using its own second motion base 124. The mobile robotic docking station 106 may, among other things, supply the user with sensors to allow the user to collect data on the user's physical and mental health and general welfare. The mobile robotic docking station 106 may, among other things, process the data and provide the user with information regarding the user's physical and mental health and general welfare. The mobile robotic docking station 106 includes, for example, a second fog Internet of Things (IoT) gateway processor 118, a second memory device 120, a second plurality of sensors and input/output devices 122, and a second motion base 124. The, second memory device 120, second plurality of sensors and input/output devices 122, and second motion base 124 are coupled to, and in communication with, the second fog Internet of Things (IoT) gateway processor 118. The second fog Internet of Things (IoT) gateway processor 118, second memory device 120, second plurality of sensors and input/output devices 122, and second motion base 124 will be described in detail later.

Based on the presence of the first fog Internet of Things (IoT) gateway processor 108 and the second fog Internet of Things (IoT) gateway processor 118, the mobile robotic device 104 and a mobile robotic docking station 106 may each be considered as a fog node in a fog network. The fog nodes may communicate with each other directly, as depicted by double sided arrow 125, or indirectly through a Wi-Fi (or other local area network (LAN)) transceiver 126.

As used herein, "fog," or "fog computing," may be an architecture that collects data (sometimes massive amounts of data) from a plurality of IoT devices and/or other sensors and/or input devices, using a plurality of technologies, at an edge of a network in a gateway device, and acts as a link between local capture, processing, and storage of data and cloud aspects of capturing, processing and storing such data. For example, the first fog Internet of Things (IoT) gateway processor 108 may collect data from wearable/implantable biometric sensors 136, IoT devices 138 located in proximity to the mobile robotic device 104, connected/smart car(s) 140, as well as the first plurality of sensors and input/output devices 112 that may be stored within and/or physically integral to the mobile robotic device 104. The first fog Internet of Things (IoT) gateway processor 108 may process the raw data, for example, determining if a weight of a user received from an IoT bathroom scale is above or below a predetermined number, or determining if a visual appearance or movement of the user received from a stereoscopic camera physically mounted on the mobile robotic device 104 showed signs of anxiety, and store the raw and/or processed data in the first memory device 110. There is no need for the mobile robotic device 104 to couple to processors or servers in, for example, an Internet "cloud" (hereinafter a cloud 134) via an Internet gateway 130, because all processing and storage is done at mobile robotic device 104 using its first fog Internet of Things (IoT) gateway processor 108 and first memory device 110. If, however, there was a need to transfer data to processors or servers in the cloud 134, such transfer, to and from the mobile robotic device 104 could be accomplished through the first fog Internet of Things (IoT) gateway processor 108. Still further, the first fog Internet of Things (IoT) gateway processor 108 may be considered a first fog node, which can interact with other fog nodes without having to communicate with those other fog nodes through the cloud 134. For example, the first fog node (using the first fog Internet of Things (IoT) gateway processor 108 of the mobile robotic device 104 as an example) may interact with a second fog node. The second fog node may be, for example the second fog Internet of Things (IoT) gateway processor 118 of the mobile robotic docking station 106, to be discussed later herein. The first and second fog nodes may communicate with each other without coupling to or communicating with another processor or server via the Internet. However, the first fog Internet of Things (IoT) gateway processor 108 and/or the second fog Internet of Things (IoT) gateway processor 118 may, in some instances be coupled to the cloud.

The first fog Internet of Things (IoT) gateway processor 108 and the second fog Internet of Things (IoT) gateway processor 118 may collect, on an ongoing basis, large amounts of data, which may be stored in the first memory device 110 and/or second memory device 120, respectively. In accordance with some aspects, the first memory device 110 and/or second memory device 120 may each hold in excess of twenty terabytes of data. However, smaller or larger amounts of data storage are acceptable. The large amounts of data may relate to a user, so as to build a local knowledge repository from which first fog Internet of Things (IoT) gateway processor 108 and second fog Internet of Things (IoT) gateway processor 118 may draw insights from algorithms and artificial intelligence and/or machine learning.

Also depicted is a control device 128, which, for example, is depicted as a smart phone with a control application. Additional or alternate control devices may include, for example, a personal computer, a touch screen pad, and/or a dedicated remote control unit.

Also depicted is an Internet gateway 130. For the purposes of the autonomous companion mobile robot and system 102, a connection 132 to the Internet gateway 130, and by extension a connection to the cloud 134, is infrequently made. Accordingly, the connection 132 is depicted as a broken line double headed arrow. As described herein, much, if not all, of the data from the first plurality of sensors and input/output devices 112 and the second plurality of sensors and input/output devices 122 is stored and processed at the "edge" of the cloud 134, by the first fog Internet of Things (IoT) gateway processor 108 and the second fog Internet of Things (IoT) gateway processor 118. Pushing the storage and processing to the edge of the cloud 134 provides for improved security, as there is no need to be continually tied to the cloud 134 for remote storage and remote processing. These and other aspects of the autonomous companion mobile robot and system 102 will be described in detail later.

Mobile Robotic Device

Figure 2:
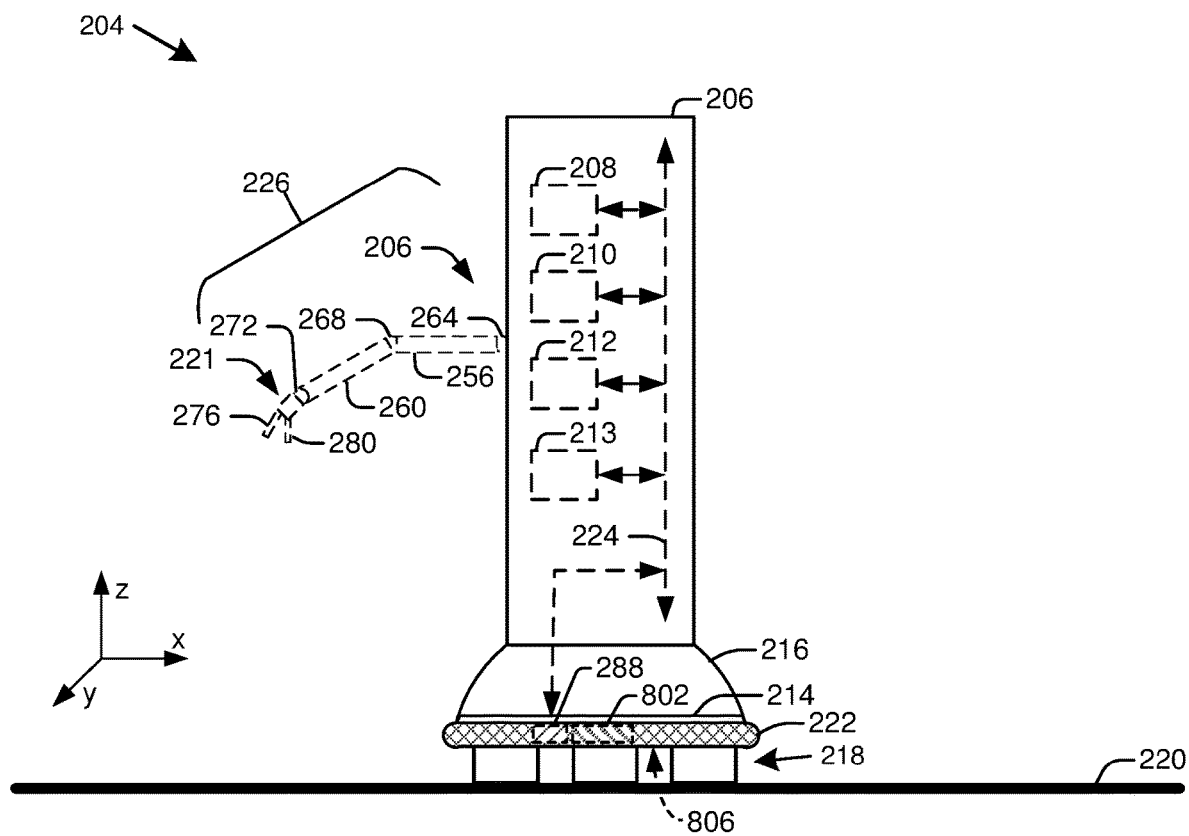
FIG. 2 is an illustration depicting a first embodiment of a mobile robotic device, according in accordance with aspects described herein.

FIG. 2 is an illustration depicting a first embodiment of a mobile robotic device 204 (similar to 104, FIG. 1), in accordance with aspects described herein. In accordance with some aspects, the mobile robotic device 204 may be an autonomous mobile robotic device. In accordance with one aspect, the mobile robotic device 204 includes an enclosure 206. The mobile robotic device 204 further includes a first fog Internet of Things (IoT) gateway processor (first fog IoT gateway processor 208) (similar to 108, FIG. 1) within the enclosure 206. The mobile robotic device 204 further includes a first memory device 210 (similar to 110, FIG. 1) coupled to the first fog Internet of Things (IoT) gateway processor 108, FIG. 1) within the enclosure 206. The mobile robotic device 204 further includes a first plurality of sensors and input/output devices 212 (similar to 112, FIG. 1) coupled to the first fog IoT gateway processor 208 within the enclosure 206. The mobile robotic device 204 further includes a battery 213, such as a rechargeable battery with AC charging and solar charging capabilities (e.g., a built-in battery pack). The mobile robotic device 204 further includes a first motion base 214 (similar to 114, FIG. 1), responsive to commands of the first fog IoT gateway processor 208.

In accordance with one aspect, the first motion base 214 has a first housing 216 coupled to the enclosure 206. In accordance with some aspects, the enclosure 206 is the enclosure 206 coupled to the first housing 216. In other words, the enclosure 206 and the first housing 216 together form one structural feature that may be referred to as the enclosure 206. In still other words, the enclosure 206 and the first housing 216 are one in the same. The first motion base 214 may have a first plurality of wheels (e.g., a first plurality of omnidirectional wheels 218), wherein at least three of the first plurality of omnidirectional wheels 218 are configured to drive and steer the first motion base 214 on a surface 220. The mobile robotic device 204 may be holonomic. Use of the first plurality of omnidirectional wheels 218 enables the mobile robotic device 204 to freely move in any direction and the controllable degrees of freedom is equal to the total degrees of freedom. Each omnidirectional wheel can rotate in both the x-axis and the y-axis making the omnidirectional wheel move in both the directions. The first motion base 214 may additionally include a first bumper 222 (also referred to as a bumper) around its circumference, configured to stop and/or alter a direction of travel of the first motion base 214 when the first bumper 222 contacts an obstacle. The first motion base 214 may also include a communications and/or power connector 288, which may mate with a corresponding communications and/or power connector (not shown) on the lifting platform 630, FIG. 6 and FIG. 8. The first motion base 214 may also include a magnet such as a programmable first reversible polarity magnet 802, FIG. 8, that is, a magnet with selectively reversible magnetic poles at an outermost lower anterior location on the first motion base 214. According to some aspects, the first motion base 214 may also include at least one of a set of ultrasonic range sensors, a light detection and ranging (LiDAR) system, touch and tactile sensors, and a pressure sensor array coupled to the first plurality of wheels. Additionally, the first motion base may include part of an inductive charging structure 806, FIG. 8, that may be used to wirelessly charge the battery 213 of the mobile robotic device 204. The first fog IoT gateway processor 208, first memory device 210, first plurality of sensors and input/output devices 212, battery 213, first motion base 214, and other components may all be coupled via a communication/power bus 224.

In accordance with one example, the mobile robotic device 204 may have a height of about three feet to about six feet. In accordance with another example, the mobile robotic device 204 may have a height of about four feet to about five and one-half feet. In accordance with still another example, the mobile robotic device 204 may have a height of about five feet and four inches. These heights are not limiting; the mobile robotic device 204 may have any height that does not alter the center of gravity of the mobile robotic device 204 to a point where the mobile robotic device 204 loses stability and/or easily tips over.

In accordance with one aspect, as shown in FIGS. 3-8, the enclosure 206 has a humanoid form. That is, the enclosure of the mobile robotic device 204 may have an overall shape of a human being; it may be humanoid in shape. In accordance with another aspect, the enclosure 206 of the mobile robotic device 204 may have an external form or appearance characteristic of, for example, a three-dimensional shape (e.g., polyhedra, ellipsoids, cylinders, cones, or any combination thereof), a humanoid (e.g., a humanoid shape), a present or historical person, a fictional character, or an animal. In short, the enclosure 206 of the mobile robotic device 204 may have any external form or appearance characteristic that may be physically supported by, and does not adversely affect a balance of, the mobile robotic device 204 and/or the mobile robotic docking station 602 (FIG. 6A, 6B, 6C, 6D) when the mobile robotic device 204 is docked to and lifted therein.

The mobile robotic device 204 may optionally include an articulated arm 226, responsive to commands from the first fog IoT gateway processor 208, coupled to the enclosure 206 at an upper end of the articulated arm 226 (e.g., where the upper end of the articulated arm 226 is coupled to the enclosure 206, at a shoulder portion 228 of the enclosure 206). The articulated arm 226 may include a bicep portion 256. The articulated arm 226 may include a forearm portion 260. The enclosure 206 and the bicep portion 256 may be joined therebetween by a motorized shoulder joint 264. The bicep portion 256 and the forearm portion 260 may be joined therebetween by a motorized elbow joint 268. The mobile robotic device 204 may further include an articulated hand 221, responsive to commands from the first fog IoT gateway processor 208, coupled to the articulated arm 226 at lower ends of the articulated arm 226. For example, the forearm portion 260 and the articulated hand 221 may be joined therebetween by a motorized wrist joint 272. Together, the motorized shoulder joint 264, motorized elbow joint 268, and motorized wrist joint 272 may provide for yaw, pitch, and roll mobility for the articulated hand 221 and/or provide for six degrees of freedom for the articulated hand 221. The articulated hand 221 includes at least one finger 276, which may include at least one motorized knuckle joint (not shown), and may include an opposing thumb 280, which may include at least one motorized knuckle joint (not shown). The articulated hand 221 may include touch sensor(s), tactile sensor(s), and/or a pressure sensitive array.

Figure 3:
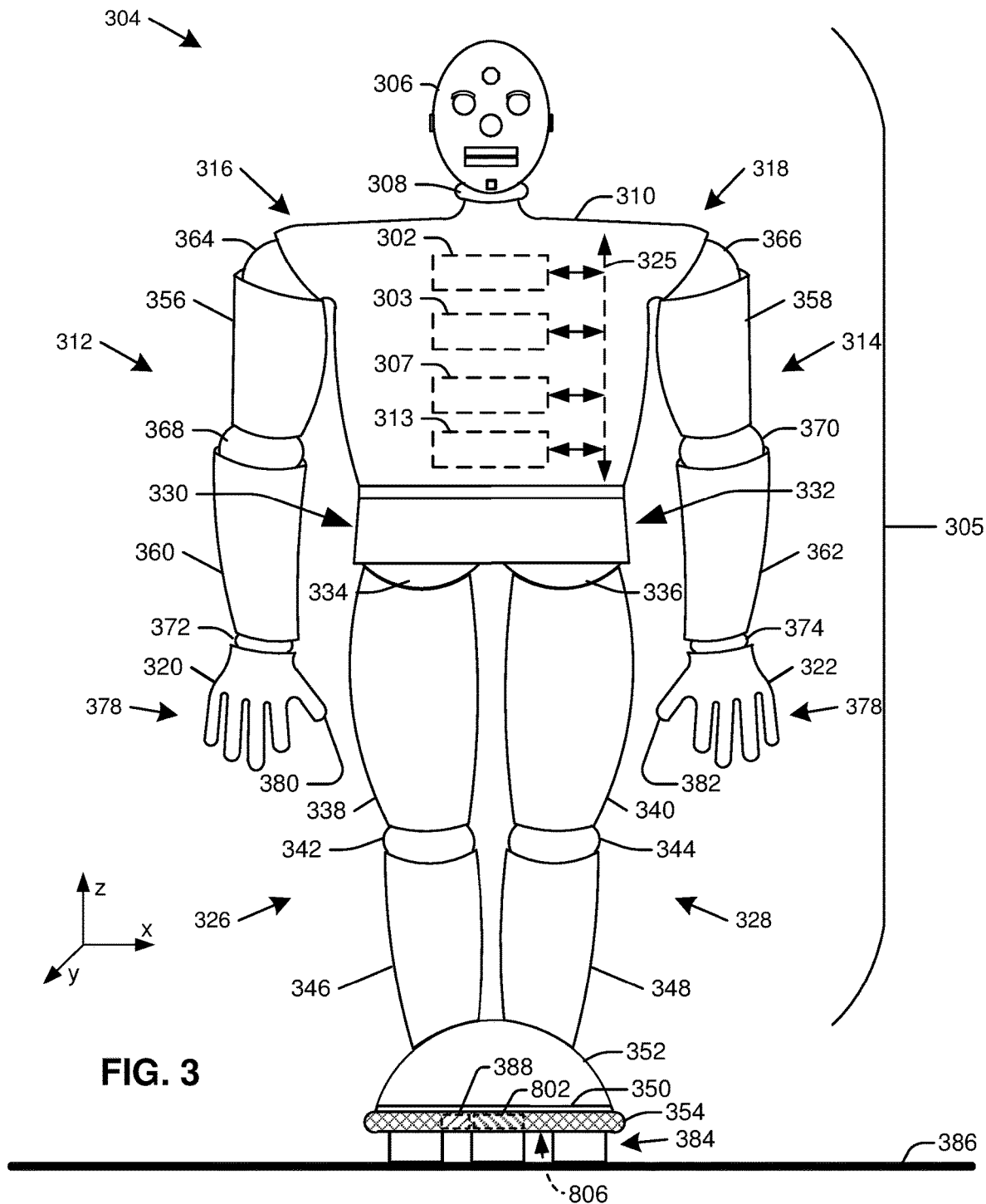
FIG. 3 is an illustration depicting a second embodiment of a mobile robotic device, in accordance with aspects described herein.

FIG. 3 is an illustration depicting a second embodiment of a mobile robotic device 304 (similar to 204, FIGS. 2 and 104, FIG. 1), in accordance with aspects described herein. In the second embodiment, the enclosure 305 (206, FIG. 2) takes on a humanoid shape and appearance. The humanoid shape and appearance of the enclosure 305 will be maintained in the remainder of this description; however, use of the humanoid shape is for exemplary purposes only.

In accordance with one aspect, the mobile robotic device 304 includes an enclosure 305 (similar to 206, FIG. 2) having a humanoid shape. The mobile robotic device 304 further includes a first fog Internet of Things (IoT) gateway processor (first fog IoT gateway processor 302) (similar to 208, FIG. 2) within the enclosure 305. The mobile robotic device 304 further includes a first memory device 303 (similar to 210, FIG. 2) coupled to the first fog IoT gateway processor 302 within the enclosure 305. The mobile robotic device 304 further includes a first plurality of sensors and input/output devices 307 (similar to 212, FIG. 2) coupled to the first fog IoT gateway processor 302 within the enclosure 305. The mobile robotic device 304 further includes a battery 313 (similar to 213, FIG. 2), such as a rechargeable battery with AC charging and solar charging capabilities (e.g., a built-in battery pack). The mobile robotic device 304 further includes a first motion base 350 (similar to 214, FIG. 2), responsive to commands of the first fog IoT gateway processor 302.

In accordance with one aspect, the first motion base 350 has a first housing 352 coupled to the enclosure 305. In accordance with some aspects, the enclosure 305 is the enclosure 305 coupled to the first housing 352. In other words, the enclosure 305 and the first housing 352 together form one structural feature that may be referred to as the enclosure 305. In still other words, the enclosure 305 and the first housing 352 are one in the same. The first motion base 350 may have a first plurality of omnidirectional wheels 384, wherein at least three of the first plurality of omnidirectional wheels 384 are configured to drive and steer the first motion base 350 on a surface 386. The mobile robotic device 304 may be holonomic. Use of the first plurality of omnidirectional wheels 384 enables the mobile robotic device 304 to freely move in any direction and the controllable degrees of freedom is equal to the total degrees of freedom. Each omnidirectional wheel can rotate in both the x-axis and the y-axis making the omnidirectional wheel move in both the directions. The first motion base 350 may additionally include a first bumper 354, configured to stop and/or alter a direction of travel of the first motion base 350 when the first bumper 354 contacts an obstacle. The first motion base 214 may also include a communications and/or power connector 388, which may mate with a corresponding communications and/or power connector (not shown) on the lifting platform 630, FIG. 6. The first motion base may also include a programmable first reversible polarity magnet 802, FIG. 8. Additionally, the first motion base may include part of an inductive charging structure 806, FIG. 8, that may be used to wirelessly charge the battery 313 of the mobile robotic device 304. The first fog IoT gateway processor 302, first memory device 303, first plurality of sensors and input/ output devices 307, battery 313, first motion base 350, and other components may all be coupled via a communication/power bus 325.

In accordance with one example, the mobile robotic device 304 may have a height of about three feet to about six feet. In accordance with another example, the mobile robotic device 304 may have a height of about four feet to about five and one-half feet. In accordance with still another example, the mobile robotic device 304 may have a height of about five feet and four inches. These heights are not limiting; the mobile robotic device 304 may have any height that does not alter the center of gravity of the mobile robotic device 304 to a point where the mobile robotic device 304 loses stability and/or easily tips over.

In order to provide the mobile robotic device 304 with an enclosure 305 having a humanoid shape, the enclosure 305 of the mobile robotic device 304 may have a head 306, a torso 310, an articulated right arm 312, an articulated left arm 314, an articulated right hand 320, an articulated left hand 322, a right leg 326, and a left leg 328. Additional details about features of the head 306 are provided in FIG. 4 and the text associated therewith.

As stated, the mobile robotic device 304 may include a head 306. The mobile robotic device 304 may further include a motorized neck joint 308, which may be responsive to commands from the first fog IoT gateway processor 302. The motorized neck joint 308 may be coupled to the head 306 and may provide yaw and pitch mobility to the head 306. The mobile robotic device 304 may also include a torso 310 coupled to the motorized neck joint 308 at an upper end of the torso 310. The mobile robotic device 304 may still further include a motorized waist joint 324, responsive to commands from the first fog IoT gateway processor 302, coupled to the torso 310 at a lower end of the torso 310 and providing yaw mobility to the torso 310. According to one aspect, the head may include first motorized joints and first optical encoders to rotate the head plus or minus about 20 degrees from a vertical plane bisecting the robotic device symmetrically into a right side and a left side, and about 10 degrees from a horizontal plane perpendicular to the vertical plane, and the torso may include second motorized joints and second optical encoders to rotate the torso plus or minus about 10 degrees from the vertical plane.

The mobile robotic device 304 may further include at least one arm, such as an articulated right arm 312 and/or an articulated left arm 314, responsive to commands from the first fog IoT gateway processor 302, respectively coupled to the torso 310 at a right shoulder portion 316 of the torso 310 and a left shoulder portion 318 of the torso 310. The articulated right arm 312 and articulated left arm 314 may include a right bicep portion 356 and a left bicep portion 358, respectively. The articulated right arm 312 and articulated left arm 314 may include a right forearm portion 360 and a left forearm portion 362, respectively. The right shoulder portion 316 and the right bicep portion 356 may be joined therebetween by a motorized right shoulder joint 364. The left shoulder portion 318 and the left bicep portion 358 may be joined therebetween by a motorized left shoulder joint 366. The right bicep portion 356 and the right forearm portion 360 may be joined therebetween by a motorized right elbow joint 368. The left bicep portion 358 and the left forearm portion 362 may be joined therebetween by a motorized left elbow joint 370. According to one aspect, at least one arm includes at least one of an electromagnetic field (EMF) sensor and a radio frequency identification (RFID) sensor.

The mobile robotic device 304 may further include an articulated right hand 320 and an articulated left hand 322, responsive to commands from the first fog IoT gateway processor 302, respectively coupled to the articulated right arm 312 and articulated left arm 314 at lower ends of the respective articulated right arm 312 and articulated left arm 314. For example, the right forearm portion 360 and the articulated right hand 320 may be joined therebetween by a motorized right wrist joint 372. The left forearm portion 362 and the articulated left hand 322 may be joined therebetween by a motorized left wrist joint 374. Together, the motorized right shoulder joint 364, motorized right elbow joint 368, and motorized right wrist joint 372 may provide for yaw, pitch, and roll mobility for the articulated right hand 320. Together, the motorized left shoulder joint 366, motorized left elbow joint 370, and motorized left wrist joint 374 may provide for yaw, pitch, and roll mobility for the articulated left hand 322. The articulated right hand 320 includes at least one right finger 376, which includes at least one motorized knuckle joint (not shown), and a right thumb 380, which includes at least one motorized knuckle joint (not shown). Although five right fingers are illustrated, at least one right finger 376 is acceptable. The articulated left hand 322 includes at least one left finger 378, which includes at least one motorized knuckle joint (not shown), and a left thumb 382, which includes at least one motorized knuckle joint (not shown). Although five left fingers are illustrated, at least one left finger 378 is acceptable.

The mobile robotic device 304 may also include a right leg 326 and a left leg 328 respectively coupled to the torso 310 at a right hip portion 330 of the torso 310 and a left hip portion 332 of the torso 310. In accordance with some aspects, the right leg 326 and the left leg 328 may not be articulated and may be rigidly or semi-rigidly coupled to the right hip portion 330 and the left hip portion 332, respectively. In other words, in accordance with some aspects, the right leg 326 and the left leg 328 may be fixed to the first motion base 350 and/or may be fixed to the first housing 352. In accordance with some aspects, the right leg 326 and the left leg 328 may be partially articulated. When partially articulated, the right leg 326 and left leg 328 may include a motorized right hip joint 334 and a motorized left hip joint 336, responsive to commands from the first fog IoT gateway processor 302. The motorized right hip joint 334 may couple therebetween the right hip portion 330 and a top of the right leg 326 (at a right thigh portion 338). The motorized left hip joint 336 may couple therebetween the left hip portion 332 and a top of the left leg 328 (at a left thigh portion 340). The motorized right hip joint 334 and the motorized left hip joint 336 may provide at least yaw mobility to the torso 310. When partially articulated, the right leg 326 and left leg 328 may (or may not) include a motorized right knee joint 342 and a motorized left knee joint 344, responsive to commands from the first fog IoT gateway processor 302, respectively. The motorized right knee joint 342 (if present) may couple therebetween a bottom of the right thigh portion 338 and a top of a right calf portion 346. The motorized left knee joint 344 (if present) may couple therebetween a bottom of the left thigh portion 340 and a top of a left calf portion 348. The motorized right knee joint 342 and the motorized left knee joint 344 may provide at least yaw mobility to the right thigh portion 338 and the left thigh portion 340, respectively. In accordance with some aspects, without regard to whether the right leg 326 and left leg 328 are articulated, a lower end of each of the right leg 326 and the left leg 328 are coupled to a first motion base 350. Such coupling may occur such that all, some, or none of the right calf portion 346 and left calf portion 348 are visible between a top of the first housing 352 of the first motion base 350 and right and left knees, represented by motorized right knee joint 342 and motorized left knee joint 344, respectively. In accordance with some aspects, right and left ankle joints (not shown), that are motorized or not motorized, and right and left feet (not shown) are acceptable components of a mobile robotic device 304 as described herein.

The mobile robotic device 304 may still further include the first motion base 350, responsive to commands of the first fog IoT gateway processor 302. The first motion base 350 may have the first housing 352 covering the first motion base 350. The first motion base 350 may have the first bumper 354 that surrounds some or all of the first motion base 350 (similar to first bumper 222 of FIG. 2). The first bumper 354 may surround some or all of the first motion base 350 at a lower outside portion thereof. In some aspects, the first bumper 354 surrounds at least some the first motion base 350 at an outermost lower portion thereof. In some aspects, the first bumper 354 surrounds all of the first motion base 350 at an outermost lower portion thereof. When the first bumper 354 contacts an obstacle, feedback provided to the first fog IoT gateway processor 302 may cause the mobile robotic device 304 to stop its motion along the surface 386 and/or alter course. The first motion base 350 may be coupled to a lower end of each of the right leg 326 and the left leg 328. The first motion base 350 may have a first plurality of omnidirectional wheels 384, where at least three of the first plurality of omnidirectional wheels 384 are coupled to respective first motion base wheel encoders (not shown, but similar to 624, FIG. 6C), first motion base drive motors (not shown, but similar to 628, FIG. 6C), and first motion base steering motors (not shown, but similar to 626, FIG. 6C), and are configured to drive and steer the first motion base 350 on the surface 386. Use of at least three omnidirectional wheels allows the first motion base 350 to proceed in any direction along the surface 386. For example, use of at least three omnidirectional wheels allows the first motion base 350 to crab along the surface 386, in addition to allowing the first motion base 350 to move forward, backward, laterally left and right, and rotate a full 360 degrees about a substantially stationary point on the surface 386. At least because the first motion base 350 can move in any direction, the mobile robotic device 304 may be described as a holonomic mobile robotic device 304.

Figure 4:
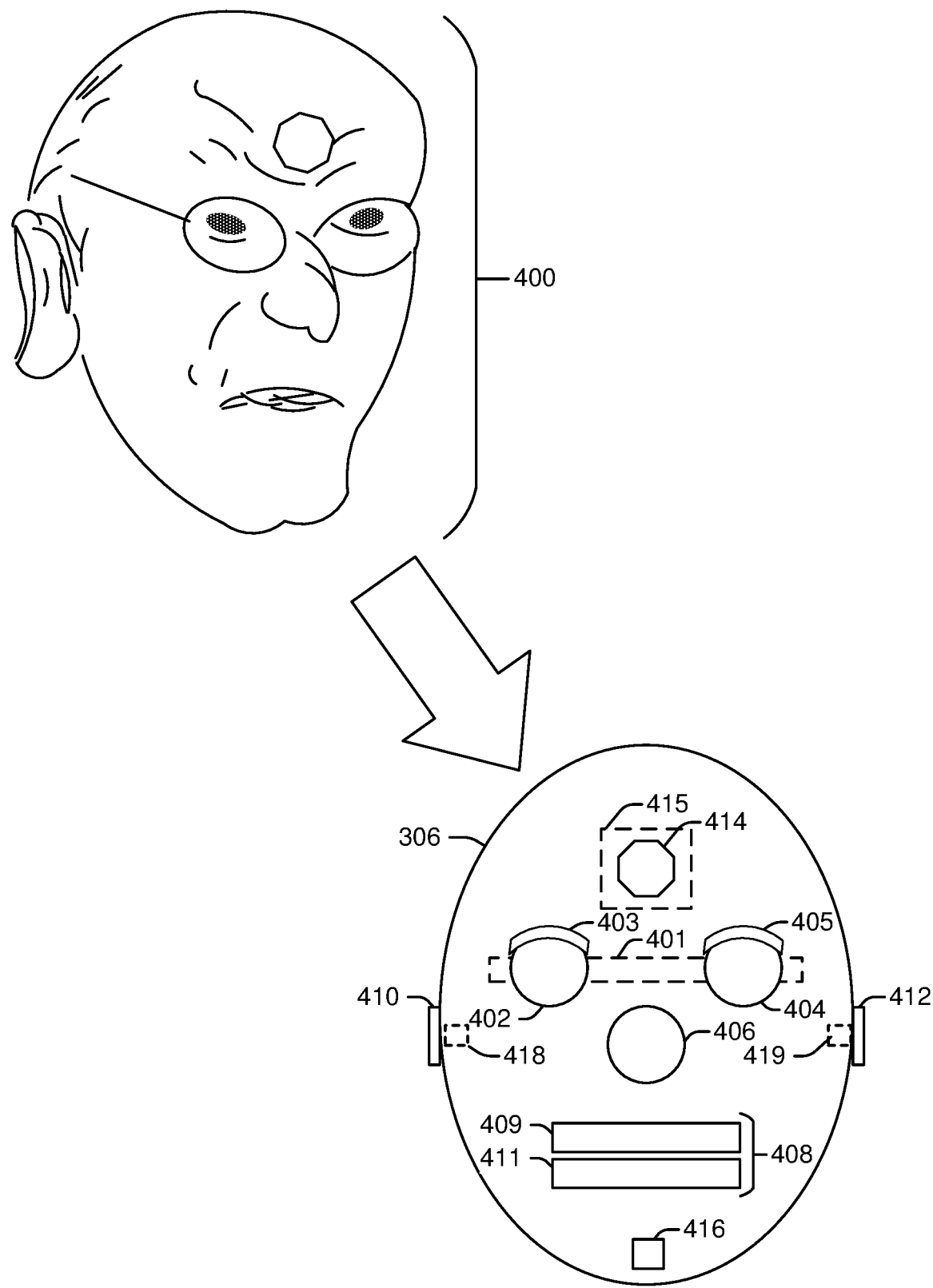
FIG. 4 is an illustration of the head of FIG. 3 with reference numbers provided for some exemplary features illustrated on or in the head, and an indication that the head may facilitate removably secure placement of a face mask, in accordance with aspects described herein.

FIG. 4 is an illustration of the head 306 of FIG. 3 with reference numbers provided for some exemplary features illustrated on or in the head 306, and an indication that the head 306 may facilitate removably secure placement of a face mask 400, in accordance with aspects described herein. In the example of FIG. 4, the face mask 400 is configured to resemble a human face. In the specific example of FIG. 4, the human face is a replica of the face of the psychologist Carl Jung. Replicas of other human faces, or of any kind of face (from history, present day, or the imagination) are acceptable. FIG. 4 depicts one possible layout of apertures on the head 306. The apertures include, for example a right eye aperture 402 and left eye aperture 404. A stereoscopic camera 401 having at least two lenses may be positioned behind the right eye aperture 402 and left eye aperture 404. The stereoscopic camera may be configured to extract three-dimensional information from a scene. A motorized right eyelid 403 and a motorized left eyelid 405 may be responsive to commands from the first fog IoT gateway processor 302. The motors for the motorized right eyelid 403 and a motorized left eyelid 405 may be included within the head 306. The head 306 may include a nose aperture 406. An air analysis sensor may be positioned behind the nose aperture 406. A mouth aperture 408, which may include an upper lip 409 and a lower lip 411. The upper lip 409 and/or the lower lip 411 may be motorized. The motorized lower lip and left and right motorized eyelids may be configured to be driven between a continuous plurality of open and closed states. In accordance with one aspect, the lower lip 411 is motorized. This enables, for example, the lower lip 411 to move to simulate the opening and closing of the mouth aperture 408, or the upward and downward motion of a chin or jaw (not shown). The motor or motors for opening and closing the upper lip 409 and/or the lower lip 411 may be included within the head 306. One or more speakers (not shown) may be positioned behind the mouth aperture 408. Protuberances with apertures, or apertures flush with the sides of the head 306 may be positioned on the right and left sides of the head 306. For example, right ear aperture 410 and left ear aperture 412 may be included with the head 306. One or more microphones may be positioned behind right ear aperture 410 and left ear aperture 412. According to one aspect, at least a pair of microphones 418, 419 may be positioned behind right ear aperture 410 and left ear aperture 412. In addition to apertures located on the head 306 as would typically be found on a human being, the head 306 may also include a projector aperture 414. A projector 415 may be positioned behind the projector aperture 414. The head 306 may also have a securing feature 416 that provides for the removably secure placement, onto the head 306, of the face mask 400. The securing feature 416 may, in one aspect, resemble a geometric shape that protrudes from the chin area of the head 306. Alternative and/or additional features that provide for the removably secure placement of the face mask 400 are acceptable. The head 306 may also have an infrared optical sensor (not shown) configured for thermography. According to one aspect, the head 306 may include a plurality of input and output devices, a face mask 400 having openings for the plurality of input and output devices, and a securing feature 416 configured to removably secure the face mask 400 to the head 306.

Figure 5:
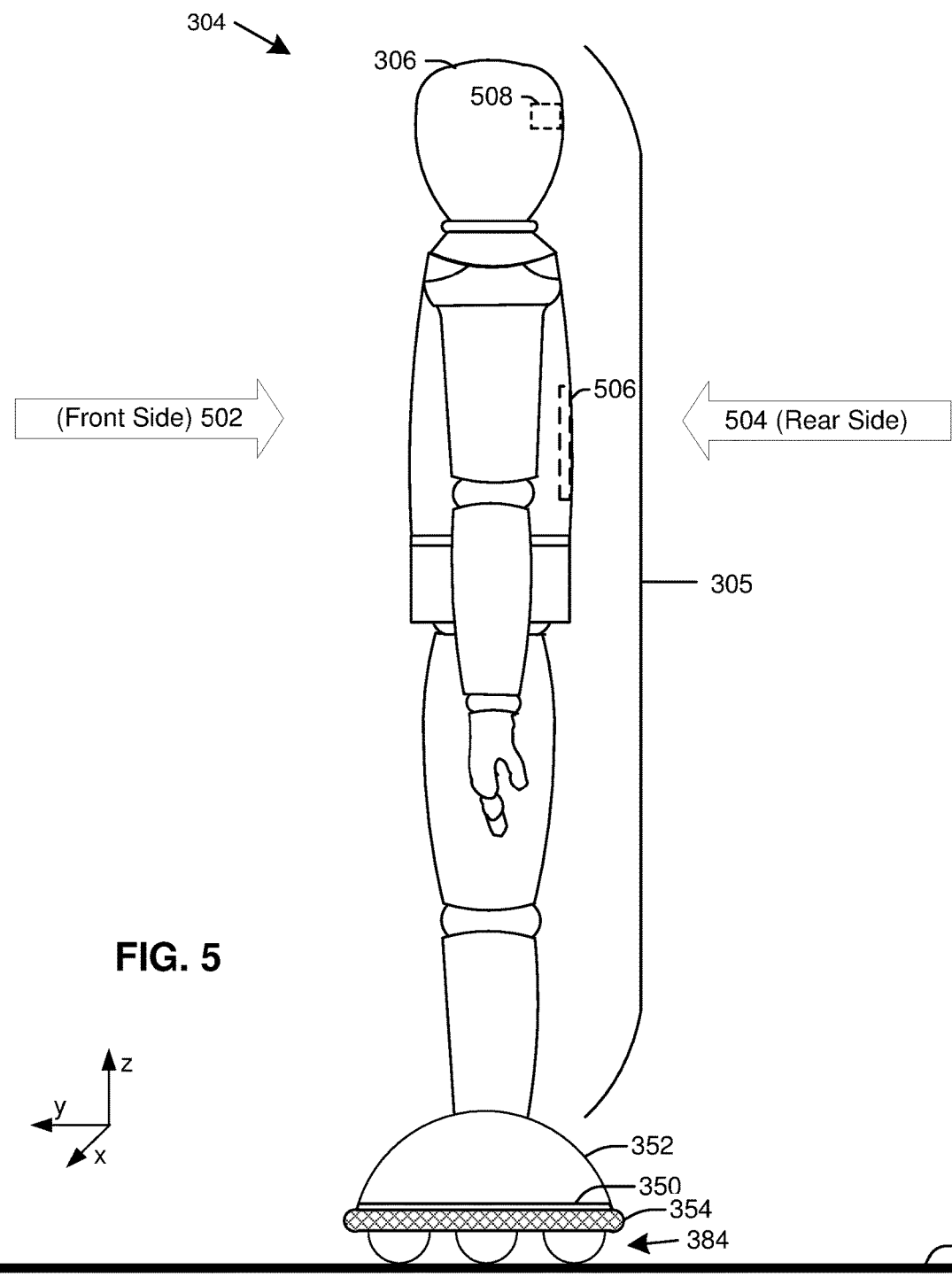
FIG. 5 is a right side elevation view of the mobile robotic device of FIG. 3.

FIG. 5 is a right side elevation view of the mobile robotic device 304 of FIG. 3. A conventional forward direction of movement would be toward the left side of the page. A first arrow identifies a front side 502 and a second arrow identifies an opposing rear side 504 of the mobile robotic device 304. A touch screen 506 for, for example, management, configuration, and/or debugging of the first fog Internet of Things (IoT) gateway processor (108, FIG. 1; 208, FIG. 2, 302, FIG. 3) may be located on a rear side 504 of the enclosure 305. The touch screen 506 may be concealed behind a door or panel (not shown). A rear-facing navigation and/or object avoidance camera 508 may be placed, for example, in the head 306, adjacent to a rear side of the head 306. The rear-facing navigation and/or object avoidance camera 508 may be monocular or stereoscopic. LiDAR may be used in conjunction with, or may be used in place of, the rear-facing navigation and/or object avoidance camera 508. The rear-facing navigation and/or object avoidance camera 508 may be used, for example, when the mobile robotic device 304 moves, for whatever reason, toward the rear (e.g., backs up, reverses).

FIG. 5 includes an illustration of the enclosure 305 having a humanoid shape and a first motion base 350. The first motion base 350 includes the first housing 352, the first bumper 354, and a first plurality of omnidirectional wheels 384. The first plurality of omnidirectional wheels 384 travel on the surface 386.

The mobile robotic device 304 of FIG. 3, 204 of FIG. 2, 104 of FIG. 1 may additionally or alternatively include one or more of: a battery, such as a battery with AC charging and solar charging capabilities (e.g., a built-in battery pack); a projection mouse and/or a projection keyboard, where the projection mouse and/or keyboard are virtual operational representations of a hardware mouse and/or a hardware keyboard (e.g., optical virtual); and a communication interface (e.g., 902, FIG. 9) supporting: at least one or more of: 2G/3G/4G/LTE/5G cellular phone; Bluetooth®; Bluetooth® Basic Rate/Enhanced Data Rate (BR/EDR); Bluetooth® Low Energy (BLE); Zigbee; WiFi; WiFi HaLow™ (low power, long range WiFi); ANT™ (ultra-low power (ULP) wireless protocol that is responsible for sending information wirelessly from one device to another device); ANT+™ (wireless technology that allows your monitoring devices to talk to each other); LoRA (long range, low power wireless platforms connecting, e.g., sensors, gateways, machines, devices, animals, and people); and low frequency (LF), high frequency (HF), ultra-high frequency (UHF) RFID (radio frequency identification), and Ethernet. Furthermore, the mobile robotic device 304 of FIG. 3, 204 of FIG. 2, 104 of FIG. 1 may additionally or alternatively include one or more of: a stereoscopic camera 401 that uses stereo vision to calculate depth (e.g., an Intel® RealSense™ camera); touch sensor(s), tactile sensor(s), and pressure sensor array(s) on omnidirectional wheels of the first plurality of omnidirectional wheels 384; a high definition camera, which may be positioned, for example, on the torso, for example, toward an upper end of the torso; one or more microphones, for example in the head 306, one or more speakers, for example, in the head 306; wheel encoders on each of the first plurality of omnidirectional wheels 384; ultrasonic range sensor(s), for example on the first motion base (214, FIG. 2, 350, FIG. 3); an inertial measurement unit (IMU), for example in the enclosure (206, FIG. 2, 305, FIG. 3); an indoor positioning system (IPS) to locate objects or people inside a building using radio waves, magnetic fields, acoustic signals, or other sensory information collected by mobile devices, for example in the enclosure (206, FIG. 2, 305, FIG. 3); a satellite-based radio-navigation system such as the Global Positioning System (GPS); optical sensors including, for example: infrared (IR) sensor(s) used for thermography, which may be located, for example, in the head 306; and light detection and ranging (LiDAR) sensors used to map a room in three-dimensions and identify objects therein, which may be located, for example, in and/or on the first motion base (214, FIG. 2, 350, FIG. 3); electromagnetic field (EMF) sensor(s) to measure EMF generated naturally and/or by technology (e.g., power lines, electric motors, radio transmitters, microwave ovens) to assist in an evaluation of the well-being of a user, which may be located, for example, in either or both of the articulated right arm 312 or articulated left arm 314; well-being monitoring/management sensors measuring, for example, air quality, temperature, and humidity, which may be located, for example, in the nose aperture (406, FIG. 4); RFID receiver or transceiver, which may be located, for example, in either or both of the articulated right arm 312 or articulated left arm 314; a water quality sensor (e.g., turbidity), and an optical sensor for measuring microbial life on floor surfaces, which may be located, for example, on an underside of the first motion base 214, FIG. 2, 350. FIG. 3.

In accordance with some aspects, the first fog Internet of Things (IoT) gateway processor (108, FIG. 1; 208, FIG. 2, 302, FIG. 3) may interface to a touch screen 506 for management, configuration, and/or debugging. The touch screen 506 may be located on a rear side 504 of the enclosure 305. The touch screen 506 may be concealed behind a door or access panel (not shown).

In accordance with some aspects, some or all of the material used to fabricate the external shell of the mobile robotic device 304 with an enclosure 305 having a humanoid shape may be transparent. That is, some or all of the enclosure 305 of the mobile robotic device 304 including the head 306, the torso 310, the articulated right arm 312, the articulated left arm 314, the articulated right hand 320, the articulated left hand 322, the right leg 326, and the left leg 328 may be transparent. In accordance with some aspects, a human-like skeleton (an internal framework of simulated bones) (not shown) may be enclosed within the humanoid shape.

In accordance with some aspects, smart light emitting diodes or other light emitting devices, may be located adjacent to some or all of the motorized neck joint 308, motorized waist joint 324, motorized right hip joint 334, motorized left hip joint 336, motorized right knee joint 342 (if present), motorized left knee joint 344 (if present), motorized right shoulder joint 364, motorized left shoulder joint 366, motorized right elbow joint 368, motorized left elbow joint 370, motorized right wrist joint 372, and motorized left wrist joint 374, and may light when each joint is used.

In accordance with some aspects, the mobile robotic device 304 may include LEDs in the right eye aperture 402 and left eye aperture 404 (and/or other apertures) that illuminate when the projector 415 is used and/or when the stereoscopic camera 401 is used. Still further, the mobile robotic device 304 may include at least one LED, for example on the torso 310 that may illuminate a unique color for each of the modes of operation (e.g., there may be 7 modes of operation) that the mobile robotic device 304 may be in.

Mobile Robotic Docking Station

Figure 6A:
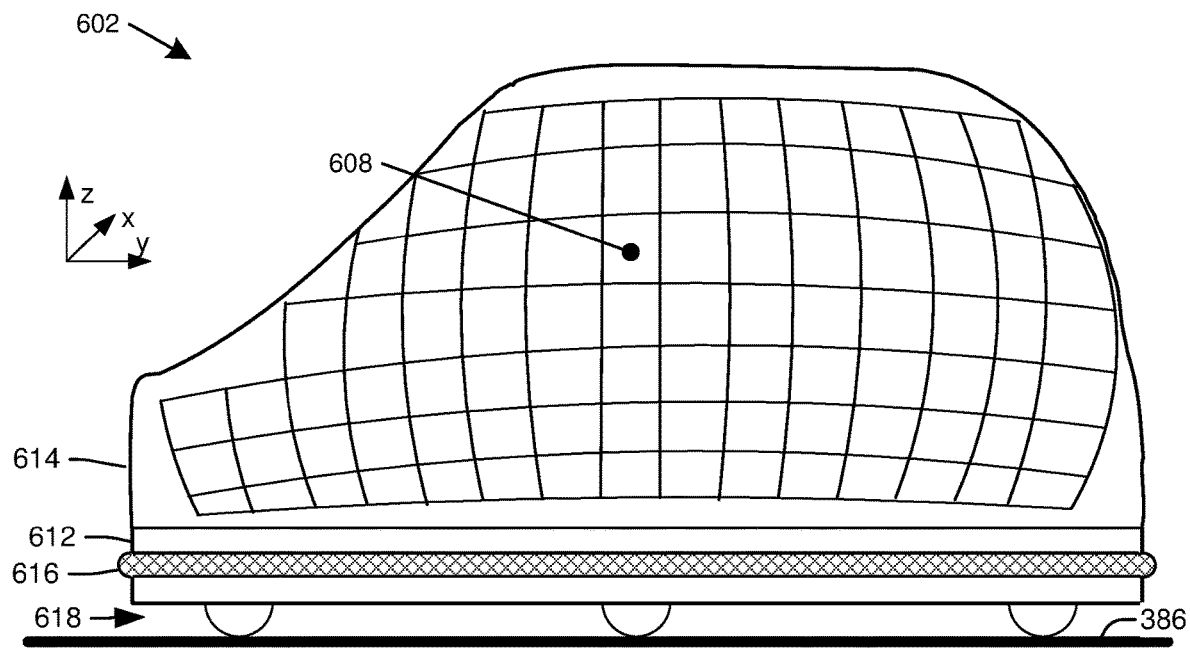
FIG. 6A is a left side elevation view of a mobile robotic docking station, in accordance with aspects described herein.
Figure 6B:
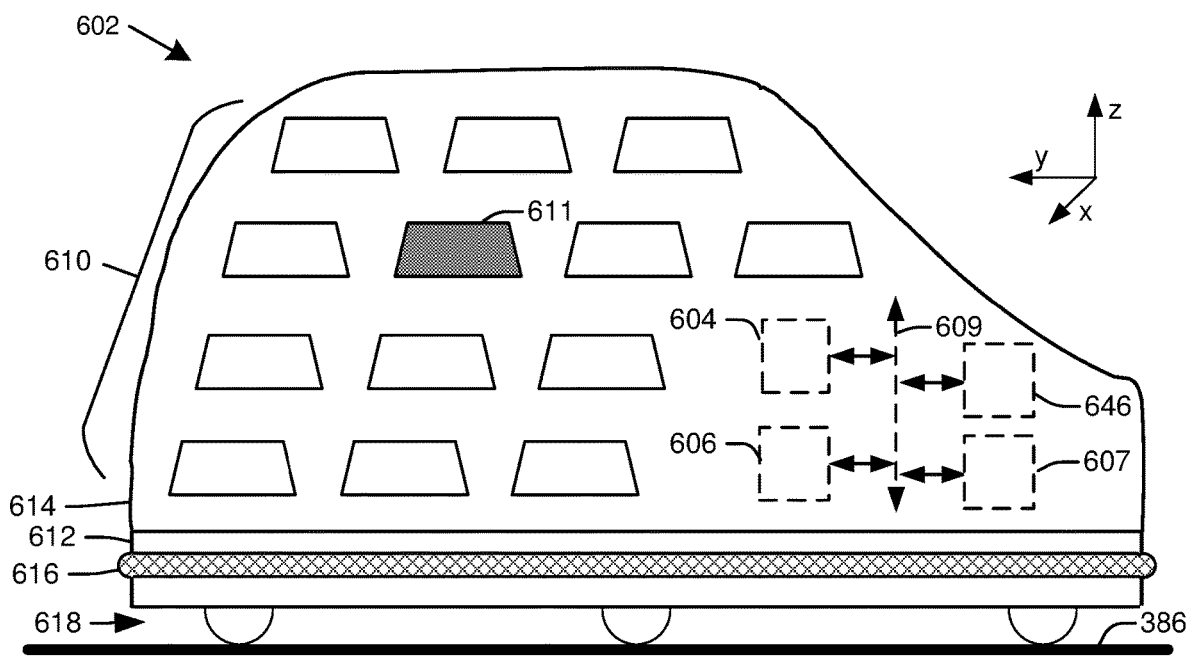
FIG. 6B is a right side elevation view of the mobile robotic docking station, in accordance with aspects described herein.

FIG. 6A is a left side elevation view of a mobile robotic docking station 602 (similar to 106, FIG. 1), in accordance with aspects described herein. In accordance with some aspects, the mobile robotic docking station 602 may be an autonomous mobile robotic docking station. FIG. 6B is a right side elevation view of the mobile robotic docking station 602, in accordance with aspects described herein. In accordance with one aspect, the mobile robotic docking station 602 may have an oval shape, and may be reminiscent of, for example, a chariot or an automobile. However, any shape is acceptable. The mobile robotic docking station 602 includes a second fog Internet of Things (IoT) gateway processor (second fog IoT gateway processor 604), a second memory device 606 coupled to the second fog IoT gateway processor 604, a battery 646, and a second plurality of sensors and input/output devices 607 coupled to the second fog IoT gateway processor 604. The second fog IoT gateway processor 604, second memory device 606, and second plurality of sensors and input/output devices 607, battery, and other devices may be coupled to a communication/power bus 609.

The mobile robotic docking station 602 may still further include a second motion base 612, responsive to commands of the second fog IoT gateway processor 604. The second motion base 612 may have a second housing 614 covering the second motion base 612. The second motion base 612 may have a second bumper 616 around its circumference that surrounds some or all of the second motion base 612. The second bumper 616 may surround some or all of the second motion base 612 at a lower outside portion thereof.

In some aspects, the second bumper 616 surrounds at least some the second motion base 612 at an outermost lower portion thereof, with an exception of an open recess 648 (FIG. 6C) in the mobile robotic docking station 602, which receives the mobile robotic device, such as the mobile robotic device 204 of FIG. 2 or the mobile robotic device 304 of FIG. 3. When the second bumper 616 contacts an obstacle, feedback provided to the second fog IoT gateway processor 604 may cause the mobile robotic docking station 602 to stop its motion along the surface 386 and/or alter course. The second motion base 612 may have a second plurality of omnidirectional wheels 618.

The mobile robotic docking station 602 includes a plurality of solar cells 608. In accordance with one aspect, the plurality of solar cells 608 may be presented as a flexible solar panel. The solar cells 608 may be used to power the mobile robotic docking station 602, charge battery 646 of the mobile robotic docking station 602, and may also be used to charge a battery 213, 313 of mobile robotic device, such as the mobile robotic device 204 of FIG. 2 or the mobile robotic device 304 of FIG. 3, when the mobile robotic device is docked within the mobile robotic docking station 602. The plurality of solar cells 608 may cover some or all of the right side of the mobile robotic docking station 602. However, in accordance with some aspects, the plurality of solar cells 608 may be on the right side, left side, or a combination of right and left sides of the mobile robotic docking station 602. According to some aspects, the mobile robotic docking station 602 may maintain at least a portion of the plurality of solar cells 608 that are mounted to the mobile robotic docking station 602 in direct sunlight during a plurality of hours of daylight by adjusting a position, on a first surface, of the mobile robotic docking station 602 throughout a day using steering motors (e.g., a steering motor 626) and drive motors (e.g., a drive motor 628) coupled to wheels (e.g., omnidirectional wheel 622) of the mobile robotic docking station 602.

The mobile robotic docking station 602 includes a plurality of drawers 610 (or other types of storage containers/receptacles). The plurality of drawers 610 may cover or occupy some or all of the left side of the mobile robotic docking station 602. However, in accordance with some aspects, the plurality of drawers 610 may be on the left side, right side, or a combination of right and left sides of the mobile robotic docking station 602.

The plurality of drawers 610 may each include a sensor or input/output device of the second plurality of sensors and input/output devices 607. The second plurality of sensors or input/output devices 607 may include biometric sensors, a brain stimulation device, a headset, and any other sensor or input/output device. Some or all of the second plurality of sensors or input/output devices 607, which are stored in the plurality of drawers 610 may be withdrawn by a user from a respective drawer of the plurality of drawers 610 may be connected wirelessly and/or by cable, such as a stretchable cable, to the second fog IoT gateway processor 604.

In accordance with one aspect, the sensors may measure, for example, human heart rate, body temperature, oxygen level, breathing rate, heart rate variability, basal body temperature, eye tracking, EEG (electroencephalography), GSR (galvanic skin response), ECG (electrocardiogram), EMG (electromyography) and respiration. Other sensors are acceptable.

In addition to sensors, the plurality of drawers 610 may house one or more output devices, such as a brain stimulator to stimulate the secretion of endorphins, serotonin, dopamine, and oxytocin, which may be referred to as the four happy hormones.

Furthermore, although the mobile robotic docking station 602 includes the second plurality of sensors and input/output devices 607, a user may additionally possess wearable biometric sensors, such as watches, bands, and necklaces. These too can be wirelessly connected to the second fog IoT gateway processor 604 (and/or the first fog IoT gateway processor 208, 302) via wireless communication such as Bluetooth and Wi-Fi. Still further, drone data surveilling ones outside property can be wirelessly connected to the second fog IoT gateway processor 604 (and/or the first fog IoT gateway processor 208, 302) via wireless communication such as Bluetooth and Wi-Fi or some other local area network standard.

According to one aspect, the mobile robotic docking station 602 may include a plurality of solar cells 608 configured to charge a battery 646 of the mobile robotic docking station 602 and a battery 313 of the mobile robotic device 304, and a plurality of drawers 610 that each house at least one sensor or device connected to a communication interface 1002 of the mobile robotic docking station 602 by a stretchable cable (not shown). The at least one sensor or device may be, for example, at least one of: a heart rate sensor, a body temperature sensor, an oxygen level sensor, a breathing rate sensor, a heart rate variability sensor, a basal body temperature sensor, an eye tracking sensor, an electroencephalography (EEG) sensor, a galvanic skin response (GSR) sensor, an electrocardiogram (ECG) sensor, an electromyography (EMG) sensor, a respiration sensor, an aura sensor, and ultrasound tomography sensor, a scalp/hair magnifier microscope device, a dental intraoral camera device, a digital otoscope device, a digital toothbrush device, a brain stimulator device configured to stimulate secretion of dopamine, oxytocin, serotonin, and endorphins, and a biosonics headset device.

When a sensor or input/output device is removed from a drawer, such as the drawer 611 in FIG. 6, an indicator, such as an LED or luminescent panel, my illuminate to provide users with notice that the drawer 611 is empty. This may prompt a user to locate the sensor or input/output device that belongs in the drawer 611, and to return the sensor or input/output device to the drawer 611. In the exemplary illustration of FIG. 6B, the face of the drawer 611 is illuminated using a fluorescent panel. A user may ask the mobile robotic docking station 602 "what belongs in drawer 611" for example. The mobile robotic docking station 602 may have an inventory of all items in the plurality of drawers 610 and may reply, for example, "a dental intraoral camera belongs in drawer 611." In accordance with some aspects, the mobile robotic docking station 602 may have an ability to locate the missing object within the confines of the home or business in which the mobile robotic docking station 602 is operating.

Figure 6C:
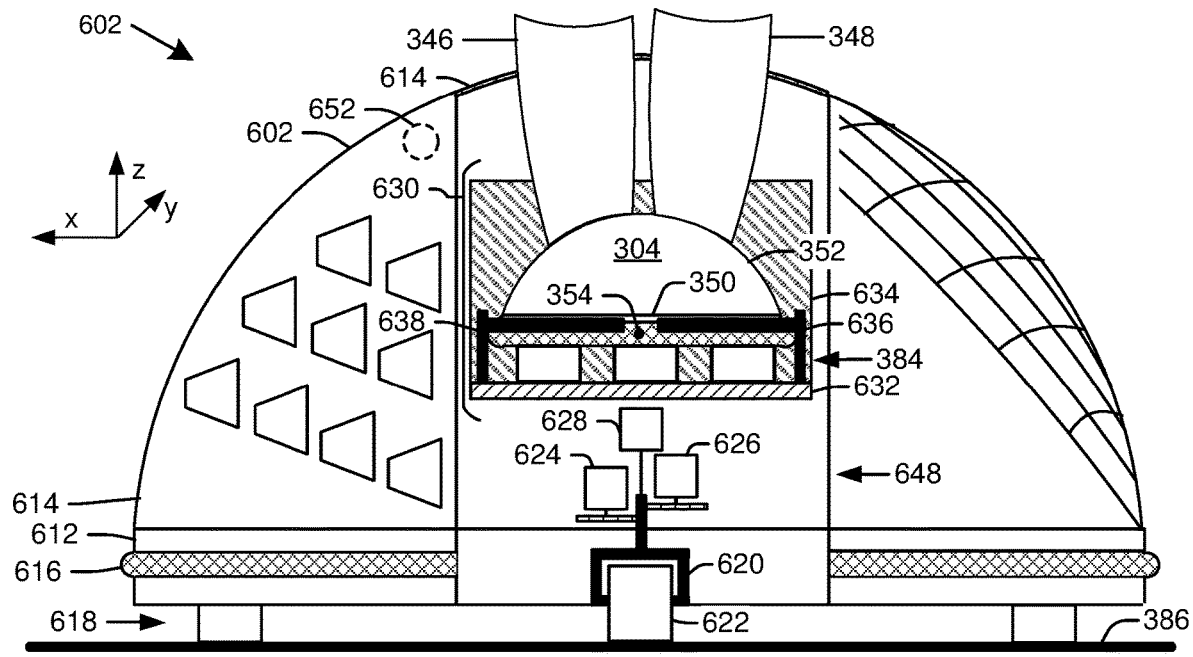
FIG. 6C is a rear elevation view of the mobile robotic docking station, in a state where the first motion base and its first plurality of wheels (e.g., are lifted up on a lifting platform within an open recess in the mobile robotic docking station, in accordance with aspects described herein.
Figure 8:
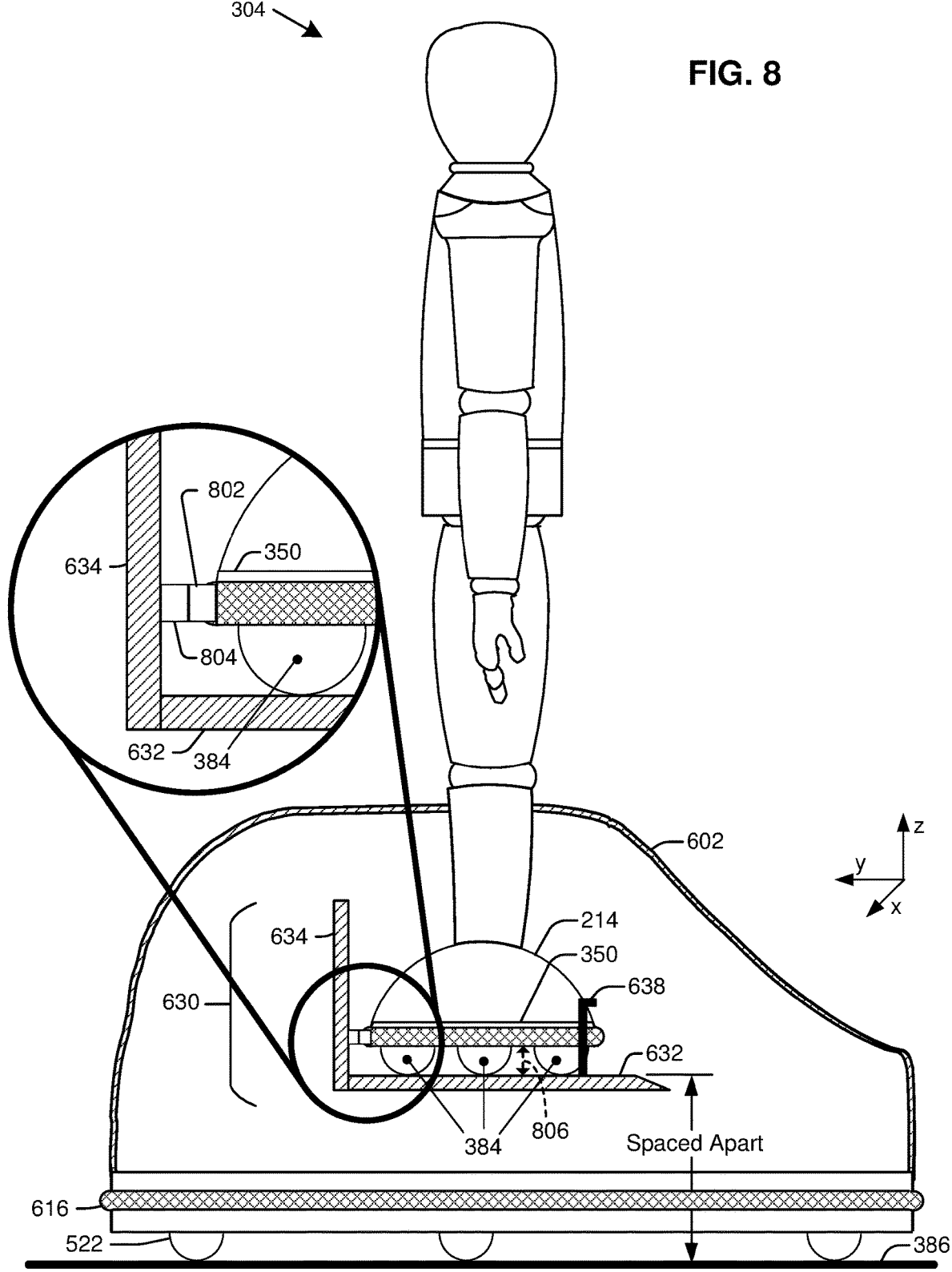
FIG. 8 is a right side partial cut-away elevation view of a mobile robotic device secured to a lifting platform, within the mobile robotic docking station, when the lifting platform is lifted to a predetermined height to space apart (e.g., physically separate with an open-air space therebetween) the lifting platform, and thus a first plurality of omnidirectional wheels, from the surface, in accordance with aspects described herein.

FIG. 6C is a rear elevation view of the mobile robotic docking station 602, in a state where the first motion base 350 and its first plurality of omnidirectional wheels 384 are lifted up on a lifting platform 630 within an open recess 648 (e.g., an alcove, a bay) in the mobile robotic docking station 602, in accordance with aspects described herein. The lifting platform 630 may, for example, include a lifting base 632, onto which the first plurality of omnidirectional wheels 384 are driven, and a lifting backstop 634, which may, for example, stop the first motion base 350 from forward travel. The lifting platform 630, responsive to commands of the second fog IoT gateway processor 604, may be raised and lowered using, for example, a motor, a jack, a jackscrew (e.g., one or more rotating screws), a hoist, a mechanical jack, or a hydraulic jack. For visual reference, a posterior part of the right calf portion 346 and a posterior part of the left calf portion 348 of the mobile robotic device 304 (FIG. 3), are shown. Also depicted in the illustration of FIG. 6C is a first example of a mechanism configured to releasably secure the first motion base 350 to the lifting platform 630. The mechanism may include a right gate 636 and a left gate 638. The right gate 636 and the left gate 638 may be rotatably mounted to the lifting base 632 and may be motorized. They may be rotated to an open position (not shown) when configured to receive the first motion base 350. After the first motion base 350 is brought onto the lifting base 632, the right gate 636 and left gate 638 may each be rotated inward, where they may, for example, contact the first motion base 350, its first housing 352, its first bumper 354, or any combination thereof or otherwise close, and where they may secure the first motion base 350 to the lifting platform 630 by remaining fixed in a closed position. Other, and/or additional mechanisms or fastener systems configured to releasably secure the first motion base 350, and thus the mobile robotic device 304, to the lifting platform 630 are acceptable. An additional or alternative mechanism or fastener system to secure the first motion base 350 to the lifting platform 630 may include, but is not limited to, a pair of magnets (e.g., 802, 804), where at least one of the pair of magnets is a programmable reversible polarity magnet, as depicted in FIG. 8.

A wheel bogie 620 and its associated one omnidirectional wheel 622 of the second plurality of omnidirectional wheels 618, an encoder 624, a steering motor 626, and a drive motor 628 in the illustration of FIG. 6C. The configuration of the one visible wheel bogie 620, the one omnidirectional wheel 622, the encoder 624, the steering motor 626, and the drive motor 628. is exemplary and non-limiting. Other configurations of the one visible wheel bogie 620, the one omnidirectional wheel 622, the encoder 624, the steering motor 626, and the drive motor 628. are acceptable. In the exemplary aspect illustrated in FIG. 6C, at least three of the second plurality of omnidirectional wheels 618 are coupled to respective wheel bogies, encoders, steering motors, and drive motors. As described herein, a wheel bogie may be a chassis or framework carrying a wheel or a wheelset, attached to a vehicle or motion base, thus serving as a modular subassembly of at least one wheel and axle. The second plurality of omnidirectional wheels 618, comprising at least three omnidirectional wheels including the one omnidirectional wheel 622, are configured to drive and steer the second motion base 612 on the surface 386. Use of at least three omnidirectional wheels allows the second motion base 612 to proceed in any direction along the surface 386. For example, use of at least three omnidirectional wheels allows the second motion base 612 to crab along the surface 386, in addition to allowing the second motion base 612 to move forward, backward, laterally left and right, and rotate a full 360 degrees about a substantially stationary point on the surface 386. At least because the second motion base 612 can move in any direction, the mobile robotic docking station 602 may be described as a holonomic mobile robotic docking station 602.

Also depicted in FIG. 6C is a rear-facing navigation and/or object avoidance camera 652, which may be placed, for example, in a top rear interior of the second housing 614 of the mobile robotic docking station 602. The rear-facing navigation and/or object avoidance camera 652 may be monocular or stereoscopic. LiDAR may be used in conjunction with, or may be used in place of, the rear-facing navigation and/or object avoidance camera 652. The rear-facing navigation and/or object avoidance camera 652 may be used, for example, when the mobile robotic docking station 602 moves, for whatever reason, toward the rear (e.g., backs up, reverses).

Figure 6D:
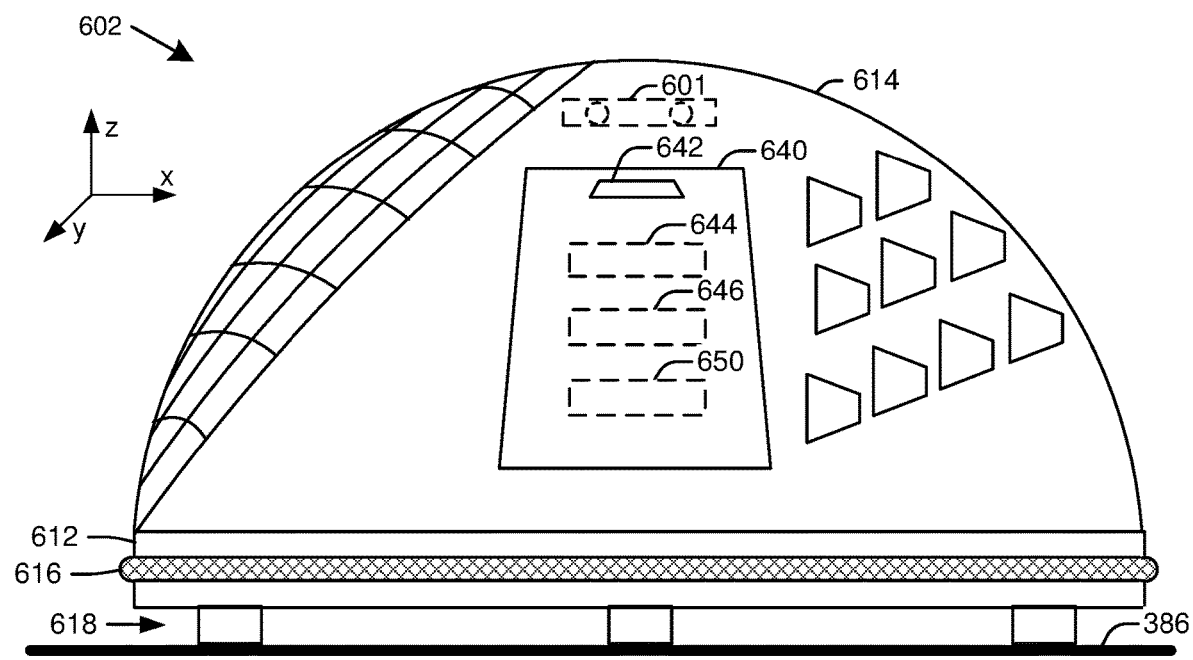
FIG. 6D is a front elevation view of the mobile robotic docking station, in accordance with aspects described herein.

FIG. 6D is a front elevation view of the mobile robotic docking station 602, in accordance with aspects described herein. The mobile robotic docking station 602 may include a door or access panel 640 on or in the second housing 614. Access to components hidden by the second housing 614 may be gained by entrance to the second housing 614 through the door or access panel 640. In accordance with one aspect, a handle 642 may be used to open the door or access panel 640; however other ways to open the door or access panel are acceptable. In accordance with one aspect, a user may gain access to a control panel 644, a battery 646, the second fog IoT gateway processor 604, and/or other electrical subsystems by opening the door or access panel 640.

The mobile robotic docking station 602 may additionally or alternatively include one or more of: a battery 646, such as a rechargeable battery with AC charging and solar charging capabilities (e.g., a built-in battery pack); a projection mouse and/or a projection keyboard, where the projection mouse and/or keyboard are virtual operational representations of a hardware mouse and/or a hardware keyboard (e.g., optical virtual); and a communication interface (e.g., 1002, FIG. 10) supporting: at least one or more of: 2G/3G/4G/LTE/5G cellular phone; Bluetooth®; Bluetooth® Basic Rate/Enhanced Data Rate (BR/EDR); Bluetooth® Low Energy (BLE); Zigbee; WiFi; WiFi HaLow™ (low power, long range WiFi); ANT™ (ultra-low power (ULP) wireless protocol that is responsible for sending information wirelessly from one device to another device); ANT+™ (wireless technology that allows your monitoring devices to talk to each other); LoRA (long range, low power wireless platforms connecting, e.g., sensors, gateways, machines, devices, animals, and people); and Ethernet. Furthermore, the mobile robotic docking station 602 may additionally or alternatively include one or more of: a stereoscopic camera 601 that uses stereo vision to calculate depth (e.g., an Intel® RealSense™ camera) and may be used for navigation and object avoidance; touch sensor(s), tactile sensor(s), and pressure sensor array(s) on omnidirectional wheels of the second plurality of omnidirectional wheels 618; a high definition camera, which may be positioned, for example, on the torso, for example, toward an upper end of the torso; one or more microphones, for example in the second housing 614, one or more speakers, for example, in the second housing 614; wheel encoders on each of the second plurality of omnidirectional wheels 618; ultrasonic range sensor(s), for example on the second motion base 612; an inertial measurement unit (IMU), for example in the second housing 614; an indoor positioning system (IPS) to locate objects or people inside a building using radio waves, magnetic fields, acoustic signals, or other sensory information collected by mobile devices, for example in the second housing 614; a satellite-based radio-navigation system such as the Global Positioning System (GPS); optical sensors including, for example: infrared (IR) sensor(s) used for thermography, which may be located, for example at a top portion of the second housing 614; and light detection and ranging (LiDAR) sensors used to map a room in three-dimensions and identify objects therein (e.g., for navigation and/or object avoidance), which may be located, for example, in and/or on the second housing 614. According to some aspects, the mobile robotic docking station 603 may include at least any three of: a stereoscopic camera configured to extract three-dimensional information from a scene, a pair of microphones, an infrared optical sensor configured for thermography, at least one speaker, a high definition camera, an inertial measurement unit (IMU), an indoor positioning system (IPS), a global positioning system (GPS), touch and tactile sensors, a pressure sensor array coupled to the second plurality of omnidirectional wheels, a set of ultrasonic range sensors, and a light detection and ranging (LiDAR) system.

In accordance with some aspects, the second fog IoT gateway processor 604 may interface to a touch screen 650 for management, configuration, and/or debugging. The touch screen 650 may be located on a front side of the second housing 614 of the mobile robotic docking station 602. The touch screen 650 may be concealed behind a door or access panel 640.

Still further, the mobile robotic docking station 602 may include at least one LED, for example on the front of the second housing 614 that may illuminate a unique color for each of the modes of operation (e.g., there may be 7 modes of operation) that the mobile robotic docking station 602 may be in.

Figure 7:
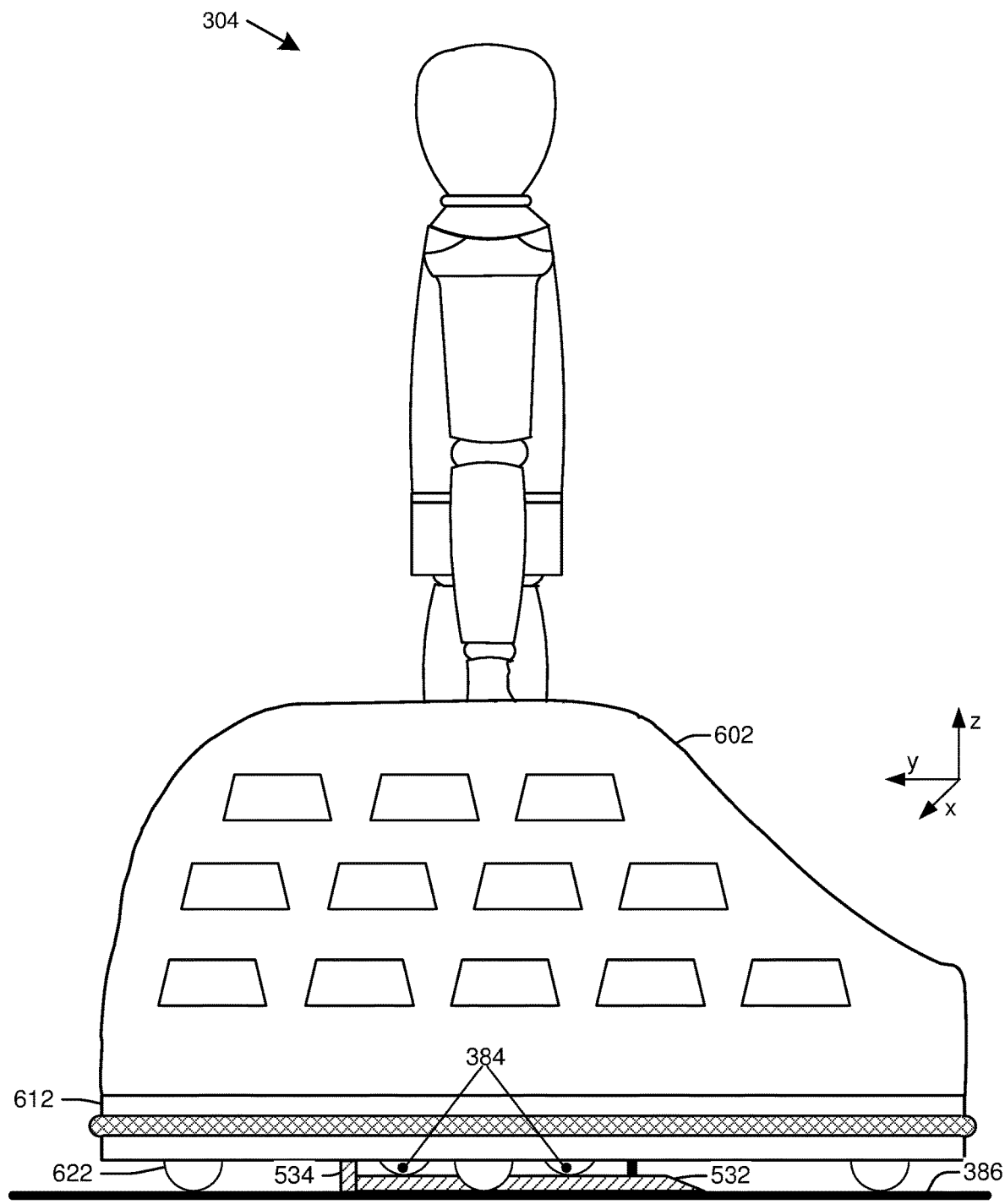
FIG. 7 is a right side plan view of a mobile robotic device, after the mobile robotic device has entered the open recess and has driven itself onto the lifting base of the lifting platform, in accordance with aspects described herein.

FIG. 7 is a right side plan view of a mobile robotic device 304, after the mobile robotic device 304 has entered the open recess (648, FIG. 6C) and has driven itself onto the lifting base 632 of the lifting platform 630, in accordance with aspects described herein. Two of the at least three plurality of omnidirectional wheels 384 are visible below the undercarriage of the mobile robotic docking station 602. An exemplary position of the one omnidirectional wheel 622 of the second plurality of omnidirectional wheels 618 is also visible below the undercarriage of the mobile robotic docking station 602. In the illustration of FIG. 7, the mobile robotic device 304 has driven itself fully onto the lifting platform 630 and has contacted the lifting backstop 634. The contact may be made by, for example, contacting the first bumper 354 (FIG. 3) of the mobile robotic device 304 with the lifting backstop 634. The contact may be made by, for example, contacting a programmable first reversible polarity magnet 802 (FIG. 8) fixed to the first motion base 350 and a programmable second reversible polarity magnet 804 (FIG. 8) (with selectively reversible magnetic poles) fixed to the lifting backstop 634. When the mobile robotic device 304 is fully on the lifting platform 630, the first motion base 350 may be secured by rotating the right gate 636 and left gate 638 to a closed position and/or by ensuring that the programmable first reversible polarity magnet 802 the programmable second reversible polarity magnet 804 faces with opposite poles contacting each other. Other ways to secure the first motion base 350 to the lifting platform 630 are acceptable.

FIG. 8 is a right side partial cut-away elevation view of a mobile robotic device 304 secured to a lifting platform 630, within the mobile robotic docking station 602, when the lifting platform 630 is lifted to a predetermined height to space apart (e.g., physically separate with an open-air space therebetween) the lifting platform 630, and thus the first plurality of omnidirectional wheels 384, from the surface 386, in accordance with aspects described herein. The illustration of FIG. 8 depicts a portion of a first mechanism that may be used to releasably secure the first motion base 350 to the lifting platform 630, namely the left gate 638, which is depicted in a closed state (the right gate 636, which is also in a closed state, is hidden from view and is therefore not shown). An additional or alternative mechanism or fastener system that may be used to releasably secure the first motion base 350, and thus the mobile robotic device 304 to the lifting platform 630 is also depicted. The additional or alternative mechanism or fastener system may include, for example, a programmable first reversible polarity magnet 802 fixed to the first motion base 350 and a programmable second reversible polarity magnet 804 fixed to the lifting backstop 634 at a height corresponding to a height of the programmable first reversible polarity magnet 802.

In accordance with one aspect, the programmable first reversible polarity magnet 802 and the programmable second reversible polarity magnet 804 may be programmed to attract or repel one another. When programmed to attract, the attraction between opposite polarity faces of the programmable first reversible polarity magnet 802 and the programmable second reversible polarity magnet 804 serves to secure the first motion base 350, and thus the mobile robotic device 304, to the lifting platform 630. When programmed to repel, the repulsion between like polarity faces of the programmable first reversible polarity magnet 802 and the programmable second reversible polarity magnet 804 serves to eject, partially or completely, the first motion base 350, and thus the mobile robotic device 304, from the lifting platform 630. In still another alternative embodiment, a fixed polarity magnet (e.g., either 802 or 804) may be fixed to either the first motion base 350 or the lifting backstop 634, while a reversible polarity magnet (e.g., either 804 or 802) may be fixed to the lifting backstop 634 or first motion base 350, respectively, at corresponding heights. In one example, the fixed polarity magnet may always have an outwardly facing southern pole. To attract the reversible polarity magnet to the fixed polarity magnet, the outwardly facing face of the reversible polarity magnet could be programmed to have a northern pole. To repel the reversible polarity magnet from the fixed polarity magnet, the outwardly facing face of the reversible polarity magnet could be programmed to have a southern pole. According to some aspects, the second motion base 602 includes a bumper 616 around its circumference, and the fastener system may include a first magnet (e.g., 802) coupled to the first motion base 214 and a second magnet (e.g., 804) coupled to a lifting backstop 634 of a lifting platform 630, wherein at least one of the first magnet and the second magnet is a programmable reversable polarity magnet, and the first magnet and the second magnet are at substantially equal heights when in contact with each other.

FIG. 8 also depicts an inductive charging structure 806, which may include a looped wire bundle (e.g., an inductive coil) (not shown), on an underside of the first motion base 214 and a corresponding looped wire bundle (e.g., a corresponding inductive coil) (not shown), on a upper side of the lifting base 632. The looped wire bundle and the corresponding looped wire bundle may form an inductive charging structure 806. Charge may be inductively transferred from the upper side of the lifting base 632 to the underside of the first motion base 214 by use of the inductive charging structure 806.

Hardware Implementations

Figure 9:
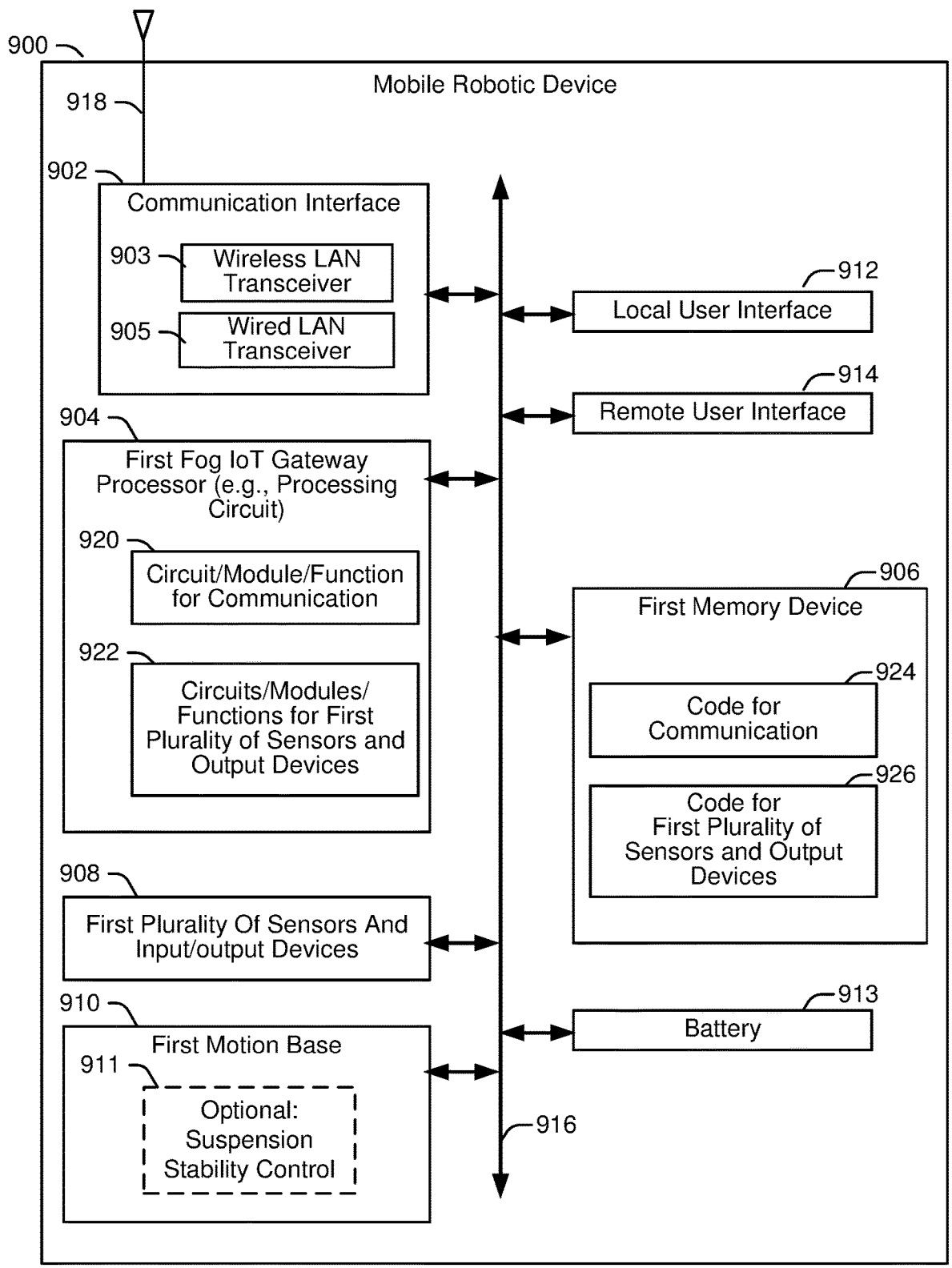
FIG. 9 is a block diagram illustrating an example of a hardware implementation of a device, such as the mobile robotic device of FIG. 2 or the mobile robotic device of FIG. 3, in accordance with aspects described herein.

FIG. 9 is a block diagram illustrating an example of a hardware implementation of a device 900, such as the mobile robotic device 204 of FIG. 2 or the mobile robotic device 304 of FIG. 3, in accordance with aspects described herein. The device 900 may include a communication interface 902, for example, a wireless LAN transceiver 903 and/or a wired LAN transceiver 905, a first fog Internet of Things (IoT) gateway processor (hereinafter the first fog IoT gateway processor 904) (e.g., a processing circuit), a first memory device 906, a first plurality of sensors and input/ output devices 908, a first motion base 910, optional suspension stability control 911 for the first motion base 910, a local user interface 912, a battery 913, and a remote user interface 914. In various implementations, the local user interface 912 may include one or more of: a keypad, a display, a speaker, a microphone, a touchscreen display, or some other circuitry for receiving an input from or sending an output to a user.

These components can be coupled to and/or placed in electrical communication with one another via a communication/power bus 916 or other suitable component or components, represented generally by the communication/power bus 916 connection lines in FIG. 9. The communication/power bus 916 may include any number of interconnecting buses and bridges depending on the specific application of the first fog IoT gateway processor 904 and the overall design constraints. The communication/power bus 916 links together various circuits such that each of the communication interface 902, the first memory device 906, the first plurality of sensors and input/output devices 908, the first motion base 910, the local user interface 912, and the remote user interface 914 are coupled to and/or in electrical communication with the first fog IoT gateway processor 904. The communication/power bus 916 may also link various other circuits (not shown) such as timing sources, peripherals, voltage regulators, power management circuits, driving motors, and steering motors, which are well known in the art, and therefore, will not be described any further.

The communication interface 902 may be adapted to facilitate wireless communication of the device 900. For example, the communication interface 902 may include circuitry programmed and/or adapted to facilitate the communication of information bi-directionally with respect to one or more communication devices in a network. The network may be a local area network, a private network as between the first fog IoT gateway processor 904 and a second fog Internet of Things (IoT) gateway processor (hereinafter the second fog IoT gateway processor 1004) (FIG. 10), or some other network. In some implementations, the communication interface 902 may be coupled to one or more antennas 918 for wireless communication within a wireless communication network. The communication interface 902 may be constructed, adapted, and/or configured with one or more standalone receivers and/or transmitters, as well as one or more transceivers.

The first memory device 906 may represent one or more memory devices. The first memory device 906 may maintain user data along with other information used by the device 900. In some implementations, the first memory device 906 may have storage space in excess of twenty terabytes. The first memory device 906 may be used for storing data that is manipulated by the first fog IoT gateway processor 904 or some other component of the device 900 (e.g., working memory).

The first memory device 906 may represent one or more non-transient computer-readable, machine-readable, and/or processor-readable devices for storing programming, such as processor executable code or instructions (e.g., software, firmware), electronic data, databases, or other digital information. The first memory device 906 may be used for storing data that is manipulated by the first fog IoT gateway processor 904 when executing programming configured to perform one or more exemplary methods described herein. The first memory device 906 may be any available media that can be accessed by a dedicated circuit, a general purpose, or special purpose processor, including portable or fixed storage devices, optical storage devices, and various other media capable of storing, containing, and/or carrying programming.

By way of example and not limitation, the first memory device 906 may include a SSD (solid state drive), magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by the first fog IoT gateway processor 904. The first memory device 906, or portions thereof, may be implemented in an article of manufacture (e.g., a computer program product). By way of example, a computer program product may include a computer-readable medium in packaging materials. In view of the above, in some implementations, the first memory device 906 may be instantiated on a non-transitory (e.g., tangible) storage medium.

The first memory device 906 may be coupled to the first fog IoT gateway processor 904 such that the first fog IoT gateway processor 904 can read information from, and write information to, the first memory device 906. That is, the first memory device 906 can be coupled to the first fog IoT gateway processor 904 so that the first memory device 906 is at least accessible by the first fog IoT gateway processor 904, including examples where at least one part of the first memory device 906 is integral to the first fog IoT gateway processor 904 and/or examples where at least one part of the first memory device 906 is separate from the first fog IoT gateway processor 904 (e.g., resident in the device 900, external to the device 900, or distributed across multiple entities, etc.).

Programming (e.g., in a form of instructions) stored on the first memory device 906, when executed by the first fog IoT gateway processor 904, may cause the first fog IoT gateway processor 904 to perform one or more of the various and exemplary functions, methods, and/or process operations described herein. For example, the first memory device 906 may include operations configured for collecting data regarding a user's physical and mental health and well-being over time and using that data to make recommendations for improvement to a user's physical or mental health or general well-being.

The first fog IoT gateway processor 904 is generally adapted for processing, including the execution of such programming stored on the first memory device 906. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The first fog IoT gateway processor 904 may be arranged to obtain, process and/or send data, control data access and storage, issue commands, and control other desired operations. The first fog IoT gateway processor 904 may include circuitry constructed, adapted, and/or configured to implement desired programming provided by appropriate media in at least one example. For example, the first fog IoT gateway processor 904 may be implemented as one or more processors, one or more controllers, and/or other structure constructed, adapted, and/or configured to execute executable programming. Examples of the first fog IoT gateway processor 904 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the exemplary functions, methods, and/or processes described herein. A general purpose processor may include a microprocessor, as well as any conventional processor, controller, microcontroller, or state machine. The first fog IoT gateway processor 904 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the first fog IoT gateway processor 904 are for illustration and other suitable configurations within the scope of the disclosure are contemplated.

In accordance with one or more aspects of the disclosure, the first fog IoT gateway processor 904 may be adapted to perform any or all of the features, processes, functions, operations, methods, and/or routines for any or all of the apparatus described herein. For example, the first fog IoT gateway processor 904 may be adapted to perform and/or carry out any one of the operations described with respect to FIGs. yet to be described. As used herein, the term "adapted" in relation to the first fog IoT gateway processor 904 may refer to the first fog IoT gateway processor 904 being one or more of constructed, configured, employed, implemented, and/or programmed to perform a particular process, function, operation, and/or routine in accordance with various features described herein.

In accordance with at least one example of the device 900, the first fog IoT gateway processor 904 may include or interface with one or more of a circuit/module/function for communication 920, circuits/modules/functions for (operation and use of) the first plurality of sensors and input/output devices 922.

As mentioned above, programming stored by the first memory device 906, when executed by the first fog IoT gateway processor 904, causes the first fog IoT gateway processor 904 to perform one or more of the various functions, methods, and/or process operations described herein. For example, the first memory device 906 may include one or more of the code for communication 924 and the code for the first plurality of sensors and input/output device 926.

Figure 10:
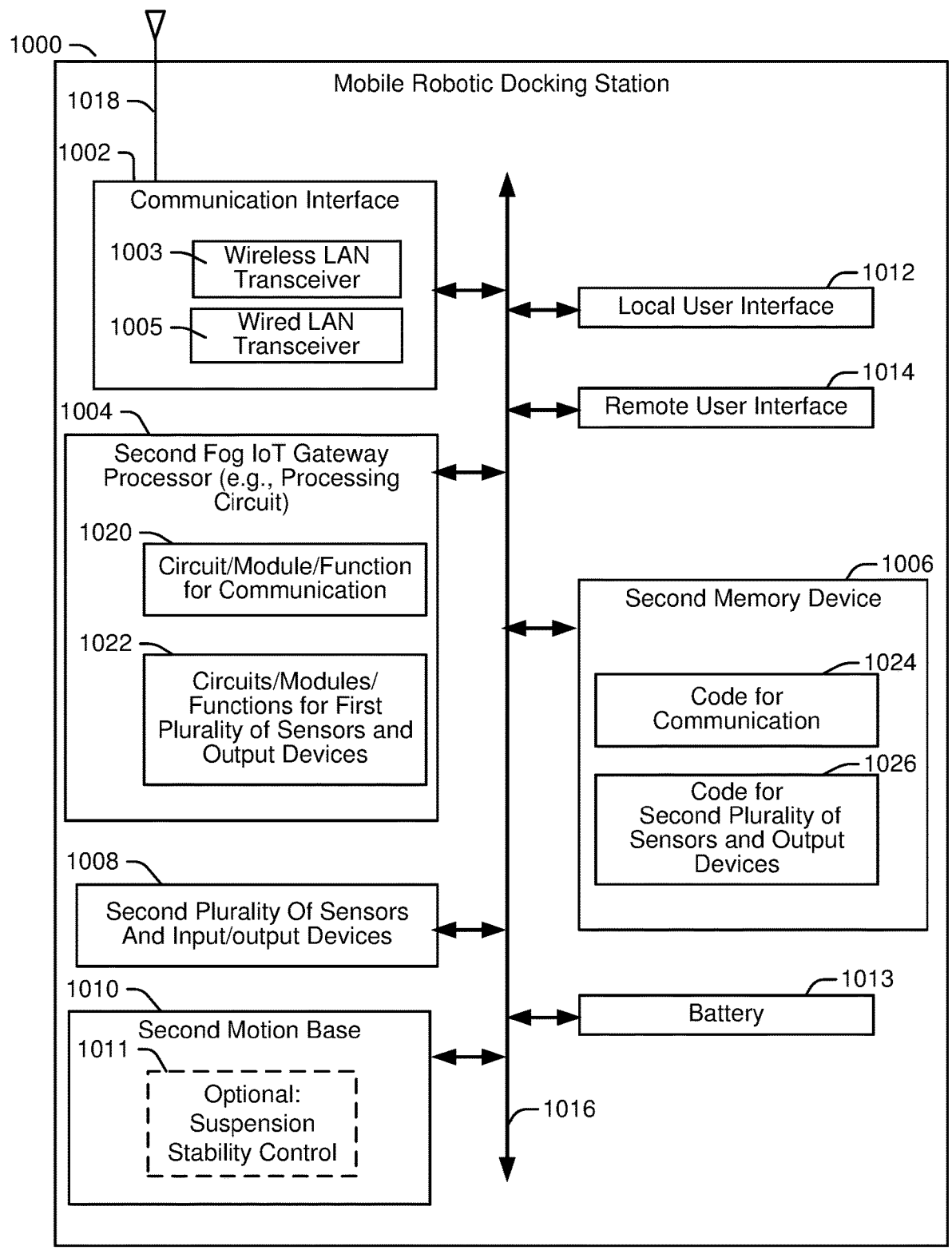
FIG. 10 is a block diagram illustrating an example of a hardware implementation of a device, such as a mobile robotic docking station of FIGS. 6A, 6B, 6C, and 6D, in accordance with aspects described herein.

FIG. 10 is a block diagram illustrating an example of a hardware implementation of a device 1000, such as the mobile robotic docking station 602 of FIGS. 6A, 6B, 6C, and 6D, in accordance with aspects described herein. The device 1000 may include a communication interface 1002, for example, a wireless LAN transceiver 1003 and/or a wired LAN transceiver 1005, a second fog IoT gateway processor 1004 (e.g., a processing circuit), a second memory device 1006, a second plurality of sensors and input/output devices 1008, a second motion base 1010, optional suspension stability control 1011 for the second motion base 1010, a local user interface 1012, a battery 1013, and a remote user interface 1014. In various implementations, the local user interface 1012 may include one or more of: a keypad, a display, a speaker, a microphone, a touchscreen display, or some other circuitry for receiving an input from or sending an output to a user.

These components can be coupled to and/or placed in electrical communication with one another via a communication/power bus 1016 or other suitable component or components, represented generally by the communication/power bus 1016 connection lines in FIG. 10. The communication/power bus 1016 may include any number of interconnecting buses and bridges depending on the specific application of the second fog IoT gateway processor 1004 and the overall design constraints. The communication/power bus 1016 links together various circuits such that each of the communication interface 1002, the second memory device 1006, the second plurality of sensors and input/output devices 1008, the second motion base 1010, the local user interface 1012, and the remote user interface 1014 are coupled to and/or in electrical communication with the second fog IoT gateway processor 1004. The communication/power bus 1016 may also link various other circuits (not shown) such as timing sources, peripherals, voltage regulators, power management circuits, driving motors, and steering motors, which are well known in the art, and therefore, will not be described any further.

The communication interface 1002 may be adapted to facilitate wireless communication of the device 1000. For example, the communication interface 1002 may include circuitry programmed and/or adapted to facilitate the communication of information bi-directionally with respect to one or more communication devices in a network. The network may be a local area network, a private network as between a first fog IoT gateway processor 904 and the second fog IoT gateway processor 1004, or some other network. In some implementations, the communication interface 1002 may be coupled to one or more antennas 1018 for wireless communication within a wireless communication network. The communication interface 1002 may be constructed, adapted, and/or configured with one or more standalone receivers and/or transmitters, as well as one or more transceivers.

The second memory device 1006 may represent one or more memory devices. The second memory device 1006 may maintain user data along with other information used by the device 1000. In some implementations, the second memory device 1006 may have storage space in excess of twenty terabytes. The second memory device 1006 may be used for storing data that is manipulated by the second fog IoT gateway processor 1004 or some other component of the device 1000 (e.g., working memory).

The second memory device 1006 may represent one or more non-transient computer-readable, machine-readable, and/or processor-readable devices for storing programming, such as processor executable code or instructions (e.g., software, firmware), electronic data, databases, or other digital information. The second memory device 1006 may be used for storing data that is manipulated by the second fog IoT gateway processor 1004 when executing programming configured to perform one or more exemplary methods described herein. The second memory device 1006 may be any available media that can be accessed by a dedicated circuit, a general purpose, or special purpose processor, including portable or fixed storage devices, optical storage devices, and various other media capable of storing, containing, and/or carrying programming.

By way of example and not limitation, the second memory device 1006 may include a SSD (solid state drive), magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by the second fog IoT gateway processor 1004. The second memory device 1006, or portions thereof, may be implemented in an article of manufacture (e.g., a computer program product). By way of example, a computer program product may include a computer-readable medium in packaging materials. In view of the above, in some implementations, the second memory device 1006 may be instantiated on a non-transitory (e.g., tangible) storage medium.

The second memory device 1006 may be coupled to the second fog IoT gateway processor 1004 such that the second fog IoT gateway processor 1004 can read information from, and write information to, the second memory device 1006. That is, the second memory device 1006 can be coupled to the second fog IoT gateway processor 1004 so that the second memory device 1006 is at least accessible by the second fog IoT gateway processor 1004, including examples where at least one part of the second memory device 1006 is integral to the second fog IoT gateway processor 1004 and/or examples where at least one part of the second memory device 1006 is separate from the second fog IoT gateway processor 1004 (e.g., resident in the device 1000, external to the device 1000, or distributed across multiple entities, etc.).

Programming (e.g., in a form of instructions) stored on the second memory device 1006, when executed by the second fog IoT gateway processor 1004, may cause the second fog IoT gateway processor 1004 to perform one or more of the various and exemplary functions, methods, and/or process operations described herein. For example, the second memory device 1006 may include operations configured for collecting data regarding a user's physical and mental health and well-being over time and using that data to make recommendations for improvement to a user's physical or mental health or general well-being.

The second fog IoT gateway processor 1004 is generally adapted for processing, including the execution of such programming stored on the second memory device 1006. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The second fog IoT gateway processor 1004 may be arranged to obtain, process and/or send data, control data access and storage, issue commands, and control other desired operations. The second fog IoT gateway processor 1004 may include circuitry constructed, adapted, and/or configured to implement desired programming provided by appropriate media in at least one example. For example, the second fog IoT gateway processor 1004 may be implemented as one or more processors, one or more controllers, and/or other structure constructed, adapted, and/or configured to execute executable programming. Examples of the second fog IoT gateway processor 1004 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the exemplary functions, methods, and/or processes described herein. A general purpose processor may include a microprocessor, as well as any conventional processor, controller, microcontroller, or state machine. The second fog IoT gateway processor 1004 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the second fog IoT gateway processor 1004 are for illustration and other suitable configurations within the scope of the disclosure are contemplated.

In accordance with one or more aspects of the disclosure, the second fog IoT gateway processor 1004 may be adapted to perform any or all of the features, processes, functions, operations, methods, and/or routines for any or all of the apparatus described herein. For example, the second fog IoT gateway processor 1004 may be adapted to perform and/or carry out any one of the operations described with respect to FIGs. yet to be described. As used herein, the term "adapted" in relation to the second fog IoT gateway processor 1004 may refer to the second fog IoT gateway processor 1004 being one or more of constructed, configured, employed, implemented, and/or programmed to perform a particular process, function, operation, and/or routine in accordance with various features described herein.

In accordance with at least one example of the device 1000, the second fog IoT gateway processor 1004 may include or interface with one or more of a circuit/module/function for communication 1020, circuits/modules/functions for (operation and use of) the second plurality of sensors and input/output devices 1022.

As mentioned above, programming stored by the second memory device 1006, when executed by the second fog IoT gateway processor 1004, causes the second fog IoT gateway processor 1004 to perform one or more of the various functions, methods, and/or process operations described herein. For example, the second memory device 1006 may include one or more of the code for communication 1024 and the code for the second plurality of sensors and input/output device 1026.

Figure 11A:
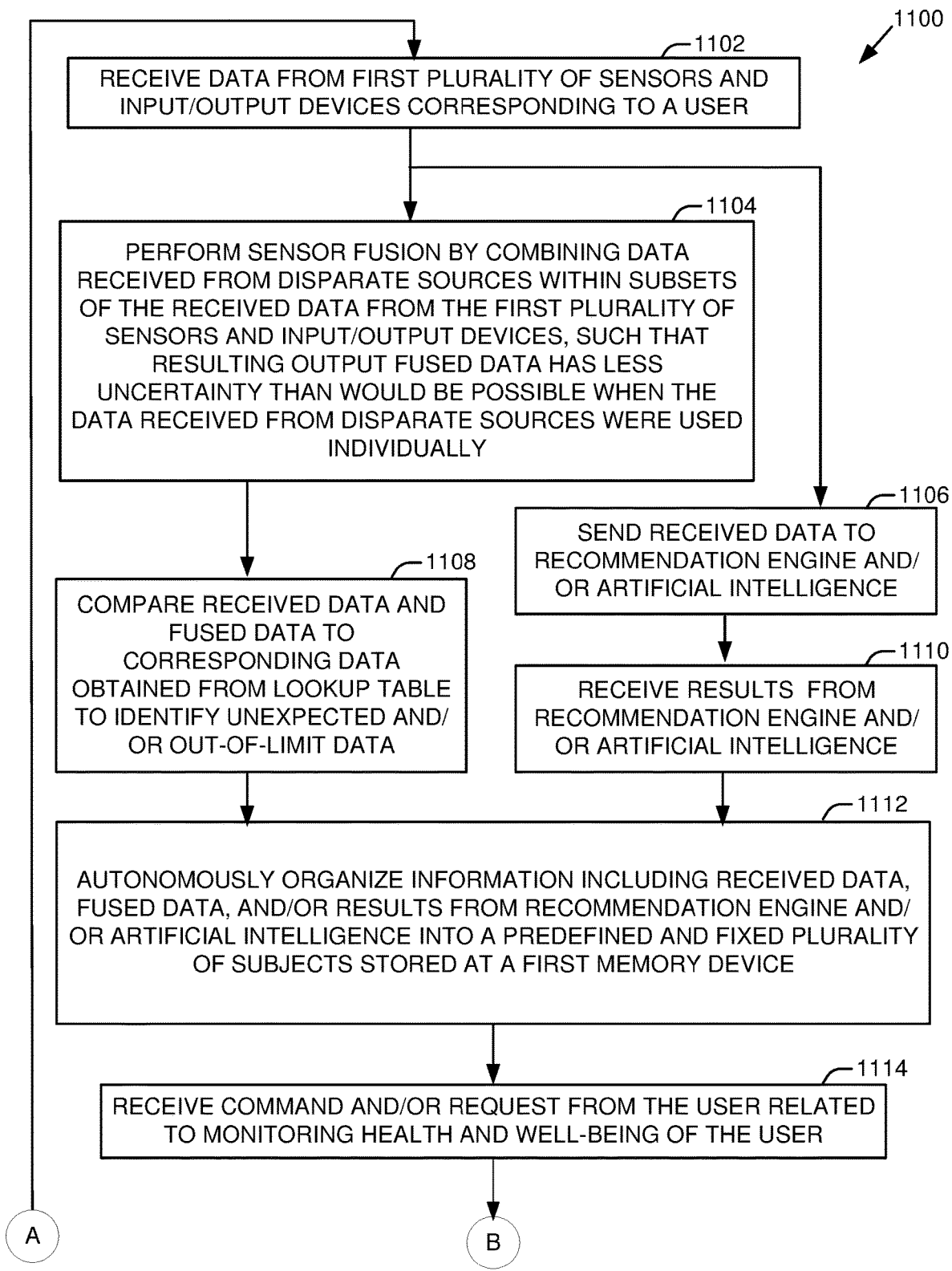
FIGS. 11A and 11B together illustrate a flow diagram of one exemplary method operational at either or both of a mobile robotic device and a mobile robotic docking station according to aspects described herein.
Figure 11B:
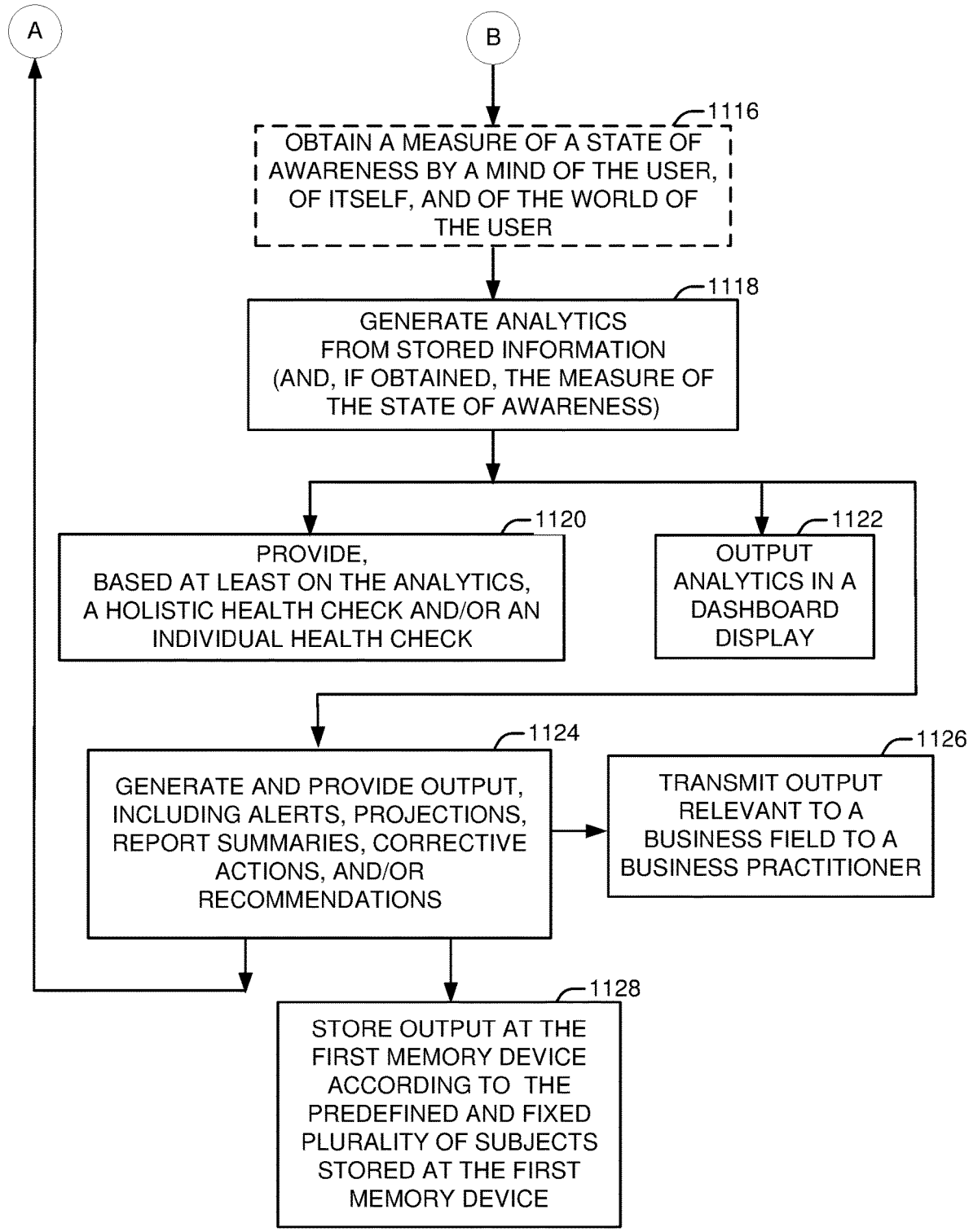

FIGS. 11A and 11B together illustrate a flow diagram of one exemplary method 1100 operational at either or both of a mobile robotic device (e.g., 104, FIG. 1, 204, FIG. 2, 304, FIG. 3) and a mobile robotic docking station (e.g., 602) according to aspects described herein. The method may include receiving data from a first plurality of sensors and input/output devices, wherein the data applies to one of a plurality of users 1102. The data may be sent for either or both of sensor fusion and application to a recommendation engine and/or artificial intelligence. Accordingly, the method 1100 may include performing sensor fusion by combining data received from disparate sources within subsets of the received data from the first plurality of sensors and input/output devices, such that resulting output fused data has less uncertainty than would be possible when the data received from disparate sources were used individually 1104. Additionally, the method 1100 may include sending received data to a recommendation engine and/or artificial intelligence 1106. Following sensor fusion, the method may include comparing the received data (from 1102) and the fused data (from 1104) to corresponding data obtained from a lookup table to identify unexpected and/or out-of-limit data 1108. Subsequent to sending received data to the recommendation engine and/or artificial intelligence, the method may include receiving results from the recommendation engine and/or artificial intelligence 1110. The method may continue by autonomously organizing information including the received data, the fused data, and/or the results from the recommendation engine and/or artificial intelligence into a predefined and fixed plurality of subjects stored at a first memory device 1112. According to some aspects the first memory device may not be coupled to the Internet, to provide security to the information from Internet threats (e.g., hacking, spying, malicious acts). According to some aspects, either or both of the mobile robotic device (e.g., 104, FIG. 1, 204, FIG. 2, 304, FIG. 3) and the mobile robotic docking station (e.g., 602) may receive a command and/or request from the user related to monitoring and management of the health and well-being of the user 1114. In response, the method may optionally obtain a measure of a state of awareness by a mind of the user, of itself, and of a world of the user 1116 (e.g., a state of awareness by the mind of itself and of the world). The measure of the state of awareness by the mind of itself and the world may be provided, for example, by a measure of a mental health level, an emotional health level, or a level of emotion (or state of emotion) of the user. The level of emotion of the user may be self-identified by the user from a list that may include the following seven emotions: happiness, sadness, fear, disgust, anger, contempt, and surprise. According to some aspects, a high definition camera, or a stereoscopic camera, coupled with facial recognition software, could determine at least seven facial expressions that correspond to the emotions of: happiness, sadness, fear, disgust, anger, contempt, and surprise. These emotions can be correlated with biometrics (e.g., vital signs, brain waves) to show that there is a correlation between the state of emotions and the biometrics of an individual user. By way of another example, the measure of the state of awareness by the mind of itself and the world may be provided, for example, by a Map of Consciousness® state at or above 200 (corresponding to integrity). The method may include generating analytics from the stored information (and, if obtained, the measure of the state of awareness) 1118. Analytics techniques include, for example, descriptive techniques, diagnostic techniques, predictive techniques, and prescriptive techniques. Any one or more of these exemplary analytic techniques may be applied to the stored information. The stored information may include biometric data received from the plurality of sensors and input/output devices, visual observations made by the mobile robotic device (e.g., 104, FIG. 1, 204, FIG. 2, 304, FIG. 3) and/or mobile robotic docking station (e.g., 602, FIG. 6), and/or answers given by the user to questions posed by the mobile robotic device (e.g., 104, FIG. 1, 204, FIG. 2, 304, FIG. 3) and/or mobile robotic docking station (e.g., 602, FIG. 6), and may also include answers given by care-provider(s) to questions related to a user posed by the mobile robotic device (e.g., 104, FIG. 1, 204, FIG. 2, 304, FIG. 3) and/or mobile robotic docking station (e.g., 602, FIG. 6).

According to one aspect, the method may include providing, based at least on the analytics, a holistic health check and/or an individual health check 1120.

A holistic health check may provide information on a whole person (i.e., a whole user), including body, mind, spirit, and emotions. The body, mind, spirit, and emotions are interdependent parts. According to holistic medicine, on can achieve optimal health by attaining a proper balance in life of these interdependent parts. However, if one part is not performing properly, the other parts will be affected. An imbalance in a user's life may negatively affect the overall health of the user. Accordingly, a holistic health check may provide a user with an evaluation of the body, mind, spirit, and emotions of that user, as determined by the mobile robotic device (e.g., 104, FIG. 1, 204, FIG. 2, 304, FIG. 3) and/or mobile robotic docking station (e.g., 602, FIG. 6) as of the time the holistic health check is provided. The evaluation of the body, mind, spirit, and emotions of the user may be achieved using biometric data received from the plurality of sensors and input/output devices, visual observations made by the mobile robotic device (e.g., 104, FIG. 1, 204, FIG. 2, 304, FIG. 3) and/or mobile robotic docking station (e.g., 602, FIG. 6) (with analysis of the observations made in a way that may quantify aspects of a user's body, mind, spirit, and emotions), and/or answers given by the user to questions posed by the mobile robotic device (e.g., 104, FIG. 1, 204, FIG. 2, 304, FIG. 3) and/or mobile robotic docking station (e.g., 602, FIG. 6) (e.g., self-reporting of feelings regarding one's own body, mind, spirit, and emotions), and may also include answers given by care-provider(s) to questions related to a user posed by the mobile robotic device (e.g., 104, FIG. 1, 204, FIG. 2, 304, FIG. 3) and/or mobile robotic docking station (e.g., 602, FIG. 6).

An individual health check may provide to a user the types of information one generally receives from a medical doctor. Such information may include, for example, measurements of biometric data, such as blood pressure, heart rate, body temperature, and results of an electrocardiogram. The information may further include indications as to whether the measurements of the biometric data were within acceptable ranges, according to, for example, national standards, or whether they were not within the acceptable standards.

The method may include outputting analytics in a dashboard display 1122. Such a display may allow the user to easily understand measures of his or her own health and well-being. The method may further include generating and providing output, including alerts, projections, report summaries, corrective actions, and/or recommendations 1124. The output may be considered actionable insights, because it provides a user with actions to take based on known data collected about the user (and the user's surroundings). The output may relate to the health and well-being of a user, but it is not limited as such. Output may include, for example, an inventory of household furnishings, and/or an inventory of the pieces of the user's apparel. Such inventories may be useful to, for example, the insurer of the household furnishings of the user's home, or the personal buyer that assists the user in clothing purchase and selection. Accordingly, the method may include transmitting output relevant to a business field to a business practitioner 1126. For example, the output comprising the inventory of household goods, which is relevant to the insurance business field, may be sent to the user's insurance agent (the business practitioner associated with the insurance business field). By way of another example, the output concerning the inventory of the user's apparel, which is relevant to the personal shopper business field, may be sent to the user's personal shopper (the business practitioner associated with the apparel and/or online purchasing business field). By way of another example the output concerning health data, which is relevant to a medical business filed, may be sent to a medical services provider (e.g., MD or ND). By way of another example, output concerning utilities (gas, electric, solar energy, wind power), which is relevant to an energy business field, can be sent to a utility provider.

The method may still further include storing the output at the first memory device according to the predefined and fixed plurality of subjects stored at the first memory device

1128. Following the generating and providing output, and in parallel with the transmitting of the output and the storing of the output, the method may return to receiving data from the first plurality of sensors and input/output devices corresponding to the user 1102.

Figure 12:
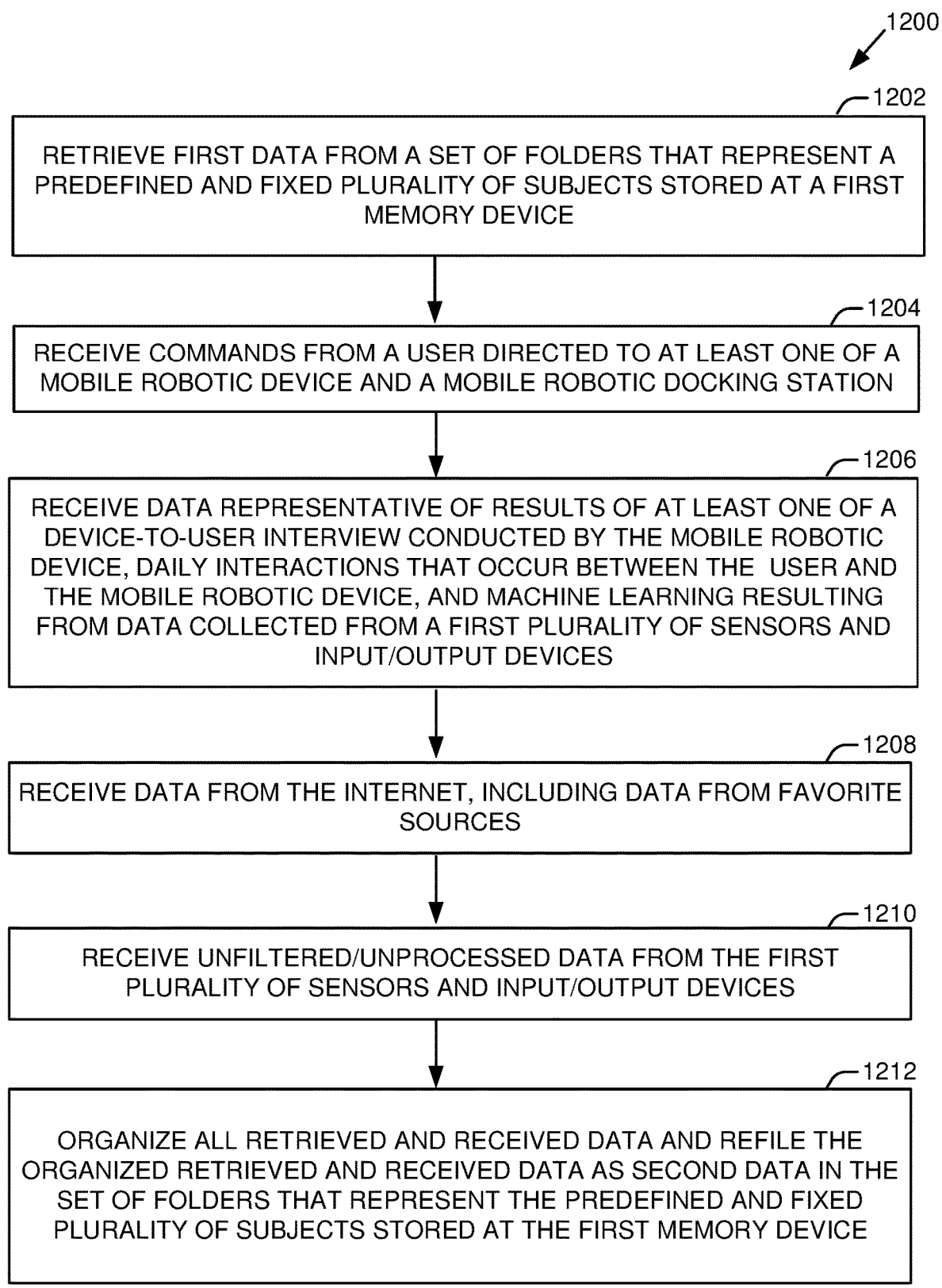
FIG. 12 illustrates a flow diagram of one exemplary method operational at either or both of a mobile robotic device and a mobile robotic docking station according to aspects described herein.

FIG. 12 illustrates a flow diagram of another exemplary method 1200 operational at either or both of a mobile robotic device (e.g., 104, FIG. 1, 204, FIG. 2, 304, FIG. 3) and a mobile robotic docking station (e.g., 602) according to aspects described herein. The method may begin by retrieving data from a set of folders (e.g., knowledge folders) that represent a predefined and fixed plurality of subjects stored at a first memory device 1202. It is noted that the first memory device may not be coupled to the Internet, to provide security to the data from Internet threats (e.g., hacking, spying, malicious acts). It is noted that data stored in either or both of the mobile robotic device (e.g., 104, FIG. 1, 204, FIG. 2, 304, FIG. 3) and the mobile robotic docking station (e.g., 602) are being updated/replaced on a regular basis—except for fundamental/basic/factual data which never changes (e.g. look up tables, facts from Internet-based papers, hard medical facts, etc.). The method may continue by receiving commands from a user directed to at least one of mobile robotic device (e.g., 104, FIG. 1, 204, FIG. 2, 304, FIG. 3) and a mobile robotic docking station (e.g., 602) 1204. The method may then proceed to receiving data representative of results of at least one of a device-to-user interview conducted by the mobile robotic device, daily interactions that occur between the user and the mobile robotic device, and machine learning resulting from data collected from a first plurality of sensors and input/output devices 1206. According to some aspects the method may include receiving data from the Internet, including data from favorite sources (e.g., a predefined set of sources identified as favorite sources) 1208. It will be understood that the first memory device would be unavailable for access from the Internet while the data from the favorite sources is downloaded, and the data from the favorite sources would be scanned for any malicious code prior to being loaded onto the first memory device, to protect the first memory device from Internet threats and to otherwise provide security to the first memory device from Internet threats. The method may include receiving unfiltered/unprocessed data from the first plurality of sensors and input/output devices 1210. The method may then proceed by organizing all retrieved and received data and refilling the organized retrieved and received data as second data in the set of folders that represent the predefined and fixed plurality of subjects stored at the first memory device 1212. It is noted that the first memory device may not be coupled to the Internet, to provide security to the data from Internet threats (e.g., hacking, spying, malicious acts).

Figure 13A:
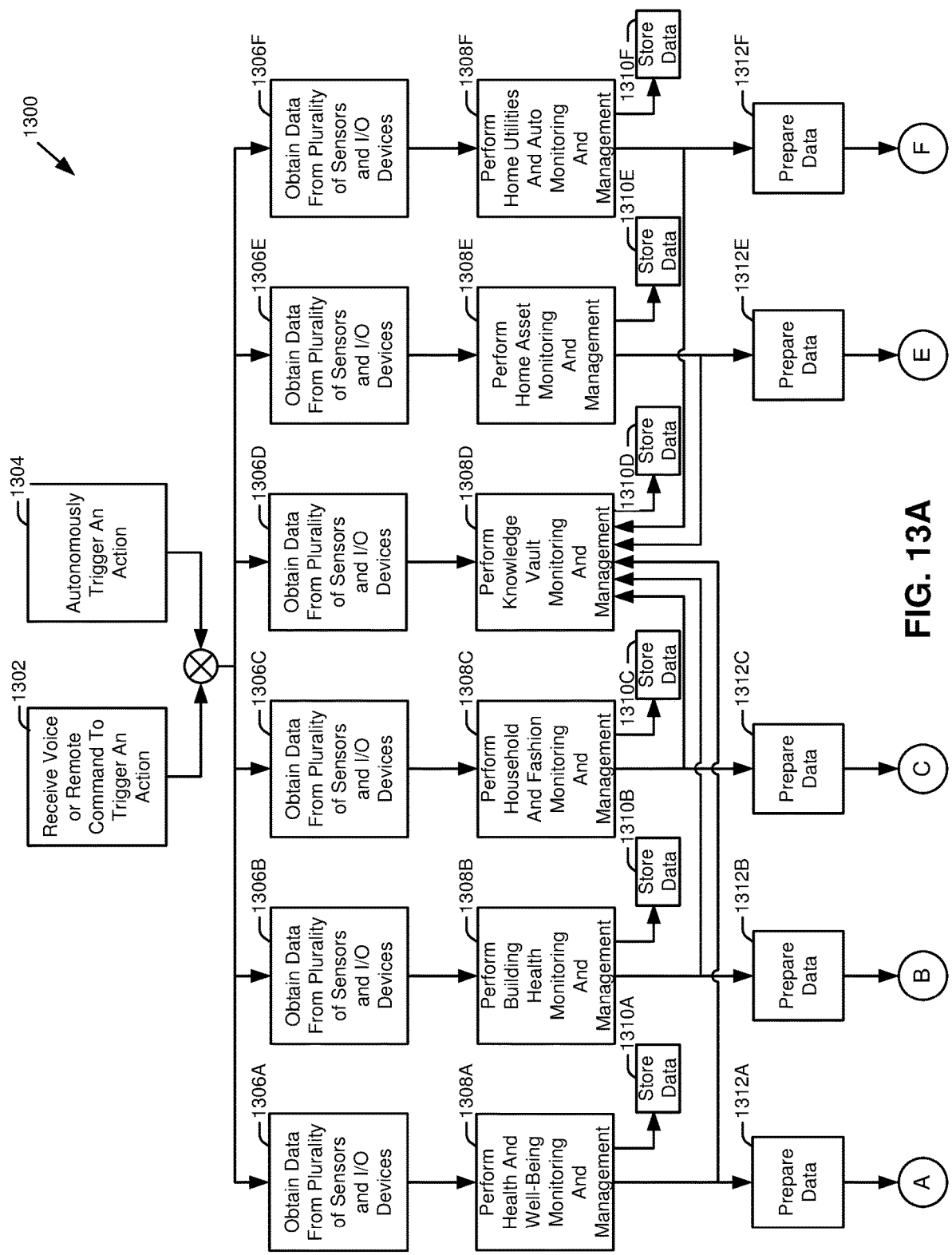
FIGS. 13A and 13B together illustrate a flow diagram of still another exemplary method operational at either or both of a mobile robotic device and a mobile robotic docking station according to aspects described herein.
Figure 13B:
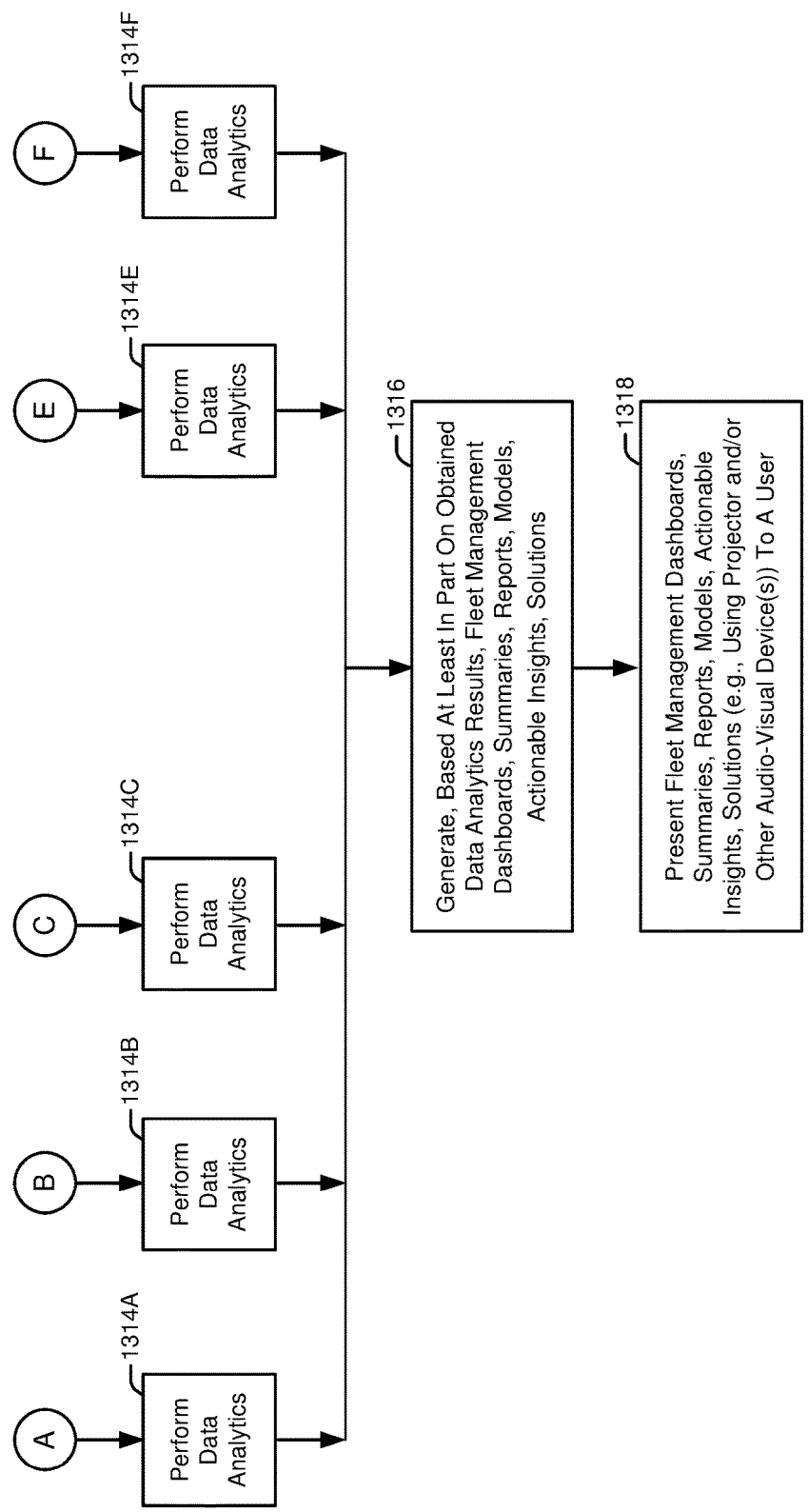

FIGS. 13A and 13B together illustrate a flow diagram of still another exemplary method 1300 operational at either or both of a mobile robotic device (e.g., 104, FIG. 1, 204, FIG. 2, 304, FIG. 3) and a mobile robotic docking station (e.g., 602) according to aspects described herein. The method may begin either by receiving a voice or remote command to trigger an action 1302, or by either or both of the mobile robotic device (e.g., 104, FIG. 1, 204, FIG. 2, 304, FIG. 3) and the mobile robotic docking station (e.g., 602) autonomously triggering an action 1304.

The voice command may be received through microphones coupled to a fog IoT gateway processor. The remote command may be sent from a remote-control device that may be used by a user of either or both of a mobile robotic device (e.g., 104, FIG. 1, 204, FIG. 2, 304, FIG. 3) and a mobile robotic docking station (e.g., 602). According to some aspects, the remote command may alternatively be a local command input to an input/output device, such as a touch sensitive display screen, mounted to the mobile robotic device (e.g., 104, FIG. 1, 204, FIG. 2, 304, FIG. 3) or the mobile robotic docking station (e.g., 602). The remote command may be received by a communications interface coupled to the fog IoT gateway processor. Likewise the input/output device may couple to the fog IoT gateway processor.

The action may be, by way of example, an action to initiate or return to an act of: health and well-being monitoring and management; building health monitoring and management; household and fashion monitoring and management; knowledge vault monitoring and management; home asset monitoring and management; and/or home utilities and automobile monitoring and management.

The act of health and well-being monitoring and management may proceed by first obtaining data from a plurality of sensors and input/output (I/O) devices 1306A. The method may then proceed by performing actions consistent with performing health and well-being monitoring and management 1308A. The method may then store data 1310A resulting from the performance of health and well-being monitoring and management. The data may be stored on a memory device that is not coupled to the Internet. The method may continue by preparing data 1312A resulting from the performance of health and well-being monitoring and management. The data may be prepared, for example, by filtering, cleaning, organizing, reformatting, or by conversion of data from non-metric to metric values. Next the prepared data may be analyzed by performing data analytics 1314A. Data analytics techniques include, for example, descriptive techniques, diagnostic techniques, predictive techniques, and prescriptive techniques. Any one or more of these exemplary data analytic techniques may be applied to the prepared data. Following the performance of data analytics, the method may proceed to preparing output suitable for the user including, for example, fleet management (where a fleet could be stored documents, pieces of a wardrobe, automobiles owned/leased or in general, pieces of information), dashboards, summaries, reports, models, insights, and/or solutions 1316. Next the method may proceed by presenting, for example, the fleet management, dashboards, summaries, reports, models, insights, and/or solutions 1318. Presentation may be made, for example, using a projector on a mobile robotic device or on a mobile robotic docking station.

As used herein, fleet management describes the treatment of physical and non-physical assets. Similar to fleet management of an inventory of trucks—here we treat all of our physical and non-physical assets as a fleet. By establishing an on-premise/private FOG IoT network between robot sensors, robot gateways, to the constantly updated knowledge vault, we make use of digital twinning—whereby we digitally represent all assets (physical, measured, and mined) and fleet manage all of them. The robot and system are able to learn over time from the sensor (built in+biometric+home/building+auto+external wearables+implants+drones) data collected and from the WWW (world-wide-web) data mined to make quick, deep, insightful, accurate, holistic decisions, responses, answers, summaries, and reports for the human companions through analytics, artificial intelligence and machine learning.

The act of building health monitoring and management may proceed by first obtaining data from a plurality of sensors and input/output (I/O) devices 1306B. The method may then proceed by performing actions consistent with performing building health monitoring and management 1308B. The method may then store data 1310B resulting from the performance of building monitoring and management. The data may be stored on a memory device that is not coupled to the Internet. The method may continue by preparing data 1312B resulting from the performance of building health monitoring and management. The data may be prepared, for example, by reformatting or by conversion of data from non-metric to metric values. Next the prepared data may be analyzed by performing data analytics 1314B. Data analytics techniques include, for example, descriptive techniques, diagnostic techniques, predictive techniques, and prescriptive techniques. Any one or more of these exemplary data analytic techniques may be applied to the prepared data. Following the performance of data analytics, the method may proceed to preparing output suitable for the user including, for example, fleet management, dashboards, summaries, reports, models, insights, and/or solutions 1316. Next the method may proceed by presenting, for example, the fleet management, dashboards, summaries, reports, models, insights, and/or solutions 1318. Presentation may be made, for example, using a projector on a mobile robotic device or on a mobile robotic docking station.

The act of household and fashion monitoring and management may proceed by first obtaining data from a plurality of sensors and input/output (I/O) devices 1306C. The method may then proceed by performing actions consistent with performing household and fashion monitoring and management 1308C. The method may then store data 1310C resulting from the performance of building monitoring and management. The data may be stored on a memory device that is not coupled to the Internet. The method may continue by preparing data 1312C resulting from the performance of household and fashion monitoring and management. The data may be prepared, for example, by reformatting or by conversion of data from non-metric to metric values. Next the prepared data may be analyzed by performing data analytics 1314C. Data analytics techniques include, for example, descriptive techniques, diagnostic techniques, predictive techniques, and prescriptive techniques. Any one or more of these exemplary data analytic techniques may be applied to the prepared data. Following the performance of data analytics, the method may proceed to preparing output suitable for the user including, for example, fleet management, dashboards, summaries, reports, models, insights, and/or solutions 1316. Next the method may proceed by presenting, for example, the fleet management, dashboards, summaries, reports, models, insights, and/or solutions 1318. Presentation may be made, for example, using a projector on a mobile robotic device or on a mobile robotic docking station.

The act of knowledge vault monitoring and management may proceed by first obtaining data from a plurality of sensors and input/output (I/O) devices 1306D. Additionally, data resulting from the performance of health and well-being monitoring and management, building health monitoring and management, household and fashion monitoring and management, home asset monitoring and management, and/or home utilities and automobile monitoring and management may also be obtained. The method may then proceed by performing actions consistent with performing knowledge vault monitoring and management 1308D. The method may then store data 1310D resulting from the performance of building monitoring and management. The data may be stored on a memory device that is not coupled to the Internet.

The act of home asset monitoring and management may proceed by first obtaining data from a plurality of sensors and input/output (I/O) devices 1306E. The method may then proceed by performing actions consistent with performing home asset monitoring and management 1308E. The method may then store data 1310E resulting from the performance of building monitoring and management. The data may be stored on a memory device that is not coupled to the Internet. The method may continue by preparing data 1312E resulting from the performance of home asset monitoring and management. The data may be prepared, for example, by reformatting or by conversion of data from non-metric to metric values. Next the prepared data may be analyzed by performing data analytics 1314E. Data analytics techniques include, for example, descriptive techniques, diagnostic techniques, predictive techniques, and prescriptive techniques. Any one or more of these exemplary data analytic techniques may be applied to the prepared data. Following the performance of data analytics, the method may proceed to preparing output suitable for the user including, for example, fleet management, dashboards, summaries, reports, models, insights, and/or solutions 1316. Next the method may proceed by presenting, for example, the fleet management, dashboards, summaries, reports, models, insights, and/or solutions 1318. Presentation may be made, for example, using a projector on a mobile robotic device or on a mobile robotic docking station.

The act of home utilities and automobile monitoring and management may proceed by first obtaining data from a plurality of sensors and input/output (I/O) devices 1306F. The method may then proceed by performing actions consistent with performing home utilities and automobile monitoring and management 1308F. The method may then store data 1310F resulting from the performance of building monitoring and management. The data may be stored on a memory device that is not coupled to the Internet. The method may continue by preparing data 1312F resulting from the performance of home utilities and automobile monitoring and management. The data may be prepared, for example, by reformatting or by conversion of data from non-metric to metric values. Next the prepared data may be analyzed by performing data analytics 1314F. Data analytics techniques include, for example, descriptive techniques, diagnostic techniques, predictive techniques, and prescriptive techniques. Any one or more of these exemplary data analytic techniques may be applied to the prepared data. Following the performance of data analytics, the method may proceed to preparing output suitable for the user including, for example, fleet management, dashboards, summaries, reports, models, insights, and/or solutions 1316. Next the method may proceed by presenting, for example, the fleet management, dashboards, summaries, reports, models, insights, and/or solutions 1318. Presentation may be made, for example, using a projector on a mobile robotic device or on a mobile robotic docking station.

Figure 14:
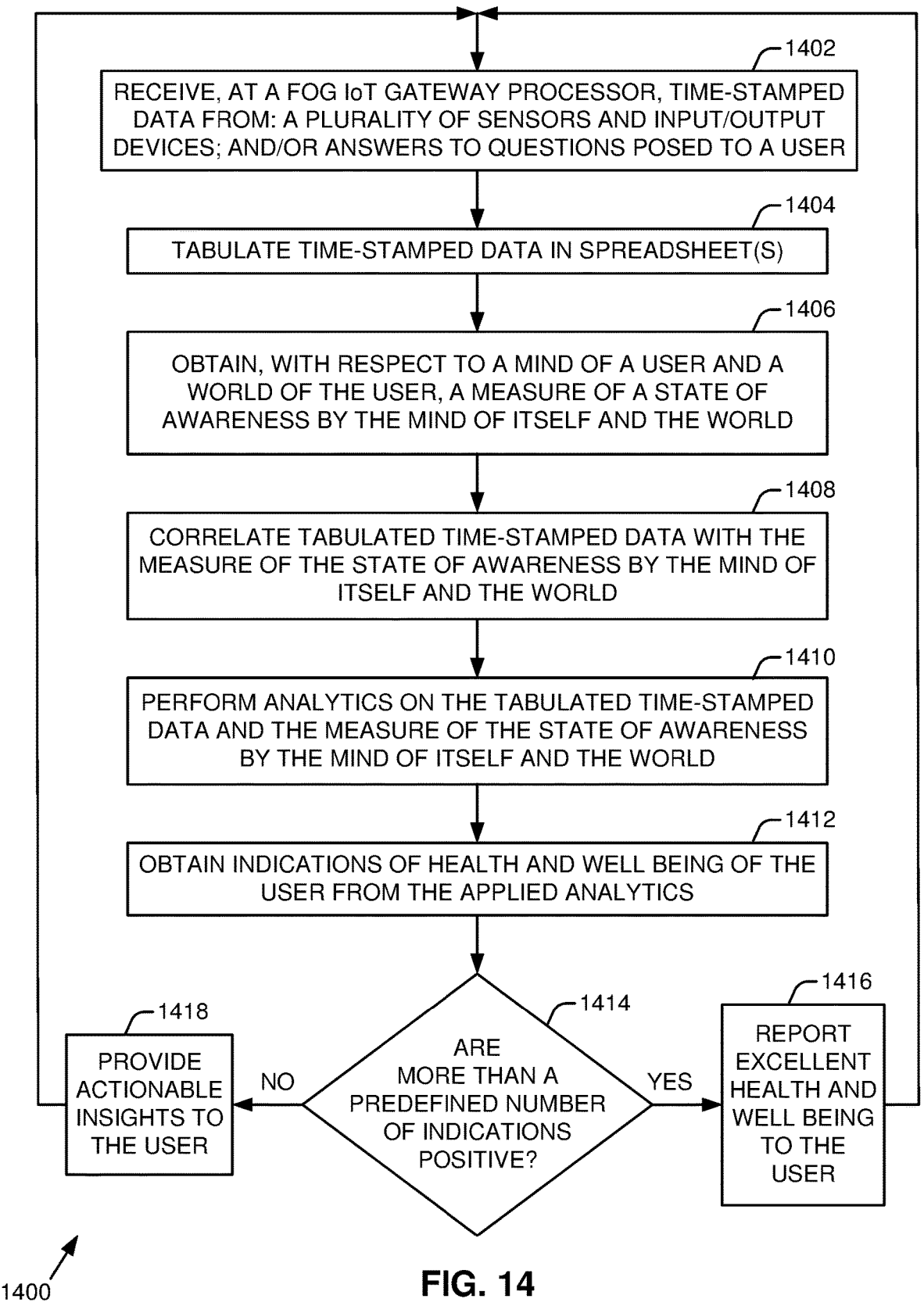
FIG. 14 illustrates a flow diagram of another exemplary method operational at either or both of a mobile robotic device and a mobile robotic docking station according to aspects described herein.

FIG. 14 illustrates a flow diagram of another exemplary method 1400 operational at either or both of a mobile robotic device (e.g., 104, FIG. 1, 204, FIG. 2, 304, FIG. 3) and a mobile robotic docking station (e.g., 602) according to aspects described herein. The method may begin by receiving, at a fog IoT gateway processor, time-stamped data from: a plurality of sensors and input/output devices; and/or answers to questions posed to a user 1402. The plurality of sensors and input/output devices may include, for example, those related to the body, such as a camera, a microphone, sensor(s) that provide vital signs, sensor(s) used for tomography, an otoscope, a sensor for intraoral examination, sensors for electromyography (EMG), sensors for an electrocardiogram (ECG), and/or sensors for touch. The plurality of sensors and input/output devices may include, for example, those related to the mind, such as sensors for an electroencephalograph (ECG) and/or sensors to detect an aura. The plurality of sensors and input/output devices may include, for example, those related to building health, such as sensors for measuring air quality, sensors for measuring temperature, sensors for measuring humidity, sensors for measuring microbial presence/level, sensors for measuring water quality. In addition the data from answers to questions posed to a user (by either or both of a mobile robotic device (e.g., 104, FIG. 1, 204, FIG. 2, 304, FIG. 3) and a mobile robotic docking station (e.g., 602)) may include, for example, data related to answers about diet, exercise, water intake, exposure to nature, listening to music, sleep, and/or muscle testing (e.g., kinesiology).

The method may proceed by tabulating the time-stamped data in spreadsheet(s) 1404. The method may also include obtaining, with respect to a mind of a user and a world of a user, a measure of a state of awareness by the mind of itself and the world 1406. The measure of the state of awareness by the mind of itself and the world may be provided, for example, by a measure of a mental health level, an emotional health level, or a level of emotion (or state of emotion) of the user. The level of emotion of the user may be self-identified by the user from a list that may include the following seven emotions: happiness, sadness, fear, disgust, anger, contempt, and surprise. According to some aspects, a high definition camera, or a stereoscopic camera, coupled with facial recognition software, could determine at least seven facial expressions that correspond to the emotions of: happiness, sadness, fear, disgust, anger, contempt, and surprise. By way of another example, the measure of the state of awareness by the mind of itself and the world may be provided, for example, by a Map of Consciousness® state at or above 200 (corresponding to integrity). According to one aspect, the mobile robotic device and/or the mobile robotic docking station may ask the user to verbally express or manually enter the measure of the state of awareness by the mind of itself and the world. For example, the mobile robotic device may project the options of happiness, sadness, fear, disgust, anger, contempt, and surprise on a nearby wall, or object, and ask the user to select the emotion felt by the user at that moment. The method may include correlating the tabulated time-stamped data with the measure of the state of awareness by the mind of itself and the world 1408. In this way, the mobile robotic device, the mobile robotic docking station, and or a user could correlate this measure of the state of awareness to, for example, certain sets of biometric data received from the plurality of sensors and input/output devices and/or answers to questions posed to the user by either the mobile robotic device or the mobile robotic docking station. This may give the user valuable insight on his or her own health and well-being. For example, if an emotion corresponding to happiness correlates to a blood pressure that is lower than the national average blood pressure (for a person of the same sex and weight as the user) and a heart rate that is above the national average heart rate (such as may be achieved during exercise), then the user may want to continue to eat food that has been shown to lower blood pressure and can anticipate that he or she will achieve the emotion of happiness during periods of exercise. This may encourage the user to perform more exercise, which in turn keeps the user fit and happy. Overtime, a biometric signature corresponding to the emotion of happiness may be recognized.

The method may include performing analytics on the tabulated time-stamped data and the measure of the state of awareness by the mind of itself and the world 1410. Analytic techniques (or data analytic techniques) include, for example, descriptive techniques, diagnostic techniques, predictive techniques, and prescriptive techniques. Any one or more of these exemplary analytic techniques may be applied to the tabulated time-stamped data and the measure of the state of awareness by the mind of itself and the world. The method may further include obtaining indications of the health and well-being of the user from the applied analytics (i.e., the analytics applied to the tabulated time-stamped data and the measure of the state of awareness by the mind of itself and the world). The indications of the health and well-being of the user may include indications as to whether, for example, a user's blood pressure is high or low, the user's heart rate is high or low, the user's ECG results are more or less than optimal, the user's intake of water is at or below average, the user's time spent listening to music or practicing yoga is higher or lower than a previously defined target time, and so on. In general, the indications of the health and well-being of the user may be understood to be either positive or negative. For example, an indication of a user's blood pressure being high may be considered as a negative, the user's heart rate being low may be considered as a positive, the user's ECG results being more than optimal may be considered as a positive, the user's intake of water being at or above average may be considered as a positive, the user's time spent listening to music or practicing yoga being lower than a previously defined target time may be considered as a negative, and so on. The mobile robotic device and/or the mobile robotic docking station may determine if, for a known number of indications, whether more than a predefined number of indications are positive 1414. If more than a predefined number of indications are positive (e.g., out of a reported 20 indications, 18 are positive, where 17 is the predetermined number) then the mobile robotic device and/or the mobile robotic docking station may report excellent health and well-being to the user 1416. The method may then return to receiving time-stamped data from: a plurality of sensors and input/output device; and/or answers to questions posed to a user 1402. However, if less than the predefined number of indications are positive (e.g., out of a reported 20 indications, 10 are positive, where 17 is the predefined number) then the mobile robotic device and/or the mobile robotic docking station may provide actionable insights to the user 1418. Actionable insights may include, for example, advice on improving diet, water intake, vitamin intake, care of teeth, hours spent on exercise, hours spent on yoga, hours spent on meditation, hours spent on nature walks, hours spent listening to classical music, hours spent in sleep, hours spent in aroma therapy (and/or the types of aromas to be inhaled during aroma therapy), the amount and types of oils ingested or applied to the skin, visiting a chiropractor, undergoing acupuncture, undergoing hypnosis, using a brain stimulator, hours spent in chromotherapy (and/or the wavelength and intensity of light used in chromotherapy), hours spent undergoing biosonics (and/or the frequencies and amplitudes of the sounds listened to while undergoing biosonics), improving building air quality, and/or advice on improving building water quality. It is noted that LEDs, projectors, and speakers on either or both of the mobile robotic device (e.g., 104, FIG. 1, 204, FIG. 2, 304, FIG. 3) and the mobile robotic docking station (e.g., 602) may be used for light therapy and sound therapy. The method may then return to receiving time-stamped data from: a plurality of sensors and input/output device; and/or answers to questions posed to a user 1402.

According to some aspects, the act of performing health and well-being monitoring and management (1308A, FIG. 13A) and/or the act of performing building health monitoring and management (1308B, FIG. 13A) may be embodied in, for example, the method 1400 of FIG. 14. According to some aspects, the act of performing household and fashion monitoring and management (1308C, FIG. 13A) may include mapping of the location of household goods and furniture and providing advice on the whereabouts of household goods and on the positioning and colors of furniture (e.g., for optimum Feng Shui). According to some aspects, the act of performing home asset monitoring and management (1308E, FIG. 13A) may include mapping of the location of home assets, including, for example, electronic equipment and objects of art, and providing advice on the whereabouts, operability, and general status of the home assets. According to some aspects, the act of performing home utilities and automobile monitoring and management (1308F, FIG. 13A) may include signing into the web sites of home utility providers and downloading billing information and due dates and correlating the downloaded information to payments made to the utility providers' from a user's bank account and receiving information on a monitored automobile by, for example, use of a wireless LAN coupling the monitored automobile to the fog IoT gateway processor.

Figure 15:
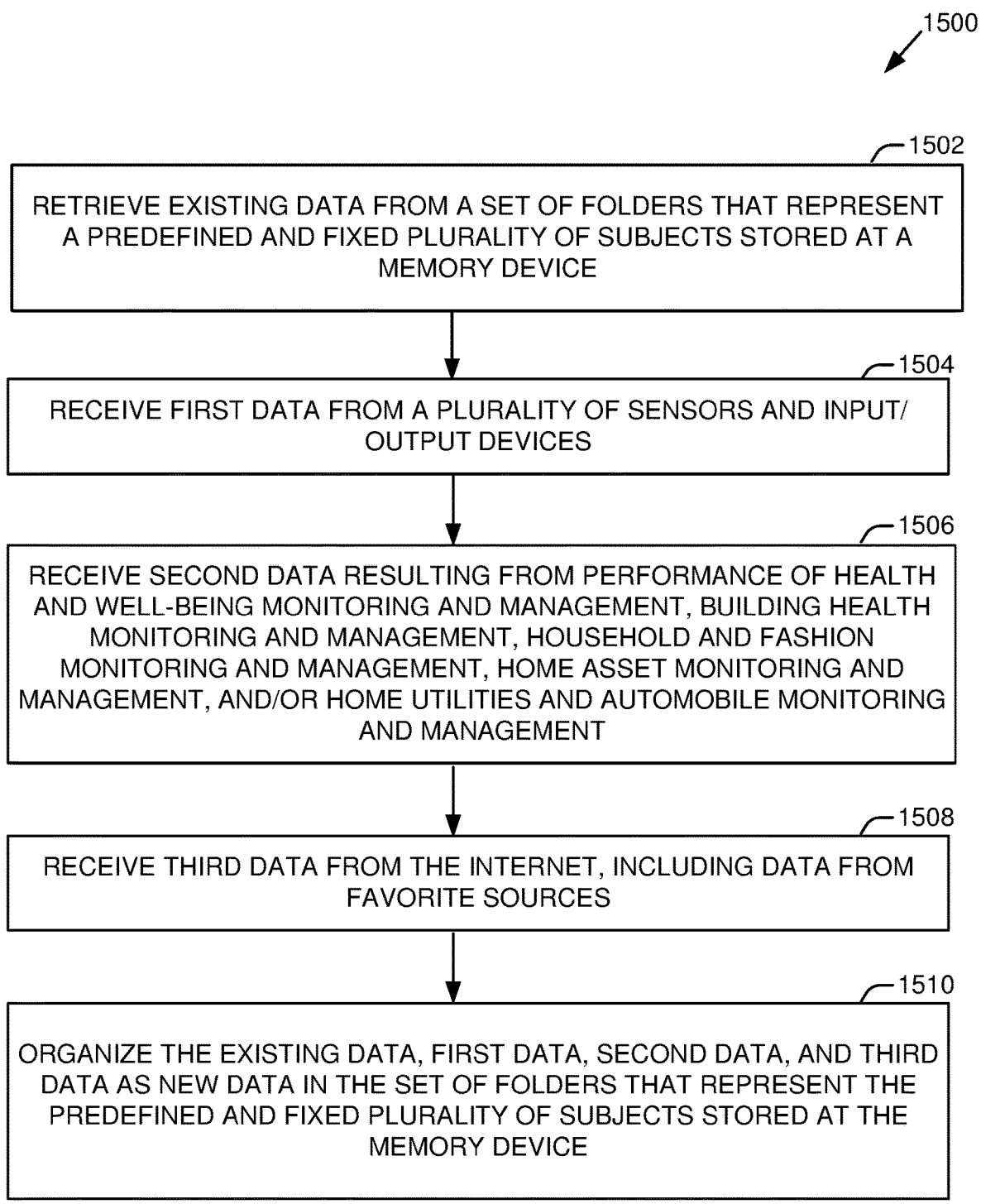
FIG. 15 is a flow diagram illustrating an exemplary method of performing knowledge vault monitoring and management according to aspects described herein.

FIG. 15 is a flow diagram illustrating an exemplary method 1500 of performing knowledge vault monitoring and management according to aspects described herein. The method 1500 may be operational at either or both of the mobile robotic device and the mobile robotic docking station. The act of performing knowledge vault monitoring and management of reference number 1308D of FIG. 13A may be embodied in, for example, the method 1500 of FIG. 15.

According to some aspects, the method 1500 may include retrieving existing data from a set of folders that represent a predefined and fixed plurality of subjects (referred to herein as a knowledge vault) stored at a memory device 1502. According to some aspects, the memory device may not be coupled to the Internet, or may only be coupled to the Internet sporadically or for limited amounts of time, such as for about 1 hour every day, week, or month. The memory device may not be coupled to the Internet to provide security to the existing data from Internet threats. The method may also include receiving first data from a plurality of sensors and input/output devices 1504. The method may further include receiving second data resulting from the performance of health and well-being monitoring and management (e.g., 1308A, FIG. 13A), building health monitoring and management (1308B, FIG. 13A), household and fashion monitoring and management (1308C, FIG. 13A), home asset monitoring and management (1308E, FIG. 13A), and/or home utilities and automobile monitoring and management (1308F, FIG. 13A) 1506. According to some aspects the method may further include receiving third data from the Internet, including data from favorite sources (e.g., a predefined set of sources identified as favorite sources) 1508. It will be understood that according to some aspects the memory device would be unavailable for access to the Internet while the data from the favorite sources is downloaded (e.g., into a working memory), and the data from the favorite sources would be scanned for any malicious code prior to being loaded onto the memory device, to protect the memory device, and data stored thereon, from Internet threats and to otherwise provide security to the memory device from Internet threats. According to some aspects, the method may further include organizing the existing data, first data, second data, and third data, as new data in the set of folders that represent the predefined and fixed plurality of subjects (e.g., the knowledge vault) stored at the memory device 1510.

Figure 16:
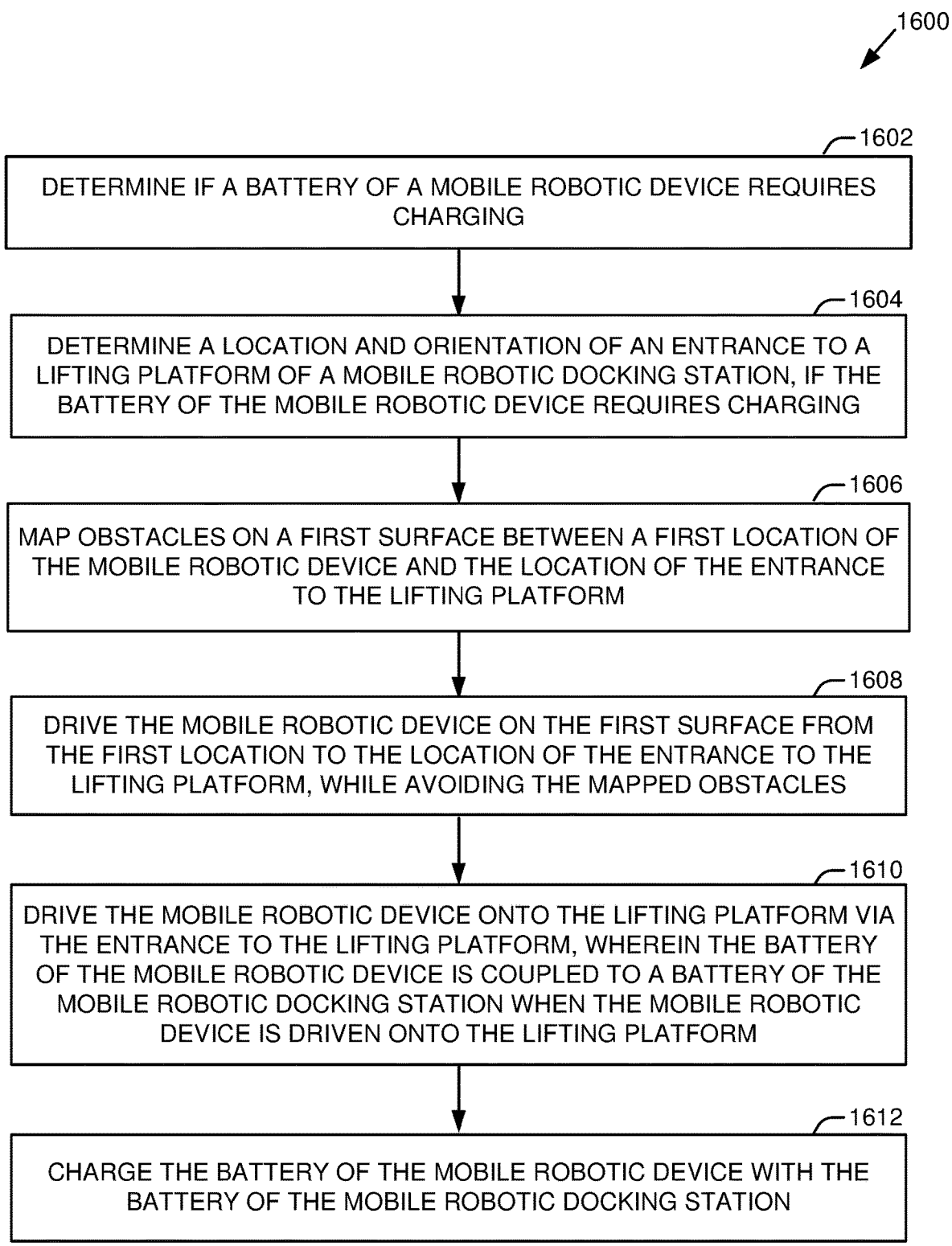
FIG. 16 is a flow diagram illustrating an exemplary method, operable at a mobile robotic device, according to aspects described herein.

FIG. 16 is a flow diagram illustrating an exemplary method 1600, operable at a mobile robotic device, according to aspects described herein. The method may include determining if a battery of the mobile robotic device requires charging 1602. The method may then proceed to determining a location and orientation of an entrance to a lifting platform of a mobile robotic docking station, if the battery of the mobile robotic device requires charging 1604. Next, the method may include mapping obstacles on a first surface between a first location of the mobile robotic device and the location of the entrance to the lifting platform 1606. The method may further include driving the mobile robotic device on the first surface from the first location to the location of the entrance to the lifting platform, while avoiding the mapped obstacles 1608. The method may also include driving the mobile robotic device onto the lifting platform via the entrance to the lifting platform, wherein the battery of the mobile robotic device is coupled to a battery of the mobile robotic docking station when the mobile robotic device is driven onto the lifting platform 1610. The method may then proceed with charging the battery of the mobile robotic device with the battery of the mobile robotic docking station 1612.

According to some aspects, driving the mobile robotic device onto the lifting platform may include at least one of: driving the mobile robotic device over an inductive loop on the lifting platform, and driving the mobile robotic device to a position on the lifting platform that ensures that a first part of a power connector on the mobile robotic device mates with a second part of the power connector on the lifting platform. Driving the mobile robotic device onto the lifting platform may further include securing the mobile robotic device to the lifting platform before using the inductive loop or the power connector to charge the battery of the mobile robotic device.

According to some aspects, driving the mobile robotic device onto the lifting platform may further include lifting the lifting platform to space apart the lifting platform from the first surface after securing the mobile robotic device to the lifting platform and before using the inductive loop or the power connector to charge the battery of the mobile robotic device. Lifting the lifting platform (and thereby lifting the mobile robotic device) may provide for increased airflow around the lifting platform and the motion base of the mobile robotic device during charging operations. Increased airflow may be beneficial to both the lifting platform and the mobile robotic device, as dispersal of heat that may be generated at the inductive loop and/or the power connector during charging operations can be improved when air is permitted to flow below and around the lifting platform. Additionally, lifting the lifting platform to space apart the lifting platform from the first surface during charging operations may prevent burn marks from appearing on the first surface directly below the inductive loop on the lifting platform.

According to some aspects, securing the mobile robotic device to the lifting platform may include closing a gate behind the mobile robotic device after the mobile robotic device is driven onto the lifting platform.

According to some aspects, securing the mobile robotic device to the lifting platform may include one of: programming a first reversible polarity magnet mounted to a front of the mobile robotic device to a first polarity to attract the first reversible polarity magnet to either a second reversible polarity magnet mounted to the lifting platform or a fixed polarity magnet mounted to the lifting platform; and (conversely) programming a first reversible polarity magnet mounted to the lifting platform to the first polarity to attract the first reversible polarity magnet to either a second reversible polarity magnet mounted to a front of the mobile robotic device or a fixed polarity magnet mounted to the front of the mobile robotic device. In other words, according to some aspects, securing the mobile robotic device to the lifting platform may include programming a first reversible polarity magnet, mounted to either a front of the mobile robotic device or the lifting platform, to a first polarity to attract the first reversible polarity magnet to either a second reversible polarity magnet or a fixed polarity magnet, mounted to either the lifting platform or the front of the mobile device, respectively. According to some aspects, ejecting the mobile robotic device from the lifting platform, after charging the battery of the mobile robotic device, may be accomplished by programming the first reversible polarity magnet to a second polarity, opposite to the first polarity.

Figure 17A:
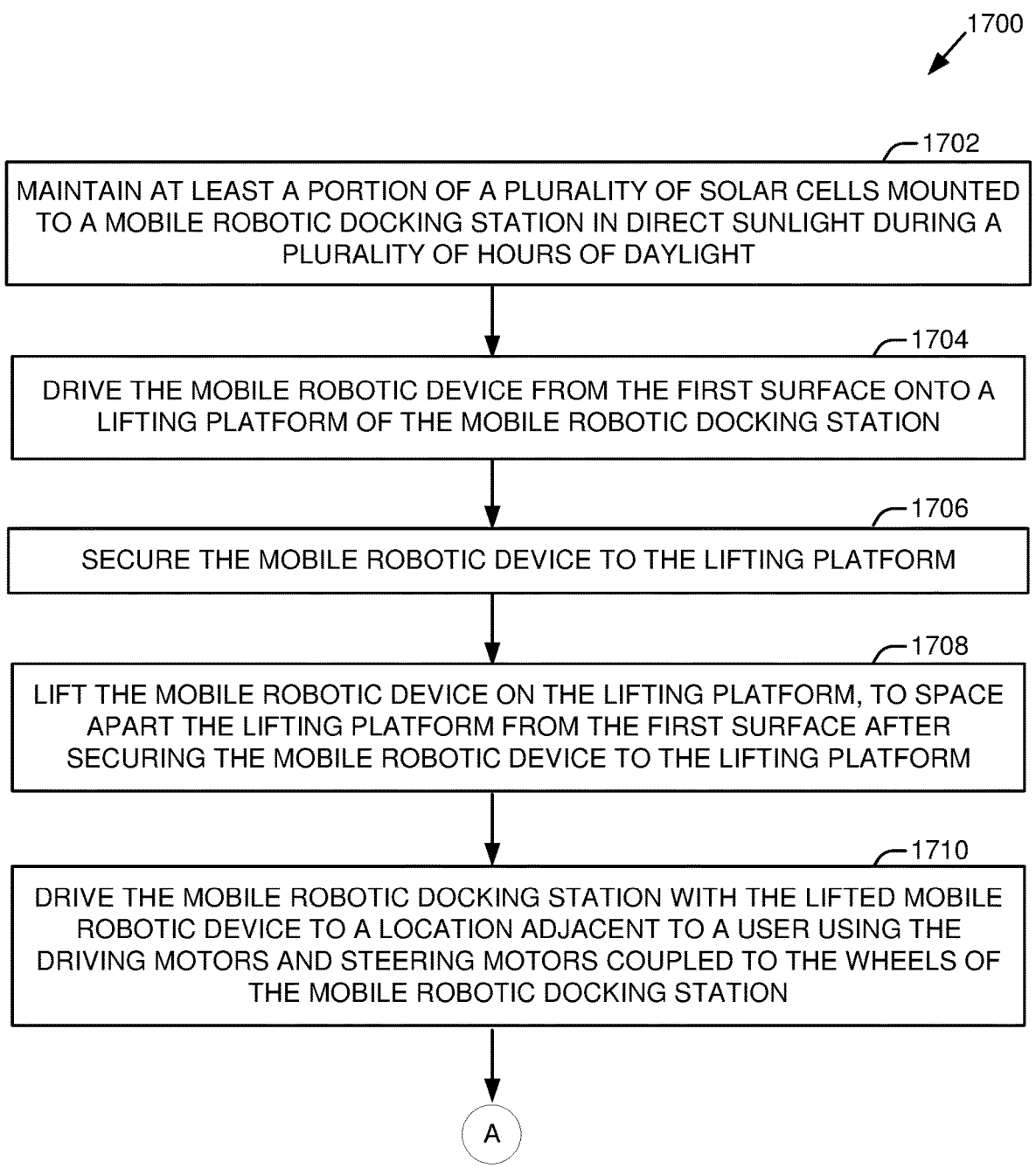
FIGS. 17A and 17B together depict a flow diagram illustrating an exemplary method operational in a system having a mobile robotic device and a mobile robotic docking station, according to aspects described herein.
Figure 17B:
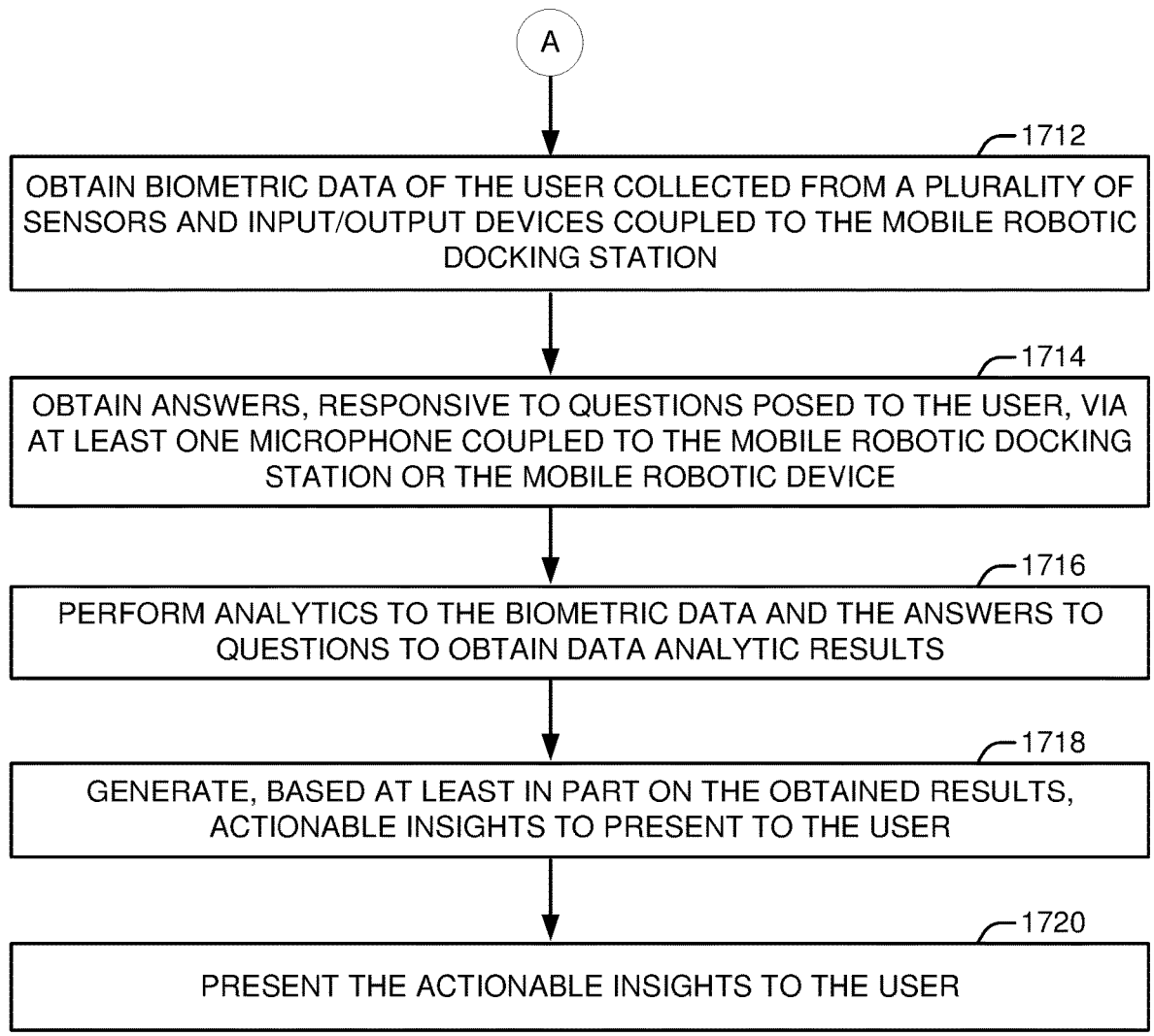

FIGS. 17A and 17B together depict a flow diagram illustrating an exemplary method 1700 operational in a system having a mobile robotic device and a mobile robotic docking station, according to aspects described herein. The method may include maintaining at least a portion of a plurality of solar cells mounted to the mobile robotic docking station in direct sunlight during a plurality of hours of daylight 1702. The method may include driving the mobile robotic device from the first surface onto a lifting platform of the mobile robotic docking station 1704. The method may include securing the mobile robotic device to the lifting platform 1706. The method may further include lifting the mobile robotic device on the lifting platform, to space apart the lifting platform from the first surface after securing the mobile robotic device to the lifting platform 1708. The method may further include driving the mobile robotic docking station with the lifted mobile robotic device to a location adjacent to a user using the driving motors and steering motors coupled to the wheels of the mobile robotic docking station 1710. The method may still further include obtaining biometric data of the user collected from a plurality of sensors and input/output devices coupled to the mobile robotic docking station 1712. The method may also include obtaining answers, responsive to questions posed to the user, via at least one microphone coupled to the mobile robotic docking station or the mobile robotic device 1714. The method may still further include performing analytics to the biometric data and the answers to questions to obtain data analytic results 1716. The method may include generating, based at least in part on the obtained results, actionable insights to present to the user 1718. The method may still further include presenting the actionable insights to the user 1720.

According to some aspects, maintaining at least the portion of the plurality of solar cells mounted to the mobile robotic docking station in direct sunlight during the plurality of hours of daylight includes adjusting a position, on a first surface, of the mobile robotic docking station throughout the plurality of hours of daylight using steering motors and drive motors coupled to wheels of the mobile robotic docking station. According to some aspects, the wheels of the mobile robotic docking station may be omnidirectional wheels.

According to some aspects, the questions posed to the user are audible questions output from a speaker on at least one of the mobile robotic device and the mobile robotic docking station. According to some aspects, the questions posed to the user are questions related to health and well-being of the user, comprising questions related to the user's reporting of items in the user's diet, the user's reporting of a type and duration of exercise, and the user's evaluation of a state of awareness by a mind of the user, of itself, and of a world of the user.

Exemplary Capabilities in Operational Environments

The following exemplary capabilities are presented to allow for a better understanding of the operation of the mobile robotic device (e.g., 104, FIG. 1, 204, FIG. 2, 304, FIG. 3) and the mobile robotic docking station (e.g., 602, FIG. 6) and are not intended to be limiting. The following exemplary capabilities are described in connection with a use of the mobile robotic device 304 of FIG. 3, but apply equally well to the mobile robotic device 104 of FIG. 1 and the mobile robotic device 204 of FIG. 2.

At first, a new mobile robotic device 304 may need to be charged at a wall AC outlet. The mobile robotic device 304 may then perform, for example, in accordance with the methods described above. After the mobile robotic device 304 gets to a low battery threshold, it may return to the mobile robotic docking station 602 to charge its own on-board battery 313. In accordance with one aspect, charging may be facilitated by use of the plurality of solar cells 608 on the second housing 614 of the mobile robotic docking station 602. Once charged the mobile robotic device 304 may automatically or manually (e.g., through human control using a cell phone or human voice/speech command) release/eject from the mobile robotic docking station 602. Attaching to and ejecting from the mobile robotic docking station 602 may be facilitated by use of the programmable first reversible polarity magnet 802 and the programmable second reversible polarity magnet 804, as described above in connection with FIG. 8 and its associated text.

LEDs in the torso 310 (e.g., chest) of the mobile robotic device 304 may illuminate a specific color corresponding to a mode of operation of the mobile robotic device 304. The modes of operation may include:

1) red for low battery charge mode;
 2) orange for manual mode (human voice command based only or cell phone based);
 3) yellow for wardrobe, fashion & assets vault mode;
 4) green for autonomous mode;
 5) blue for charging in progress mode;
 6) white for well-being or well-building or home utilities/automobile mode; and
 7) violet for knowledge vault mode.

Corresponding to each color there may be a solfeggio frequency tone output from at least one speaker of the mobile robotic device 304. The solfeggio frequency tone may be output at a level just above ambient room noise, for example, output softly. Solfeggio frequency tones may include an ancient six-tone scale that may have been used in sacred music and is thought by some to have healing power.

In mode 7 or knowledge vault (KV) mode, the mobile robotic device 304 may be detached from the mobile robotic docking station 602 and uses its first fog IoT gateway processor 302 or PC/storage/subsystems and algorithms to build, for example, a 6-folder intelligent data collection/analysis/processing/retrieval system that may include the following folders:

1) well-being & health (including human, building, fashion);
 2) science, technology, architecture, psychology, interior design, etc.;

3) business, finance, economics, leadership, assets, taxes, utilities (e.g., gas, electric, water, security, ISP), etc.;
4) entertainment, fashion, arts and letters, etc.;
5) politics, history & current affairs, etc.; and
6) daily schedule, likes/dislikes, habits and behaviors, emails, phone calls/messages, etc.

Folder 1-5 contents and results of algorithms are stored permanently in the second memory device 606 of the mobile robotic docking station 602. Folder 6 contents are stored permanently inside the first memory device 303 of the mobile robotic device 304 and never stored in the second memory device 606, or in any part, of the mobile robotic docking station 602.

Once the mobile robotic device 304 is docked (e.g., magnetically docked to the mobile robotic docking station 602 or secured by the closing of gates behind the mobile robotic device), the mobile robotic device 304 can receive mode 6 (well-being) analytics/actionable insights and mode 7 (knowledge vault) summaries, presentations, audio, video, and/or picture information for projection to, for example, a wall and/or screen, or a monitor or touch screen monitor, by wireless communication to the monitor.

If the mobile robotic docking station 602 is not found by, for example, an indoor positioning system of the mobile robotic device 304, then the mobile robotic device 304 goes into a stationary mode and announces through a built-in speaker its request to be charged—at which time, a user (e.g., a human companion) can command the mobile robotic device 304 to follow the user to an AC power outlet, (e.g., the nearest AC power outlet) for charging.

In mode 7 (KV), the mobile robotic docking station 602 contains/stores permanently the following 5-folder system:
1) well-being;
2) science, technology, architecture, & psychology, etc.;
3) business, finance, economics & leadership, etc.;
4) entertainment, fashion, arts & letters, etc.; and
5) politics, history & current affairs, etc.

Mode 6 (or well-being mode) data may be stored/archived inside folder 1 for later retrieval, deep learning, analytics, insights, etc.

Data mined from specific sites on the world-wide-web (WWW) using, for example, an Internet connection via WiFi, may be automatically or manually filed/stored, for example as a PDF, into folders 1-5. A user (e.g., a human companion) may send favorite links (e.g., Science Daily, Venture Beat, The Atlantic, Aeon, LinkedIn feeds, twitter feeds, etc.) to mobile robotic device (e.g., 104, FIG. 1, 204, FIG. 2, 304, FIG. 3) using a remote control application, for example on a smart phone or computer terminal. Additionally, or alternatively, the user can use the touch screen 506 on a rear side 504 of the mobile robotic device 304, FIG. 3 to input the links there, or the user can dictate favorite web sites, etc. to the mobile robotic device 104, FIG. 1, 204, FIG. 2, 304, FIG. 3. Data mined from the cloud (in all subject categories) to support/complement the sensed/measured data from users/humans/home/business/drone/car environment—as well for the sake of knowledge and learning for the autonomous companion mobile robot and system itself and for its user(s) (i.e., lifelong learning human companion(s)).

Over time, this 5-folder system becomes a ubiquitous real-time personalized knowledge vault for the user (e.g., human companion) to draw upon at any time and at rapid pace without needing to be connected to the Internet. Infrequent Internet connectivity provides for improved security from malicious attackers and/or eavesdroppers lurking on the Internet. The mobile robotic docking station 602 may use algorithms to create easily understandable data/knowledge through summaries presented concisely and clearly to the user.

For example, what if the user is asked by his employer or professor to put together a keynote speech on a topic, e.g., "Brain Science" with a turn-around time of only one evening before going live the following morning to deliver the keynote? Normally, the user would return to his office, home, or hotel and peruse/mine the web and other reference material/sources to start building his paper/presentation. With some degree of certainty, the result would not be as good as if the user had adequate time to prepare.

However, using the knowledge vault of the mobile robotic device 104, FIG. 1, 204, FIG. 2, 304, FIG. 3, the user can expect a quick turn-around of any type of information in a 30-3-30 (30 minutes×3 minute×30 second (elevator pitch)) form, Steve Jobs form (Presentation Secrets of Steve Jobs by Carmine Gallo), deep dive form, or other forms, in a variety of formats (Word, Power Point, Excel, among others) with projection and text-to-speech output. This can be applied to any topic spanning the five universal categories including the users own health data to help educate the user and in turn the user can communicate/report out/teach others.

In Mode 6 (well-being mode) the mobile robotic device 304 is always attached to the mobile robotic docking station 602. In accordance with one aspect, in Mode 6, they may remain stationary.

In Mode 6, the mobile robotic device 304 and mobile robotic docking station 602 together form a single IoT robot, which may be strictly dedicated to well-being for the user. Once the mobile robotic docking station 602 has received biometric data via wearables, implantables, voice, video, and other data input mechanisms such as provided in the second plurality of sensors and input/output devices 607, the mobile robotic docking station 602 may collect, process, analyze, and produce analytics with actionable insights for the user to draw upon. The analytics with actionable insights may be referred to as final well-being data. The mobile robotic device 304 can take this final well-being data after undocking (e.g., detaching, ejecting) from the mobile robotic docking station 602 and may present it to the user anywhere in the user's home or business or at the touch screen 506, another display, and/or on a projector screen by use of the projector 415.

In Mode 6, there are several sensors and input/output devices that are stored within drawers in the second housing 614 of the mobile robotic docking station 602. These sensors and input/output devices can be withdrawn from the drawers and used by a user to provide data to the mobile robotic docking station 602. For example, the several sensors and input/output devices may be included in the second plurality of sensors and input/output devices 607 and the drawers may be included in the plurality of drawers 610 of the mobile robotic docking station 602. In accordance with one aspect, one or more of the plurality of drawers 610 maybe touch sensitive drawers. Sensors and/or input/output devices that are withdrawn from the plurality of drawers 610 may be coupled, for example by stretchable cables or wireless links, to the second fog IoT gateway processor 604. By way of example and not limitation, the second plurality of sensors and input/output devices 607 may measure and/or include sensors and input/output devices to measure:
1) human heart rate;
2) body temperature;
3) oxygen level;
4) breathing rate;
5) heart rate variability;

6) basal body temperature;
7) eye tracking;
8) EEG (electroencephalography);
9) GSR (galvanic skin response);
10) ECG (electrocardiogram);
11) EMG (electromyography);
12) respiration;
13) aura sensing;
14) ultrasound tomography;
15) scalp/hair magnifier microscope;
16) dental intraoral camera;
17) digital otoscope;
18) digital toothbrush;
19) brain stimulator to stimulate the secretion of endorphins, serotonin, dopamine, and oxytocin, which may be referred to as the four happy hormones;
20) a headset (e.g., for the user to make use of biosonics);
21) LED based chromatherapy
22) pH level; and/or
23) Blood glucose.

The second fog IoT gateway processor 604 may be able to collect all the disparate health data for the user (including, for example, speech dictated questions and issues) and through the sensors, analyze the health data, and process the health data.

At least one net result to the user is health data-driven decision making with actionable insights. The mobile robotic docking station 602 includes the second fog IoT gateway processor 604, which, among other things, allows intelligence to be pushed down to the local area network level of the network architecture—processing the data in the second fog IoT gateway processor 604 without having to resort to transfer in and out of data to the cloud (e.g., cloud 134).

With the built-in projector 415 (allowing for the projection of word, excel, power point, video with audio, images with audio, among others) and built-in speakers (allowing for text-to-speech, audio files (mp3), among others), the mobile robotic device 304 may be able to communicate insightful data analytics with credible reference knowledge to the user, and then provide recommended actions, for example, direct guidance on dietary, liquid, vitamin intake, exercise, sleep management, stress management, consciousness management, among other things.

In accordance with some aspects, the mobile robotic device 304 may also connect to an external display (e.g., smart TV, touch screen monitor, Google chrome cast, among others).

Accordingly, the mobile robotic device 304 may be able to manage/provide alerts (either visually and/or through speech) on the day-to-day well-being for its user(s)—build a schedule, enable actions to be taken, when to perform the next sensor-based health measurements, and so forth.

If allowed, for example under the Health Insurance Portability and Accountability Act of 1996 (HIPAA) rules, this consolidated data can be privately/securely transmitted via cloud 134 to, for example, a medical doctor (MD) and/or a naturopathic doctor (ND) in order to complement the expertise of the healthcare practitioners.

Through its body language recognition in conjunction with speech/voice detection/recognition, mobile robotic device 304 may be able to intimately know every person inside the home and build a personal database on each person (e.g., where each person is a user).

All data may be stored privately on premise inside the on-board storage located inside mobile robotic docking station 602. Mobile robotic docking station 602 includes an anterior facing trunk with easy access to a touch panel. This touch panel may be used by developers or technicians to manage/program applications/configure/upgrade the IoT gateway/sensor/connectivity/storage/subsystems/security network, etc. if and when necessary.

For any of the 7 modes, the mobile robotic device 304 or mobile robotic docking station 602 can recognize and/or respond to, for example, speech commands and/or questions with voice recognition. Furthermore, for any of the 7 modes, the mobile robotic device 304 or mobile robotic docking station 602 can recognize and/or respond to, for example, human body language (e.g., posture, head motion, facial expression, eye contact, gestures) and/or human physiology (e.g., pupil constriction indicates use of right brain (stimulating endorphins), pupil dilation indicates use of left brain (producing adrenaline)). Furthermore, for any of the 7 modes, the mobile robotic device 304 or mobile robotic docking station 602 can recognize and/or respond to, for example, objects and depth, among other things.

In accordance with one aspect, the mobile robotic device 304 and mobile robotic docking station 602 may be hardwired to comply with and behave per 1) Isaac Asimov's Three Laws of Robotics, and 2) a measure of a state of awareness by the mind of itself and the world.

The mobile robotic device 304 and mobile robotic docking station 602 both have their own machine learning vault (MLV) for out-of-the-box continuous learning, remembering, and acting upon. The MLV may include four folders:

1) Specification data (If asked, they each can recite all of its components and their technical and experiential specifications along with answers to any questions on specifications that a user may have);
2) Input sensing data (This may include data collected by: HD cameras and/or stereoscopic cameras with body language recognition with emotion engine and object recognition; IR depth perceiving sensors, among other things; microphones, including for example, directional microphones, for speech/voice recognition, among other things; air quality sensors, and related devices, touch and feel and motion information, for example from motorized joints with servo motors, anti-pinch articulation, internal gyroscope, accelerometer, touch and pressure sensors in hands, bumper sensors; laser sensors, sonar range finder (e.g., ultrasonic transmitter/receiver); motorized omnidirectional wheels; tactile sensors, temperature; humidity, and/or lighting sensor(s));
3) Decision and action data (MLV folder 3 together with MLV folder 2 and MLV folder 4 may collectively allow the mobile robotic device 104, FIG. 1, 204, FIG. 2, 304, FIG. 3 to holistically behave as a true and/or genuine humanoid companion robot; and
4) Output data (e.g., includes output data with mouth (speaker with vocal synthesizer, text to speech, etc.) and actuation of projector, wheels, magnet(s), arms, hands, neck, body, etc. of the mobile robotic device 104, FIG. 1, 204, FIG. 2, 304, FIG. 3).

As mobile robotic device 304 starts to learn about each user (person) that is permitted to interface with the mobile robotic device 304, the mobile robotic device 304 may be able to build the contents of the knowledge vault (folder 6) containing each users' schedule, likes and dislikes, habits and behaviors, etc. Having this data, the mobile robotic device 304 can alert every user on calendar events, actions to be taken on calendar events, snap pictures when requested, take videos/play-back videos when requested, record/play-back voice dictations when requested, send emails, videos and mp3s, etc. when requested to specified contacts, ask intelligent questions, make intelligent and cordial colloquial comments and/or statements.

The mobile robotic device 304 may also be able to use a built-in RFID reader to track all valuable assets, for example, inside a home and/or business (e.g., including furniture, electronic assets, collectibles, vehicles, wardrobe items (shoes, ties, belts, purses, bags, clothing, etc.)).

Using fleet management/fashion software, the mobile robotic device 304 can track/organize a user's items into a virtual closet and provide recommendations on outfits to wear for any season, month, day, time of the day, weather condition, formal/informal occasion, etc.

The mobile robotic device 304 can do similar interior recommendations for a user's living space using, for example, fleet management/home interior design software.

In accordance with one aspect, the mobile robotic device 304 can also track and manage all smart home components, including, for example, thermostats, cameras, doorbells, alarm systems, lock, smoke and CO2 alarm, etc.

When the mobile robotic device 304 is in other than well-being mode, it may be configured to eject itself (if full battery charging is completed), from the mobile robotic docking station 602. If the mobile robotic device 304 is being charged by the mobile robotic docking station 602, then a user can provide an eject command by speech/voice or using an application on a cell phone or computer terminal.

The application on the cell phone or computer terminal can be used to override autonomous mode 4 and to remotely control the mobile robotic device 304 as well (mode 2). While in mode 6 (well-being), the mobile robotic docking station 602, with the mobile robotic device 304, may be configured to return to an original spot (or a last known spot) that received sunshine for recharging batteries using the plurality of solar cells 608. Once the mobile robotic docking station 602 and mobile robotic device 304 are fully charged, the mobile robotic device 304 may eject itself and leave the mobile robotic docking station 602 stationary at the sunshine location unless the mobile robotic device 304 is returned to mode 6.

Additional Background Material

In accordance with the Environmental Protection Agency (EPA), the average American spends 93% of their life indoors. 87% is indoors and 6% is inside automobiles. See https://snowbrains.com/brain-post-much-time-average-american-spend-outdoors/. Also, Americans spend 41% of their entire life staring at some screen, be it a smartphone, tablet, laptop or TV. See http://bigthink.com/paul-ratner/how-many-days-of-your-life-do-you-have-sex-your-life-time-by-the-numbers. As children and young people spend an increasing amount of time with screens—more than six hours a day in accordance with one US survey—parents have begun to wonder if spending this much time with screens is safe. An increasing amount of research suggests it is not. Teenagers who spend five or more hours a day on electronic devices are 71% more likely to have a risk factor for suicide than those who spend less than an hour a day. Young people who use screens this much are also 52% more likely to sleep less than seven hours a night—a significant amount of sleep deprivation with potential consequences for both physical and mental health. The more time young adults spend on social media, the more likely they are to be depressed or lonely. Of course, correlation does not prove causation—perhaps unhappy people use digital media more. However, several experiments and longitudinal studies have concluded that digital media use leads to unhappiness, but unhappiness doesn't lead to digital media use. See https://www.theguardian.com/commentisfree/2018/jan/12/tech-bosses-kids-time-smartphones-parents-mental-health.

As can be seen above, the average American spends most of his/her life inside a building about 87%—it can be the home, the office, the school/college, etc. The home and office being the most significant. With that said, what do most Americans spend most of their time doing at home? Staring at some sort of screen about 41% of their entire life. In accordance with several studies (including the one above), addiction to the screen is leaning towards detrimental to the overall health and well-being of Americans. Millennials and Generation Z who are addicted to the screen are appearing to behave as zombies—their conscious minds and subconscious minds are absolutely engrossed in this habit with scarce conscious activity in human-to-human or human-nature interaction. Funny how the captains of industry minimize screen time for their children since they indeed understand the loss of higher consciousness behavior when addicted to screens—high consciousness behavior includes integrity, peace, joy, reason, acceptance, willingness, love, etc. These children now and well into adulthood will have missed this duration of precious time to build good habits—instead, they are ending up lonely, in despair, depressed, arrogant, prideful, angry, fearful, etc. These in turn can lead to anti-social behavior leading to sociopathic and psychopathic tendencies. See https://www.psychologytoday.com/us/blog/insight-is-2020/201402/the-sociopathic-child-myths-parenting-tips-what-do. To combat the above phenomenon, an autonomous home/office-based companion robot may be used. When a person returns home from anywhere, the person should be able to drop his or her smart phone, tablet, smart TV, etc. and enter into a more exciting interactive world of human to machine interaction—whereby, everyone in the family can speak to the autonomous home/office-based companion robot, learn from it, teach others through it, use it for leading a healthy lifestyle, etc. A person doing this may be able to essentially complement his or her mental thinking intelligence with help from the autonomous home/office-based companion robot. One benefit may be the offloading of a substantial amount of objective knowledge reliance to the autonomous home/office-based companion robot, leaving each user much more time to develop that user's subjective consciousness together with the user's family. Intelligence does not only need to be directed to the mind and the external world for fulfillment. It may be directed beyond the mind looking inward into a user's consciousness. In a state of the no-mind, no-thoughts, no-ego, and selflessness, user may become more mindful, insightful, intuitive, inspirational, whereby users may stop judging, grudging, opinionating, positing other people, circumstances or things and stop beating himself or herself about the past and stop creating anxiety about the user's future.

In accordance with a study published in 2015 by The National Bureau of Economic Research's Bulletin on Aging and Health, healthcare spending for people aged 65 and over (data was collected between 1996 and 2010 through the Medicare Current Beneficiary Survey) was approximately $18,424 per person per year, and nursing home costs accounted for a large proportion of out-of-pocket and Medicaid expenses. Ultimately, it turns out that the government pays for almost two-thirds (or 68%) of health care spending by the elderly, with Medicare accounting for 55% of the coverage, Medicaid covering 10% and other government programs covering the remaining 3%. Private insurance covered approximately 13% of the elderly's medical expenses. This means that seniors are left to cover the rest.

Specifically, "20% of medical spending of the elderly is financed by out-of-pocket expenses," the report found. The researchers found that medical spending doubles between the ages of 70-90, and that the average amount spent on medical expenses for an American in his or her 90's exceeds 25,000 per year. Again, nursing home expenses comprise a large chunk of the costs. The study found that medical spending over the last year of an American's life averaged $59,100, with 71% of this amount paid for by Medicare, and 10% paid for by Medicaid, again leaving seniors and their families to carry the burden of the outstanding 20%. The study authors suggest that "even with public and private insurance, out-of-pocket medical expenses are significant."

So, when it comes to saving for retirement or working medical expenses into a person's budget, the person may need to consider his or her coverage and his or her age. For the average American senior 65 years or older, it would be smart to save about 20% of the total expected medical expenses as anticipated out-of-pocket expenses, but keep in mind that these expenses increase significantly as a person ages, and rise even more in the last year of a person's life. See https://www.aplaceformom.com/blog/04-24-17-seniors-spending-medical-expenses/.

A real-life example providing proof of a need for an autonomous home/office-based companion robot is now presented. A person's mother lived a fairly healthy life until she turned 79. At the time, she was living by herself in an apartment. Because the person had to work 10-12 hour days, it was difficult for that person to stop and spend more time with the mother. However, the mother depended on the person for company, for delivery of food, for taking her to the doctor, for taking her out for entertainment, for retrieving/delivering her pharmaceuticals, etc. The mother suffered from tremendous loneliness, she did not sleep much nor did she eat or drink much. She skipped meals altogether. Although, she only needed to take two pharmaceuticals—one for blood pressure and other for blood sugar, she most probably would miss taking them, there was no reliable way to monitor her compliance in this regard. Then one extremely cold night, she suffered a cerebral infarction. The next morning, she had barely enough energy to call the person while laying on the carpet. The person rushed over to his mother as fast as he could. As soon as he entered his mother's apartment, he found her on the floor unconscious. She would never be the same again. After entering the emergency room (ER) and then intensive care, her doctors sent her to a rehabilitation nursing home, where she was dropped out of her wheelchair due to certified nursing assistant (CNA) negligence—and suffered severe left-brain hemorrhaging. Again, she ended up at ER and then intensive care. The doctors thought she would die. However, she survived for four years living in an acute incapacitated state in different hospitals and memory care facilities. This real-life example highlights: 1) the chronically inefficient post-stroke health care system in the U.S.; 2) the tremendous amounts of dollars that end up being wasted due to negligence and the corresponding clean-up (e.g., more pharmaceuticals with adverse side effects which induce other chronic issues in the patient, and a remarkably poor quality of life for the patient, whereby the patient is forced to pay out of pocket for nursing care facility rent/care until the patient is depleted of their life's savings, Medicare covers certain hospital costs, but, for example, the patient pays for ambulance/transportation costs, etc.; and 3) the chronically inefficient preventive maintenance of elderly patients by medical doctors. However, an autonomous home/office-based companion robot, such as the one exemplified herein, could have alleviated at least some of the issues facing the person's mother. If the mother would have had the autonomous home/office-based companion robot when she had better health, the autonomous home/office-based companion robot could easily have been a great companion for her. The autonomous home/office-based companion robot may have helped her manage her health, spoken with her, answered her many questions with accuracy, entertain and teach her using the projector to display, keep the person (i.e. her son and caregiver) informed on her health condition and provide the person with preventative recommendations and guidance which he could have acted upon together with his mother. Life with a reliable, and above-integrity companion robot could have been vital to the mother's well-being since such a robot could assist her verbally, visually with much of her basic health, learning, and entertainment needs with compassion.

One or more of the components, processes, aspects, and/or functions illustrated in the figures may be rearranged and/or combined into a single component, process, aspect, and/or function or embodied in several components, processes, aspects, and/or functions. Additional elements, components, processes, aspects, and/or functions may also be added without departing from novel aspects disclosed herein. The apparatus, devices, and/or components illustrated in the figures may be configured to perform one or more of the methods, aspects, or processes described in the figures.

It is noted that the examples may be described as a process depicted as a flowchart, a flow diagram, a structure diagram, or a block diagram. Although a flowchart or flow diagram may describe the process as a sequential process, many of the processes can be performed in parallel or concurrently. In addition, the order of the processes may be re-arranged. A process may be terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), solid state drives (SSD), magnetic disk storage mediums, optical storage mediums, flash memory devices and/or other non-transient machine-readable storage mediums, processor-readable mediums, and/or computer-readable mediums for storing information. The terms "machine-readable storage medium", "computer-readable storage medium", and/or "processor-readable storage medium" may include, but are not limited to non-transitory storage mediums such as portable or fixed storage devices, optical storage devices, and various other mediums capable of storing, containing or carrying instruction(s) and/or data. Thus, the various methods described herein may be fully or partially implemented by instructions and/or data that may be stored in a "non-transitory machine-readable storage medium", "non-transitory computer-readable storage medium", and/or "non-transitory processor-readable storage medium" and executed by one or more processing circuits, machines, and/or devices. In general, an instruction stored on a non-transitory machine-readable storage medium, when executed by a processing circuit, causes the processing circuit to perform the instruction.

Furthermore, examples may be implemented by hardware, software, firmware, middleware, microcode, or any combination thereof. When implemented in software, firmware, middleware, or microcode, the program code or code segments to perform the tasks may be stored in a machine-readable medium such as a storage medium or other storage(s). A processor may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the general purpose processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods, algorithms, and/or processes described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithms described in connection with the examples disclosed herein may be implemented as electronic hardware, computer software, or combinations of both. To illustrate this interchangeability of hardware and software, various illustrative components, blocks, modules, circuits, and processes have been described above generally in terms of their functionality. Whether such functionality is implemented as hardware or software depends upon the particular application and design constraints imposed on the overall system.

The various aspects of the examples described herein can be implemented in different systems without departing from the scope of the disclosure. It should be noted that the foregoing examples are merely examples and are not to be construed as limiting. The description of the examples is intended to be illustrative, and not to limit the scope of the claims. As such, the present teachings can be readily applied to other types of apparatuses and many alternatives, modifications, and variations will be apparent to those skilled in the art.

What is claimed is:

1. A system, comprising:
   a mobile robotic device, comprising:
      an enclosure;
      a first fog Internet of Things (IoT) gateway processor within the enclosure;
      a first memory device coupled to the first fog IoT gateway processor within the enclosure;
      a first plurality of sensors and input/output devices coupled to the first fog IoT gateway processor within the enclosure; and
      a first motion base, responsive to commands of the first fog IoT gateway processor, having a first housing coupled to the enclosure, the first motion base having a first plurality of wheels, wherein at least three of the first plurality of wheels are configured to drive and steer the first motion base on a surface; and
   a mobile robotic docking station, comprising:
      a second fog IoT gateway processor;
      a second memory device coupled to the second fog IoT gateway processor;
      a second plurality of sensors and input/output devices coupled to the second fog IoT gateway processor;
      a second motion base, responsive to commands of the second fog IoT gateway processor, having a second housing, the second motion base having an open recess therein, configured to receive the first motion base and at least a portion of the enclosure of the mobile robotic device, the second motion base having a second plurality of wheels, wherein at least three of the second plurality of wheels are configured to drive and steer the second motion base on the surface; and
      a lifting platform, responsive to commands of the second fog IoT gateway processor, within the open recess, and coupled to the second motion base, comprising:
         a lifting base configured to receive the first plurality of wheels of the first motion base thereon, and
         a fastener configured to releasably secure the first motion base to the lifting platform,
         wherein the lifting platform secures and lifts the mobile robotic device to space apart the lifting platform from the surface.

2. The system of claim 1, wherein the enclosure is the enclosure coupled to the first housing.

3. The system of claim 1, wherein the enclosure has a humanoid form, comprising:
   a head;
   a motorized neck joint, responsive to commands from the first fog IoT gateway processor, coupled to the head and providing yaw and pitch mobility to the head;
   a torso coupled to the motorized neck joint at an upper end of the torso;
   an articulated right arm and an articulated left arm, responsive to commands from the first fog IoT gateway processor, respectively coupled to the torso at a right shoulder portion of the torso and a left shoulder portion of the torso;
   an articulated right hand and an articulated left hand, responsive to commands from the first fog IoT gateway processor, respectively coupled to the articulated right arm and articulated left arm at lower ends of the respective articulated right arm and articulated left arm;
   a motorized waist joint, responsive to commands from the first fog IoT gateway processor, coupled to the torso at a lower end of the torso and providing yaw mobility to the torso; and a right leg and a left leg respectively coupled at an upper end to the torso at a right hip portion of the torso and a left hip portion of the torso, the right leg and the left leg respectively coupled at a lower end to the first housing.

4. The system of claim 3, wherein the head further comprises a plurality of input and output devices, a face mask having openings for the plurality of input and output devices, and a securing feature configured to removably secure the face mask to the head.

5. The system of claim 3, wherein the head further comprises a motorized lower lip and left and right motorized eyelids, wherein the motorized lower lip and left and right motorized eyelids are configured to be driven between a continuous plurality of open and closed states.

6. The system of claim 3, wherein the head further comprises at least any three of:
a stereoscopic camera configured to extract three-dimensional information from a scene, a pair of microphones, an infrared optical sensor configured for thermography, at least one speaker, and an air quality sensor.

7. The system of claim 3, wherein the torso further comprises:
a projector and a plurality of sensors including at least one of: a high definition camera, an inertial measurement unit (IMU), an indoor positioning system (IPS), and a global positioning system (GPS).

8. The system of claim 3, wherein the head includes first motorized joints and first optical encoders to rotate the head plus or minus 20 degrees from a vertical plane bisecting the mobile robotic device symmetrically into a right side and a left side, and 10 degrees from a horizontal plane perpendicular to the vertical plane, and the torso includes second motorized joints and second optical encoders to rotate the torso plus or minus 10 degrees from the vertical plane.

9. The system of claim 3, wherein the articulated right arm and the articulated left arm are respectively coupled, via a motorized shoulder joint, to the torso at the right shoulder portion and the left shoulder portion, wherein each of the articulated right arm and the articulated left arm comprise a bicep portion coupled to the motorized shoulder joint at an upper end of the bicep portion, a motorized elbow joint coupled to the bicep portion at a lower end of the bicep portion, a forearm portion coupled to the motorized elbow joint at an upper end of the forearm portion, a motorized wrist joint coupled to the forearm portion at a lower end of the forearm portion, an articulated hand coupled to the motorized wrist joint at an upper end of the articulated hand.

10. The system of claim 9, wherein the articulated hand comprises at least one finger and an opposing thumb and further comprises touch and tactile sensors and a pressure sensor array.

11. The system of claim 3, wherein at least one arm includes at least one of an electromagnetic field (EMF) sensor and a radio frequency identification (RFID) sensor.

12. The system of claim 1, wherein the enclosure has an external form or appearance characteristic of a three-dimensional shape, a humanoid, a present or historical person, a fictional character, or an animal.

13. The system of claim 1, wherein the enclosure further comprises, at least:
an articulated arm, responsive to commands from the first fog IoT gateway processor, coupled to the enclosure at an upper end of the articulated arm; and
an articulated hand, responsive to commands from the first fog IoT gateway processor, coupled to the articulated arm at a lower end of the articulated arm.

14. The system of claim 1, wherein:
a subset of the first plurality of sensors and a subset of the second plurality of sensors are redundant; and
the first fog IoT gateway processor and the second fog IoT gateway processor independently and locally process data respectively received from the first plurality of sensors and the second plurality of sensors.

15. The system of claim 1, wherein the first fog IoT gateway processor and the second fog IoT gateway processor independently and locally process data respectively received from the first plurality of sensors and the second plurality of sensors without coupling to or communicating with another processor or server via an Internet.

16. The system of claim 1, wherein the first motion base further comprises a bumper around its circumference, a magnet with selectively reversible magnetic poles at an outermost lower anterior location on the first motion base, and at least one of a set of ultrasonic range sensors, a light detection and ranging (LiDAR) system, touch and tactile sensors, and a pressure sensor array coupled to the first plurality of wheels.

17. The system of claim 1, wherein the mobile robotic docking station further comprises at least any three of: a stereoscopic camera configured to extract three-dimensional information from a scene, a pair of microphones, an infrared optical sensor configured for thermography, at least one speaker, a high definition camera, an inertial measurement unit (IMU), an indoor positioning system (IPS), a global positioning system (GPS), touch and tactile sensors, a pressure sensor array coupled to the second plurality of wheels, a set of ultrasonic range sensors, and a light detection and ranging (LiDAR) system.

18. The system of claim 1, wherein the second motion base further comprises a bumper around its circumference, and the fastener comprises a first magnet coupled to the first motion base and a second magnet coupled to a lifting backstop of the lifting platform, wherein at least one of the first magnet and the second magnet is a programmable reversable polarity magnet, and the first magnet and the second magnet are at substantially equal heights when in contact with each other.

19. The system of claim 1, wherein the mobile robotic docking station further comprises a plurality of solar cells configured to charge a battery of the mobile robotic docking station and a battery of the mobile robotic device, and a plurality of drawers that each house at least one sensor or device connected to a communication interface of the mobile robotic docking station by a stretchable cable.

20. The system of claim 19, wherein the at least one sensor or device comprises at least one of: a heart rate sensor, a body temperature sensor, an oxygen level sensor, a breathing rate sensor, a heart rate variability sensor, a basal body temperature sensor, an eye tracking sensor, an electroencephalography (EEG) sensor, a galvanic skin response (GSR) sensor, an electrocardiogram (ECG) sensor, an electromyography (EMG) sensor, a respiration sensor, and ultrasound tomography sensor, a scalp/hair magnifier microscope device, a dental intraoral camera device, a digital otoscope device, a digital toothbrush device, and a biosonics headset device.

* * * * *